US010410501B2

(12) United States Patent
Klicpera

(10) Patent No.: US 10,410,501 B2
(45) Date of Patent: *Sep. 10, 2019

(54) WATER METER AND LEAK DETECTION SYSTEM

(71) Applicant: Michael Edward Klicpera, San Diego, CA (US)

(72) Inventor: Michael Edward Klicpera, San Diego, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/016,178

(22) Filed: Feb. 4, 2016

(65) Prior Publication Data
US 2016/0163177 A1 Jun. 9, 2016

Related U.S. Application Data

(63) Continuation of application No. 13/776,963, filed on Feb. 26, 2013, now Pat. No. 9,297,150.

(51) Int. Cl.
F16K 31/02 (2006.01)
G08B 21/18 (2006.01)
(Continued)

(52) U.S. Cl.
CPC ............ G08B 21/18 (2013.01); E03B 7/071 (2013.01); E03B 7/12 (2013.01); F16K 31/02 (2013.01);
(Continued)

(58) Field of Classification Search
CPC .......... E03B 7/071; F16K 31/02; F16K 31/05; Y10T 137/86397; Y10T 137/7761; Y10T 137/8158; Y10T 137/7727
(Continued)

(56) References Cited

U.S. PATENT DOCUMENTS 2,233,525 A    5/1942   Witham
5,267,587 A *  12/1993  Brown .................... E03B 7/071
                                                137/624.12
(Continued)

OTHER PUBLICATIONS https://en.wikipedia.org/wiki/Flow_measurement.
(Continued)

Primary Examiner — Matthew W Jellett
(74) Attorney, Agent, or Firm — Michael E. Klicpera

(57) ABSTRACT

The present invention is a water meter and leak detection system that has a residential or industrial/commercial facility water supply interruption system. The system is comprised of a remotely controllable base station with shut-off/on mechanism that is in wireless or wired (X10, Zwave, UPB) communication with a convenient controller. The base station with shut-off/on mechanism is interposed within a water line from a water main to the living or operating quarters portion of a residential or an industrial/commercial facility or building, such that activation of the base station with shut-off/on valve operates to prevent flow of water from the water main to the living quarters when the residential home or industrial/commercial facility or building is vacated or unsupervised. In this manner, damage to the living quarters or the industrial/commercial facility or building from failure of water pipes running through the living or working quarters is prevented during times that the shut-off mechanism is activated.

46 Claims, 14 Drawing Sheets

(51) Int. Cl.
*F16K 31/05* (2006.01)
*E03B 7/07* (2006.01)
*E03B 7/12* (2006.01)

(52) U.S. Cl.
CPC .............. *F16K 31/05* (2013.01); *Y02A 20/15* (2018.01); *Y10T 137/8158* (2015.04)

(58) Field of Classification Search
USPC ................... 137/624.12; 251/129.03, 129.04
See application file for complete search history.

(56) References Cited

U.S. PATENT DOCUMENTS

| | | | |
|---|---|---|---|
| 5,284,523 A | 2/1994 | Badami et al. | |
| 5,580,791 A | 12/1996 | Thorpe | |
| 5,636,653 A | 6/1997 | Titus | |
| 5,660,198 A | 8/1997 | McClaran | |
| 6,105,607 A | 8/2000 | Calse | |
| 6,237,618 B1* | 5/2001 | Kushner | E03B 7/071 137/1 |
| 6,246,677 B1 | 6/2001 | Patel | |
| 6,397,687 B1 | 6/2002 | Garmas | |
| 6,539,968 B1 | 4/2003 | White | |
| 6,543,479 B2 | 4/2003 | Coffey | |
| 6,556,142 B2* | 4/2003 | Dunstan | H04L 12/2803 340/602 |
| 6,963,808 B1* | 11/2005 | Addink | E03B 7/071 702/45 |
| 7,103,511 B2 | 9/2006 | Petite | |
| 7,124,152 B2 | 10/2006 | Bauza | |
| 7,147,204 B2* | 12/2006 | Hollingsworth | E03B 7/071 251/129.04 |
| 7,330,796 B2* | 2/2008 | Addink | E03B 7/071 702/45 |
| 7,360,413 B2 | 4/2008 | Jeffries et al. | |
| 7,559,529 B2* | 7/2009 | Affaticati | F16K 31/00 251/129.04 |
| 7,711,796 B2 | 5/2010 | Gutt et al. | |
| 7,900,650 B1* | 3/2011 | Wilson | F17D 5/00 137/551 |
| 8,028,355 B2* | 10/2011 | Reeder | A46B 7/04 4/623 |
| 8,073,931 B2 | 12/2011 | Dawes et al. | |
| 8,086,702 B2 | 12/2011 | Baum et al. | |
| 8,086,703 B2 | 12/2011 | Baum et al. | |
| 8,122,131 B2 | 2/2012 | Baum et al. | |
| 8,209,400 B2 | 6/2012 | Baum et al. | |
| 8,214,496 B2 | 7/2012 | Gutt et al. | |
| 8,335,842 B2 | 12/2012 | Raji et al. | |
| 8,451,986 B2 | 5/2013 | Cohn et al. | |
| 8,473,619 B2 | 6/2013 | Baum et al. | |
| 8,477,011 B2 | 7/2013 | Tubb et al. | |
| 8,478,844 B2 | 7/2013 | Baum et al. | |
| 8,478,871 B2 | 7/2013 | Gutt et al. | |
| 8,612,591 B2 | 12/2013 | Dawes et al. | |
| 8,621,206 B2 | 12/2013 | Chang | |
| 8,635,499 B2 | 1/2014 | Cohn et al. | |
| 8,638,211 B2 | 1/2014 | Cohn et al. | |
| 8,713,132 B2 | 4/2014 | Baum et al. | |
| 8,819,178 B2 | 8/2014 | Baum et al. | |
| 8,825,871 B2 | 9/2014 | Baum et al. | |
| 8,833,390 B2 | 9/2014 | Ball et al. | |
| 8,836,467 B1 | 9/2014 | Cohn et al. | |
| 8,857,466 B1* | 10/2014 | Wilson | E03B 7/071 137/551 |
| 8,963,713 B2 | 2/2015 | Dawes et al. | |
| 8,988,221 B2 | 3/2015 | Raji et al. | |
| 8,996,665 B2 | 3/2015 | Baum et al. | |
| 9,019,120 B2 | 4/2015 | Broniak | |
| 9,047,753 B2 | 6/2015 | Dawes et al. | |
| 9,059,863 B2 | 6/2015 | Baum et al. | |
| 9,100,446 B2 | 8/2015 | Cohn et al. | |
| 9,141,276 B2 | 9/2015 | Dawes et al. | |
| 9,144,143 B2 | 9/2015 | Raji et al. | |
| 9,147,337 B2 | 9/2015 | Cohn et al. | |
| 9,172,553 B2 | 10/2015 | Dawes et al. | |
| 9,253,754 B2 | 2/2016 | Sanderford | |
| 2003/0210151 A1 | 11/2003 | Kimberlain et al. | |
| 2003/0227387 A1 | 12/2003 | Kimberlain et al. | |
| 2003/0233885 A1 | 12/2003 | Bird et al. | |
| 2004/0069345 A1 | 4/2004 | Doan | |
| 2004/0193329 A1 | 9/2004 | Ransom | |
| 2005/0065755 A1 | 3/2005 | McCarter et al. | |
| 2005/0235306 A1* | 10/2005 | Fima | E03B 1/00 725/10 |
| 2006/0137090 A1* | 6/2006 | Jeffries | G01M 3/2807 4/664 |
| 2008/0001104 A1 | 1/2008 | Voigt | |
| 2008/0149180 A1 | 6/2008 | Parris | |
| 2008/0183842 A1 | 7/2008 | Raji et al. | |
| 2008/0295895 A1 | 12/2008 | Vincent | |
| 2009/0090663 A1 | 4/2009 | Hirata et al. | |
| 2009/0096586 A1 | 4/2009 | Tubb | |
| 2009/0215110 A1 | 8/2009 | Gibson et al. | |
| 2009/0303055 A1 | 12/2009 | Anderson et al. | |
| 2010/0082744 A1 | 4/2010 | Raji et al. | |
| 2010/0207017 A1 | 8/2010 | Horiuchi et al. | |
| 2010/0307600 A1* | 12/2010 | Crucs | E03B 7/071 137/2 |
| 2011/0035063 A1 | 2/2011 | Palayur | |
| 2011/0114202 A1* | 5/2011 | Goseco | E03B 7/04 137/487.5 |
| 2012/0030460 A1 | 2/2012 | Chang | |
| 2012/0233885 A1 | 2/2012 | Chang | |
| 2013/0248023 A1* | 9/2013 | Estrada, Jr. | E03B 7/071 137/551 |
| 2014/0082351 A1 | 3/2014 | Chang | |
| 2015/0013772 A1* | 1/2015 | Patel | F16K 31/12 137/1 |

OTHER PUBLICATIONS https://en.wikipedia.org/wiki/List_of_temperature_sensors.
https://en.wikipedia.org/wiki/Thermocouple.
https://en.wikipedia.org/wiki/Wireless.

* cited by examiner

FIG. 10

Water Use

Average Time: [10 ▼] minutes

Average Water Use: [25 ▼] gallons / minute

Average Cost: $ [2.00 ▼] / 1000 gallons

Water Heater Use

Energy Type: [Natural Gas ▼]

State: [California ▼]

Cost: $ [1.789 ▼] per therm

Efficiency: [.927 ▼]

Water Temp: [55 ▼] °F

Temperature:
[Hot ▼]
[115] °F

Water Use (gallons)

|        | Day   | Week  | Month | Year    | Five Year |
|--------|-------|-------|-------|---------|-----------|
| Water  | 25    | 175   | 750   | 9125    | 45625     |
| Energy | 0.194 | 1.359 | 5.824 | 70.858  | 354.290   |

Water Cost

|        | Day   | Week  | Month | Year    | Five Year |
|--------|-------|-------|-------|---------|-----------|
| Water  | $0.05 | $0.35 | $1.50 | $18.25  | $91.25    |
| Energy | $0.23 | $1.60 | $6.87 | $83.54  | $417.71   |
| Total  | $0.28 | $1.95 | $8.37 | $101.79 | $508.96   |

WATER METER AND LEAK DETECTION SYSTEM

RELATED APPLICATIONS

This application is a continuation-in-part of U.S. application Ser. No. 13/776,963 filed on Feb. 26, 2013, U.S. patent application Ser. No. 12/539,150 filed on Aug. 11, 2009.

FIELD OF THE INVENTION

This apparatus and the method of use relates to water supplying systems. More particularly, the invention relates to a water monitor and water detection system whereby real time water use and leak detection in relation to residential and industrial/commercial facility or building damage.

BACKGROUND OF THE INVENTION

Water conservation is becoming a major issue for many cities towns, and communities and an apparatus for real time monitoring of water and water energy uses at specific residential, corporate, (or government) sites could be useful in supporting water conservation and in assessing and controlling water resources. Periodic droughts and increased population that escalates the demand for fresh water sources which is a humanity concern.

In addition, losses to residential property and industrial/commercial facilities caused by broken water pipes, or unobserved leaks are staggering. In part because broken water pipes often go undetected in the absence of the property owner or while the property owner sleeps through the night, water damage from a broken water pipe can be catastrophic. In fact some insurance agencies report that up to seventy percent of their insurance losses are water related.

Furthermore, it has been reported that in residential homes, leaks still amount to a significant percentage of the total water use.

For non-water related operations, the SmartMeter™ System, manufactured by GE and Landis+Gyr, collects electric and natural gas use data from a home or business. The SmartMeter™'s electric meter records and transfers residential electric use hourly, and commercial electric use in 15 minute increments. The SmartMeter™'s natural gas module (s) attached to a gas meters records daily gas use. The data collected by the SmarMeter™ is periodically transmitted via a secure wireless communication network. The SmartMeter™ system uses programmable solid-state meter technology that provides two-way communication between the meter at your home or business and the utility, using secure wireless network technology.

The solid-state digital SmartMeter™ electric meter records hourly meter reads and periodically transmits the reads via a dedicated radio frequency (RF) network back to a defined municipality. Each SmartMeter™ electric meter is equipped with a network radio, which transmits meter data to an electric network access point. The system uses RF mesh technology, which allows meters and other sensing devices to securely route data via nearby meters and relay devices, creating a "mesh" of network coverage. The system supports two-way communication between the meter and PG&E. SmartMeter™ electric meters can be upgraded remotely, providing the ability to implement future innovations easily and securely.

The electric network access point collects meter data from nearby electric meters and periodically transfers this data to defined municipality via a secure cellular network. Each RF mesh-enabled device (meters, relays) is connected to several other mesh-enabled devices, which function as signal repeaters, relaying the data to an access point. The access point device aggregates, encrypts, and sends the data back to the defined municipality over a secure commercial third-party network. The resulting RF mesh network can span large distances and reliably transmit data over rough or difficult terrain. If a meter or other transmitter drops out of the network, its neighbors find another route. The mesh continually optimizes routing to ensure information is passed from its source to its destination as quickly and efficiently as possible.

Most residential and commercial water supply lines have a primary water meter. However, the location of the primary water meter is usually not readily available or not in a convenient location for a commercial owner or occupier, or a resident to observe. Even if the primary water meter is available for review by a commercial owner or occupier, or resident, the display is a simple continuous or cumulative gauge that does not allow the reader to readily monitor their daily, weekly, monthly, and annual water uses. Furthermore, the primary water meter does not have the capability to wirelessly transfer water use information to a remote display (or recorder with data collection/database) that is conveniently located for review by the owner or occupant of a residence or building to encourage water conservation. In addition, the primary water meter only monitors commercial or residential supply water, and there is no capability to analyze hot and/or cold water use to provide water energy use information or distinguish between indoor and outdoor water use.

It is therefore an object of the present invention to provide a smart water meter for residential homes and condominiums, companies and businesses, and governmental and institutional housing.

It is therefore an object of the present invention to provide a system whereby residential property owners/renters or industrial/commercial owners may easily monitor their water use on a real time basis, either daily, weekly, monthly or yearly.

It is also an object of the present invention to provide a system to alert a residential property owners or an industrial/commercial owners of a potential water leak condition.

Additionally, it is an object of the present invention to provide such a system that may be conducted manually or automatically.

SUMMARY OF THE INVENTION

The present invention comprises a water meter and leak detection system having a base station attached to a water supply with wireless or wire capability to communicate with one or more cell phones, smart phones, or similar remote apparatus with the potential to have recording capabilities. The apparatus base station is affixed to the water supply piping (connected to either connected to the cold and hot water supply lines) for continuous, or on demand, monitoring the water or in another embodiment the single water supply line used within a residential or commercial building. In addition, the present invention could be used with non-commercial water sources such as private wells and other non-commercial water sources. The base station is designed to communicate wirelessly, water use, water energy use, and/or water quality data using Wi-Fi technology with a wireless router. To extend the range, the base station utilizes wireless technology e.g. in the 908-928 MHz frequency range and communications with a receiving station. The receiving station communicates with the 908-928 MHz frequency range wireless technology from the base station and has a second Wi-Fi communication means that communications with a wireless router. The router transfers the water use, water energy use, and/or water quality data to the internet and then to remote computers/servers where the water parameter data is store in an appropriate database. The water parameter data can also be accessed for monitoring and recording by civil, commercial, governmental or municipal operators or agencies, using a remote display, computer or cell phone, smart phone or similar apparatus and/or recorder means connected by a secure wire or wireless communication network.

The housing of the water meter and leak detection system base station or the receiving station can be fabricated from materials that provide weather protection properties. The water meter and leak detection system base station (collection hub) includes a power generation, a microprocessor, timing and wireless circuitry water flow sensors and optional water quality sensors. Optionally the water flow sensors can be invasive types, non-invasive types, or sensitive water flow sensor for detecting leaking conditions and providing a separate data for indoor and outdoor water use. Optionally a temperature sensor and appropriate mechanism can be incorporated into the base station to content with freezing conditions. The alternate embodiment receiving station (communication hub) power source, a microprocessor, two wireless communication means (WiFi and long-range technology) with electrical circuitry.

The water supply line can be manually shutoff and on when the residence or business is un-occupied or vacant by means of a cell phone, smart phone or similar apparatus. The base station is designed to have circuitry to send a signal to the cell phone, smart phone or similar apparatus that the water supply line is on or off.

The present invention water meter and leak detection system for residential or industrial/commercial facilities includes a means to monitor unusual water use to alert a home owner, renter, or building/facilities owner or responsible individual of a potential leak condition using wireless remote leak detection alerting. The water meter and leak detection apparatus base station that is in communication, using Internet of Things "IoT" technology, with a with a cell phone, smart phone or similar apparatus remote can send out messages and signal of non-typical or continuous water use. The base station is interposed within a water line from a water main to the living or operating quarters portion of a residential or an industrial/commercial facility or building, such monitor or continual water flow can be used to alert and owner when the residential home or industrial/commercial facility or building is vacated or unsupervised. In this manner, damage to the living quarters or the industrial/commercial facility or building from failure of water pipes running through the living or working quarters is prevented during times that the shut-off mechanism is activated.

The water meter and leak detection base station with shut-off/on mechanism can be battery operated and utilize re-chargeable batteries that could include an electricity generation means such as a water turbine generation, solar cell, or wind generation means. The base station with shut-off/on mechanism can also be AC or DC powered, or powered by a battery source.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

FIG. 1 is a perspective view of the embodiment comprising the water meter and leak detection apparatus base station affixed to the input water supply piping for continuously monitoring of the water and leak detection within a residential or commercial building. Also shown in FIG. 1 is the wireless or wired capability of the water use monitoring and leak detection apparatus for communicating water use and leak detection information to a conveniently located remote display/recorder or cell phone, smart phone or similar apparatus for the commercial operator or occupier or residential individual and an optional display/recorder for a governmental, civil, commercial or municipal operators or agencies. In addition, FIG. 1 also shows a wireless means for communicating to a home owner or offsite central monitoring computer using cell, mobile or other telephone lines via satellite, microwave technology, the internet, cell tower, telephone lines, and the like.

FIG. 10 is a perspective view of an "APP" or programmed application that provides water use data in various example formats that is transferred from the base station to a remote display/recording apparatus, or a remote computer or a cell phone, smart phone, or similar apparatus.

Corresponding reference characters indicate corresponding parts throughout the several views. The exemplifications set out herein illustrate exemplary embodiments of the invention, and such exemplifications are not to be construed as limiting the scope of the invention in any manner.

DESCRIPTION OF THE PREFERRED EMBODIMENTS

Figure 1:
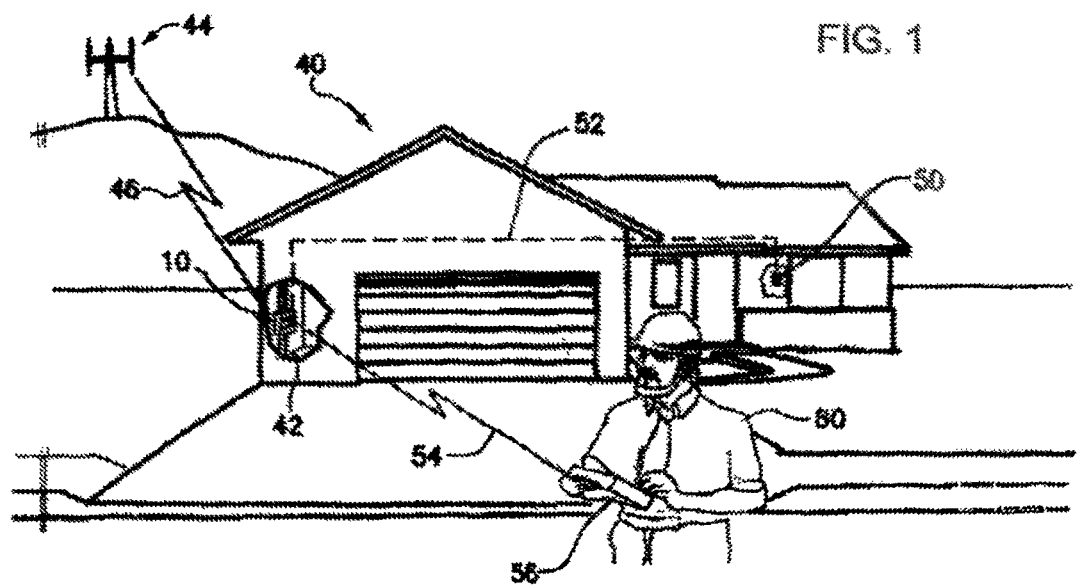

Water Use refers to the total volume of water used over a period of time.

Water Energy Use refers to the ratio of cold or ambient water to heated water use or to the ratio of hot water to total water use or as further defined herein.

Water use/water energy use monitor and/or leak detection apparatus with water shut-off/on mechanism refers to various embodiments of the present invention that depend on apparatus location and owner requirements. The present invention apparatus can be solely a water use monitoring device without the water shut-off/on mechanism because using non-invasive sensors (e.g. ultrasonic) will not require cutting the water supply line and adding the water shut-off/on mechanism requires cutting the water supply line. If the present invention apparatus is located near the water heater, the water use and water energy use can both be monitored and information transferred as described herein. The water use and water energy use can use non-invasive flow and temperature sensors for monitoring and thus no cutting into the water pipe is necessary. If leak detection, freezing protection and water control is desired, or if an invasive water flow sensor is desired, then the water supply line will need to be cut and the appropriate water flow sensor (e.g. turbine hall effect sensors) and/or water control mechanism (controlled ball valve) will be installed. In this example, either invasive flow sensor (e.g. turbine hail effect sensors) or the non-invasive (e.g. ultrasonic sensor) could be used.

Water Flow Event or Water Flow Event Basis refers to the period the water begins flowing and remains until the continuous flow of water terminates or ends, allowing observation and/or recording and/or transmission of data regarding the duration of the water use, the beginning, intermediate and ending flow rates, and the total volume of water used during the water flow event or water flow event basis.

Residential and Commercial operations refer to multi-unit apartment buildings, condominiums, hospitals, dormitories, commercial office buildings, homes, and the like.

Authentication refers to the technology that ensures that, a message, data, control command signal or information that is downloaded or transferred from a one person or device to another declared or intended person or device.

Encryption refers to a privacy technology that prevents anyone but the intended recipient(s) to download, review or read confidential information, signal and/or data.

Integrity refers to technology that ensures that a message, information, control command signal, and/or data do not alter in any way during transit.

Non-repudiation refers to the technology that prevents a sender from denying that a message, data, control command signal or information was sent.

Cellular format technology refers to all current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3G M, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, W-CDMA, HSPDA+HSUPA, UMTS-TDD and other formats for utilizing cell phone technology, telephony antenna distributions and/or any combinations thereof, and including the use of satellite, microwave technology, the internet, cell tower, telephony and/or public switched telephone network lines.

The term cell phone, smart phones mobile phones, or similar apparatus includes all remote cellular phones and mobile electronic communication devices using access and format methods (with cellular equipment, public switched telephone network lines, satellite, tower and mesh technology), PDAs, tablets refers to all current and variants, revisions and generations of the APPLE®, SAMSUNG®, HP®, ACER®, MICROSOFT®, NOOK®, GOOGLE®, SONY®, KINDLE® and other tablets manufactured by these and other manufactures), APPLE TOUCH®, a smart or internet capable television, wireless time piece or wireless watch and other electronic apparatuses with Wi-Fi and wireless capability, and remote computers and controllers having internet, wireless cell format technology connectivity utilizing cellular, Wi-Fi, ZigBee and/or Bluetooth, and any combinations thereof, to communication with the remote cellular phones (with cellular equipment, public switched telephone network lines, satellite, microwave, tower and mesh technology.

The wired (e.g. X10, Zwave, UPB) and wireless electronic, communication described here (e.g. Wi-Fi, ZigBee, Bluetooth) corresponds to the concept of "internet of things" and is defined herein as a network of physical objects or things that is comprised of electronic apparatuses (base station), programmable software, various sensor technology (flow, temperature and water quality and leak detectors), and local routers/servers and/or remote network and internet connectivity, which enables apparatuses to collect and exchange data. The Internet of things allows devices to be sensed and controlled remotely across existing network infrastructure, creating opportunities for more direct integration between the physical world and computer-based systems, and resulting in improved efficiency, monitoring accuracy and economic benefit. The Internet of things encompasses technologies such as smart grids, smart homes, and intelligent wire and wireless electronic communication.

Referring now to the drawings and particularly to FIG. 1 is a perspective view of the first embodiment comprising the water meter and leak detection system 10 affixed to the cold and hot water supply piping in an appropriate location for secondary water monitoring 42 and for continuously monitoring of the water and energy use within a residential or commercial building 40. For accurate measurements of water use or water energy use, the present invention should be installed between the pressure reducing valve or civil, commercial, governmental or municipal supply water sources (with potential meter) and any distribution lines. It is also anticipated by the Applicant that present invention can be used on wells and in situations where the water source is not obtained from a commercial or municipal operations. The water use and water energy use monitoring apparatus 10 can update, upload or download water and energy use on various frequencies, e.g. once per minute, once per hour, once per day, or can send information upon sensing the initiation of water use and until the water use is stopped (water use period) termed by the Applicant as a water flow event. This information can be exhibited on the display/recorder screen (shown in FIGS. 2, 5, 14, 16, 17, 18A and 18B) and/or uploaded, either by the receiving station to a router using wired or wireless technology which transmits the water parameter data to internet and then to the remote server and associated database.

Not particularly, but inherently shown by FIG. 1, is a second embodiment of the present invention water meter and leak detection system 10, 126, 200 that has no energy use monitoring. In the primary purpose, the water meter and leak detection can replace an original water meter. In this embodiment a single input and single output water supply lines are connected to the water use monitoring apparatus. This embodiment could be affixed in water supply lines prior to the tank or tank-less water heater in an appropriate location for water monitoring 42 and for continuously monitoring of the water use within a residential or commercial building 40. It is also anticipated that the water meter with detection 200 can be located near the original water meter or in close proximity to where the pressure reduction valve or water line enters the house or company 40. For accurate measurements of water use or water energy use, the present invention should be installed between the pressure reducing valve or civil, commercial, governmental or municipal supply water sources (with potential meter) and any distribution lines. It is also anticipated by the Applicant that present invention can be used on wells and in situations where the water source is not obtained from a commercial or municipal operations. The water meter and leak detection system 10, 126, 200 can update, upload or download water and energy use on various frequencies, e.g. once per minute, once per hour, once per day, or can send information upon sensing the initiation of water use and until the continuous water use is turned off and stopped (water use period) defined by the Applicant as a water flow event for real-time usage and monitoring. This information can be exhibited on the display/recorder screen (shown in FIGS. 2, 5, 14, 16, 17, 18A and 18B) and/or uploaded by the receiving station to a router using wired or wireless technology which transmits the water parameter data to internet and then to the remote server and associated database.

Also shown in FIG. 1 is a wireless communication or wired communication means 52 from the water meter and leak detection system 10, 126, 200 for communicating water use and water energy use information or data, wired or wirelessly using ZigBee and/or Bluetooth to a conveniently located first remote display 50 located in a convenient location for the commercial operator or occupier or residential individual. Since the wireless communication means 52 is in relatively close proximity to the water meter and leak detection system 10, 126, 200, this wireless means can consist of Bluetooth, ZigBee or similar technology. It is anticipated that technology might be necessary for longer distance communication using wireless frequency in the 908-928 MHz frequency range. This electronic communication comprises, in part, a segment of the internet of things concept. The first wireless communication or wired communication means 52 can also electronically communicate with a local router/server which uses the internet and remote computers (Cloud) to allow remote access of the water use data.

Also shown in FIG. 1 is another wireless communication means 54 from the water/energy monitoring and/or leak detection apparatus 10, 126, 200 for communicating water use and water energy use information to a governmental, civil or municipal employee or individual 60 using a second remote display/recorder 56 for governmental, civil, commercial or municipal operators or agencies purposes. Since the wireless communication means 52 is in not relatively close proximity to the water meter and leak detection system 10, 126, 200 this wireless means should consist of a longer-range technology such as Wi-Fi, however Bluetooth, ZigBee or similar wireless protocol technologies are also possible as Bluetooth, ZigBee or similar protocol technologies range technology is improving.

As shown in FIG. 1, but applicable to FIGS. 7 and 9-11, is another wireless communication means 46 is designed to communicate data under a cellular format technology with offsite central monitoring computer or cell, mobile or other telephone lines via satellite, microwave technology, the Internet, cell tower, telephone lines, and the like. Such cellular format could be CDMA, GSM or another cellular format. It is anticipated that the third wireless communication means 46 can transmit information to a programmed cell or phone number for communicating water parameter data or alarm situations to the home owner or a municipal/governmental agency (such as announcing a water leak situation). Also, the third wireless communication means 46 should include specific identification information e.g. house or commercial building address. The third wireless communication means 46 can send data on various frequencies, e.g. once per minute, once per hour, once per day, or can send information upon sensing the initiation (alarm situation) to the programmed cell or phone number. The request signal can be generated by, for example, a request signal transmitted by a remote station (not shown), cell phone, smart phone or similar apparatus or custom display and recording apparatus. The use of the request signal can minimize the use of wireless signals within the house or commercial building, conserving energy, minimizing the interference with other wireless devices, and reduce the exposure of wireless energy to individuals. Furthermore, the third wireless communication means 46 can consist of two-way transmission, commonly known as transceiver technology, such that the water use/energy use monitor and/or leak detection apparatus 10, 200 can transmit and receive electronic signals from the remote station, cell phone, smart phone or similar apparatus, or custom display and recording apparatus and similarly, the remote station, cell phone, smart phone or similar apparatus, or custom display and recording apparatus can transmit and receive electronic signals from the water use/energy monitor and leak detection apparatus 200. The wireless means 46 can also be designed for communicating to an offsite central monitoring computer or cell, mobile or other telephone lines via satellite, microwave technology, the internet, cell tower, telephone lines, and the like. The communication means 46 can also comprise a RF mesh-enable device (meters, relays) is connected to several other mesh-enabled devices, which function as signal repeaters, relaying the data to an access point. The access point device aggregates, encrypts, and sends the data back to a municipal or government agency over a secure commercial third-party network. The resulting RF mesh network can span large distances and reliably transmit data over rough or difficult terrain. If a meter or other transmitter drops out of the network, its neighbors find another route. The mesh continually optimizes routing to ensure information is passed from its source to its destination, as quickly and efficiently as possible. When the third cellular wireless means 46 is being used, the water use data can be routed through a Bluetooth, Wi-Fi, ZigBee or other technology source using a local router/server that transfers the water use data over the internet and remote servers, sometimes referred to as the "cloud", to communicate with cellular towers for data transmission. The third optional wireless communication can be either one-way transmission, or half duplex and/or full duplex two-way transmission. Conversely, signals and/or date can be transferred by cellular format (using a cell phone, smart phone or similar apparatus) from cellular towers to remote servers, sometimes known as the "cloud" and then over the internet to a local router/server in, a home or business.

The wireless communication means 52, 54 (and 46) is preferred to transit, upload or download water parameter data, software updates or information via a secure wireless communication network. It is anticipated that the wireless communication means 54 can received by a moving vehicle or can communicate with cell phone technology towers 44 using another wireless cellular communication means 46. This electronic communication also comprises, in part, a segment of the internet of things concept. The second wireless communication or wired communication means 54 or cell phone technology 46 can also electronically communicate with a local router/server which uses the Internet to communicate with remote computers (Cloud) to allow remote access of the water use data.

Wireless communication means 46, 52 and 54 preferably utilizes encryption, authentic, integrity and non-repudiate techniques to provide a secure transfer of the water and energy use from the water/energy use monitor and/or leak detection apparatus 10 to the first remote 50 and the second remote 54 or to a cell phone, smart phone or similar apparatus 400. Also, wireless communication means 46, 52 and 54 should include specific identification information e.g. house or commercial building address. The wireless communication means 46, 52 and 54 can send data on various frequencies, e.g. once per minute, once per hour, once per day, or can send information upon sensing the initiation (after no water use period) to the first remote 50, second remote 54 or cell phone, smart phone or similar apparatus 400. Furthermore, wireless communication means 46, 52 or 54 can send data or information upon the sending of a request signal or can send data or information on a schedule that is programmable. The request signal can be generated by, for example, the pushing of a requesting button located on the first 50 remote, second 56 remote or the cell phone, smart phone or similar apparatus 400 that transmits a request for water and energy use data to the water use/energy monitor and/or leak detection apparatus 10. The use of the request signal can minimize the use of wireless signals within the house or commercial building, conserving energy, minimizing the interference with other wireless devices, and reduce the exposure of wireless energy to individuals. Furthermore, the wireless means can consist of two-way transmission, commonly known as transceiver technology, such that the water use/energy monitor and/or leak detection apparatus 10 can transmit and receive electronic signals from the first, second remotes, 50, 56 or cell phone, smart phone or similar apparatus 400 and similarly, the first and second optional remotes 50, 56 and cell phone, smart phone or similar apparatus 400 can transmit and receive electronic signals from water use/water energy use monitor and/or leak detection apparatus 10, 200.

Of all smart meter technologies, one critical technological problems of the present invention are water use and leak detection data communication. Each meter may be able to reliably and securely communicate the information collected to a central location. Considering the varying environments and locations where present invention meters are found, that problem can be daunting. Among the solutions proposed are: the use of cell phone/pager networks, satellite, licensed radio combination licensed and unlicensed radio, and power line communication. Not only the medium used for communication purposes but the type of network used is also critical. As such one would find: fixed wireless, mesh network or a combination of the two. There are several other potential network configurations possible, including the use of Wi-Fi and other internet related networks. To date no one solution seems to be optimal for all applications. Rural municipalities have very different communication problems from urban utilities or utilities located in difficult locations such as mountainous regions or areas ill-served by wireless and internet companies.

Figure 14:
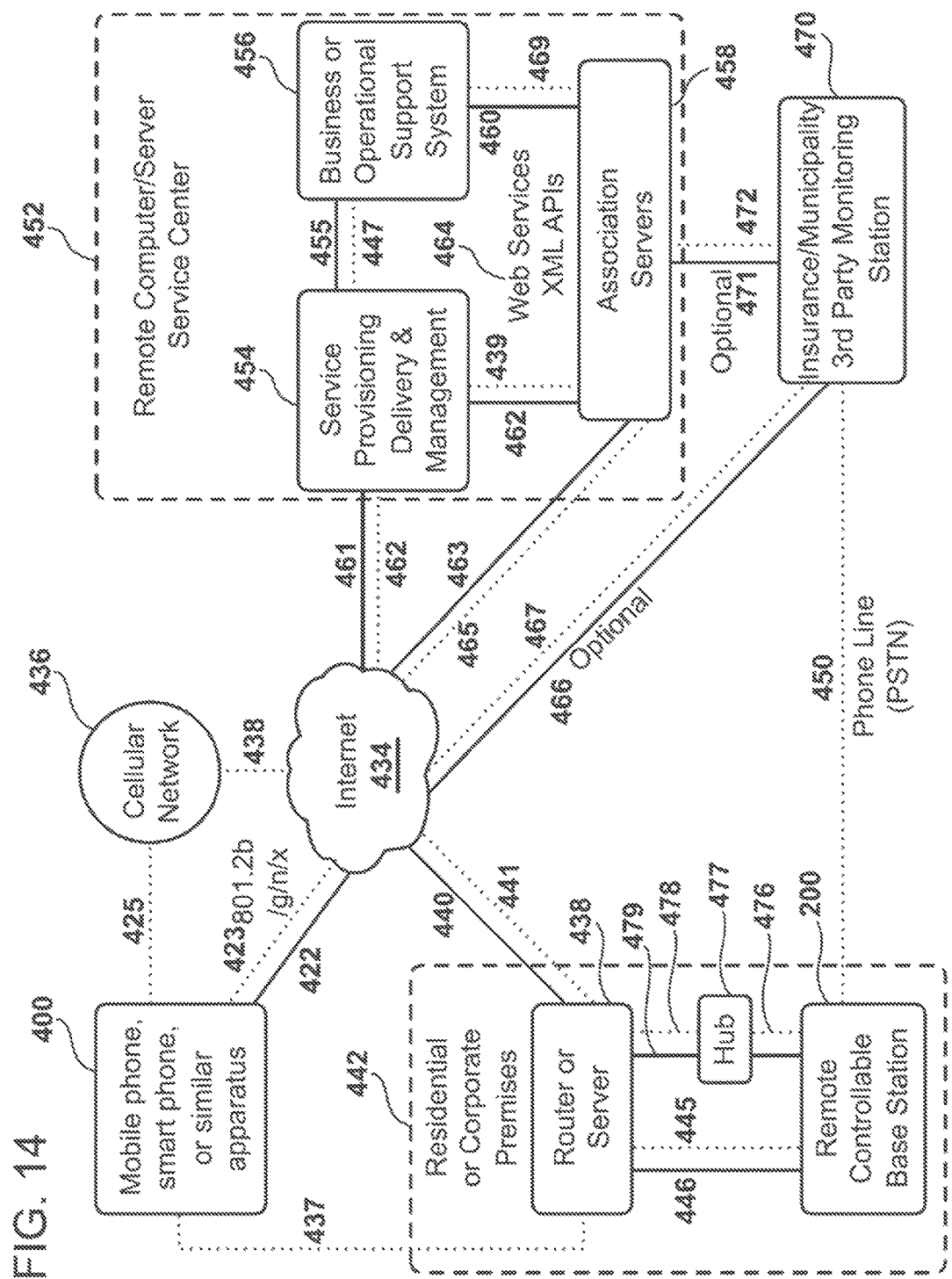
FIG. 14 is another block diagram of the more integrated system showing the software, hardware and applications of the home or corporate premises communicating with the remoter base station and communicating with the internet and remote computer service station ("the Cloud").

There is a growing trend towards the use of TCP/IP technology as a common communication platform for the present invention applications, so that utilities can deploy multiple communication systems, while using IP technology as a common management platform. Other solutions suggest the use of a single, universal connector separating the function of the smart grid device and its communication module. A universal metering interface would allow for development and mass production of smart meters and smart grid devices prior to the communication standards being set, and then for the relevant communication modules to be easily added or switched when they are. This would lower the risk of investing in the wrong standard as well as permit a single product to be used globally even if regional communication standards vary. The cell tower or other communication means can be used to transfer or download water parameter data from a residence/commercial operation, or well operation, to a remote monitoring site, or used to upload data, information or software updates to the water meter and leak detection system 10, 126, 200. As shown, FIGS. 16-17 and 18A is an "APP" or another "APP" page which can show, in a pie chart, bar chart, or other format, show the individual water use at particular areas of the home, building or company for example, the showers, the kitchen faucet, the bathroom faucets, the bathroom tub, the bathroom toilets, the washing machine, water heater, dishwasher, and/or the outside irrigation system. In addition, outdoor water uses such as a pool water maintenance (water addition), Jacuzzi, and water fountains can be included for water use monitoring. The individual water use in different areas of a house, building or company can be transferred to an owner, individual user, corporate responsible individuals, government agencies or municipalities to review water use and water conservation information on a remote device, such as a cell phone, smart phone, or similar apparatus, or to a remote computer. As shown in FIGS. 6-10, and as shown in FIGS. 14 and 18B is an "APP" or another "APP" page which can show is an "APP" or another "APP" page which can show Leak sensor and water sensors (e.g. pressure sensor) can be incorporated together or function as separate devices, or a highly sensitive water sensor can also function as a leak sensor and then functions to transfer individual water use in different areas of a house and transfer this data and leak alarms to an owner, individual user, corporate responsible individuals, government agencies or municipalities to review water use and water conservation information on a remote device, such as a cell phone, smart phone, or similar apparatus, or to a remote computer. This technology can also be applied to corporations which have various water connected apparatuses that need to be monitored for water flow, water use, and water energy use, and water leaking conditions. A pressure sensor or other type sensor can be incorporated with the water/energy use monitor and/or leak detection apparatus 10, 126, 200 to measure a drop in the water pressure when the control valve should be turned off to determine is a home, building or company has any leaking devices.

In addition, the water leak monitoring capability of the present invention, described below, can use the cell tower or other communication means to communicate an alarm or message that a leak has developed in the residential/commercial or well water system. This leak identification means can call either a programmed cell or phone number, or can send the alarm or message to a governing utility or municipality. If the water use/water energy use monitor and/or leak detection apparatus 10, 200 if appropriately preprogrammed, the water system with observed leak will be turn off automatically. Alternately, when the leak signal is transferred to a cell phone, smart phone or similar apparatus 400, a soft or hard button option can be display that allows the user to determine and selectively turn off the water system upon the leak observation.

In addition, it is anticipated that the sensor analog (or digital) data that is communicated either through direct wiring or through a wireless 46, 52, 54 means that is then amplified by a circuit and connected to the CPU, microprocessor and/or microcontroller 84 through one of the analog-to-digital modules (if necessary). It is also anticipated by the Applicant that the receiving station or display means 56 and 400 will be located remotely from the sensor and CPU, microprocessor and/or microcontroller 84 with data transfer means 83 communicated wirelessly. Hence, the data transfer means 83 can be used to transfer water parameters to remotely positioned receiver receiving station. It is also possible to have a local data means 46, 52 and/or 54 together with a remotely located data receiver apparatus and either wired or connected wireless to the wireless water meter system 10, 126, 200. The data transfer means 46, 52 and/or 54 can use various radio-frequency, Bluetooth, ZigBee, Wi-Fi, optical or other wireless technology for transferring the water parameter data generated by the sensors and collected by the microprocessor and sent to a wireless to a remotely positioned receiving station or receiver apparatus 50, 56 and/or 400. Remotely positioned receiving station or display/receiver apparatus 50 56 and/or 400 can have the function allows an individual or entity to review that data for auditing or monitoring purposes. Examples of Bluetooth modules (using the 2.4 GHz band as Wi-Fi) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., and/or the BT-21 module from Amp'ed RF wireless solutions in San Jose, Calif. and examples of the Wi-Fi are the Photon manufactured by Particle, Inc. and numerous other manufactures. An example of the cellular technology is the Electron manufactured by Particle, Inc. and other manufactures. Examples of wireless protocols that can be utilized with the present invention include, but are not limited to, the IEEE 802.11a, IEEE 802.11b, IEEE 802.11g and IEEE 802.11n modulation techniques. Another example of the wireless protocols that can be utilized with the present invention is the ZigBee, Z-wave and IEE 802.15.4 modulation technology. Examples of cellular technology and protocols as CDMA and GSM and other cellular protocols. Applicants recognize that there are numerous wireless protocols that have been developed that, although not specifically listed, could be utilized with the present invention for data transfer purposes.

In addition the wireless or wire data transfer can be connected to the Internet using the IP or DHCP protocols whereby the data can be monitored remotely over the Internet using a software program designed to record, display, analyze and/or audit the water parameter data. The present invention would probably have to "log on" to a server to report the water parameters or it could respond to queries once its presence is known to the server.

Also some wireless routers support a form of "Private" point-to-point or bridging operation which could be used to transfer water parameter data from the present invention to a receiving apparatus. Other kinds of proprietary protocols to be used with the present invention are possible as well. For example, there is the ISM (industrial, scientific and medical) bands. The ISM bands are defined by the ITU-R in 5.138, 5.150, and 5.280 of the Radio Regulations. Individual countries' use of the bands designated in these sections may differ due to variations in national radio regulations. Because communication devices using the ISM bands must tolerate any interference from ISM equipment, these bands are typically given over to uses intended for unlicensed operation, since unlicensed operation typically needs to be tolerant of interference from other devices anyway. In the United States of America, ISM uses of the ISM bands are governed by Part 18 of the FCC rules, while Part 15 Subpart B contains the rules for unlicensed communication devices, even those that use the ISM frequencies, Part 18 ISM rules prohibit using ISM for communications.

The ISM bands defined by the ITU-R are

| Frequency range [Hz] | Center frequency [Hz] |
| --- | --- |
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

While, currently the 430 MHz and 900 MHz frequencies are commonly used in the US, it is anticipated by the Applicants that the other frequencies could be used or water parameter transfers.

Cell phones, smart phones and similar apparatus 400 receive and transmit electromagnetic waves that exist between 800 and 2400 megahertz and the two most popular protocols are CDMA and GSM.

Another protocol known as CAN or CAN-bus (ISO 11898-1) that was originally designed for automotive applications, but now moving into industrial applications is another type of network that could be used to transfer water parameter data. Devices that are connected by a CAN network are typically sensors, actuators and control devices. A CAN message never reaches these devices directly, but instead a host-processor and a CAN Controller is needed between these devices and the bus.

Furthermore, the present invention can communicate utilizing optical technology and other wireless networks such a cell phone technology or private networks. The transfer of data or information through wired or wireless technology can be initiated using a "wake up" button or signal from the first, the second remote display/recorder or the cell phone, smart phone or similar apparatus.

Figure 6:
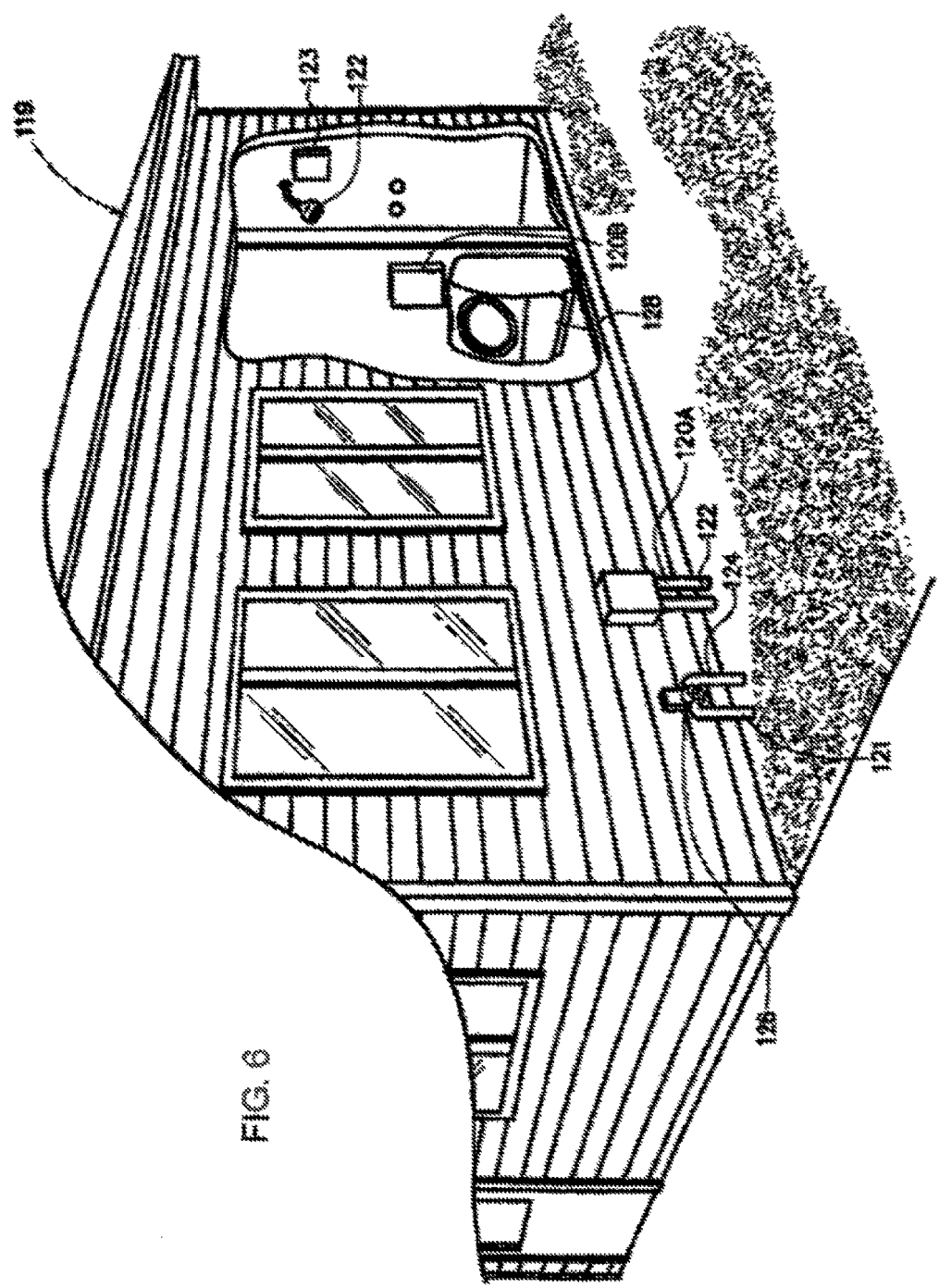
FIG. 6 is a perspective view of a plurality of water parameter transceivers attached to various locations for monitoring water use.
Figure 7:
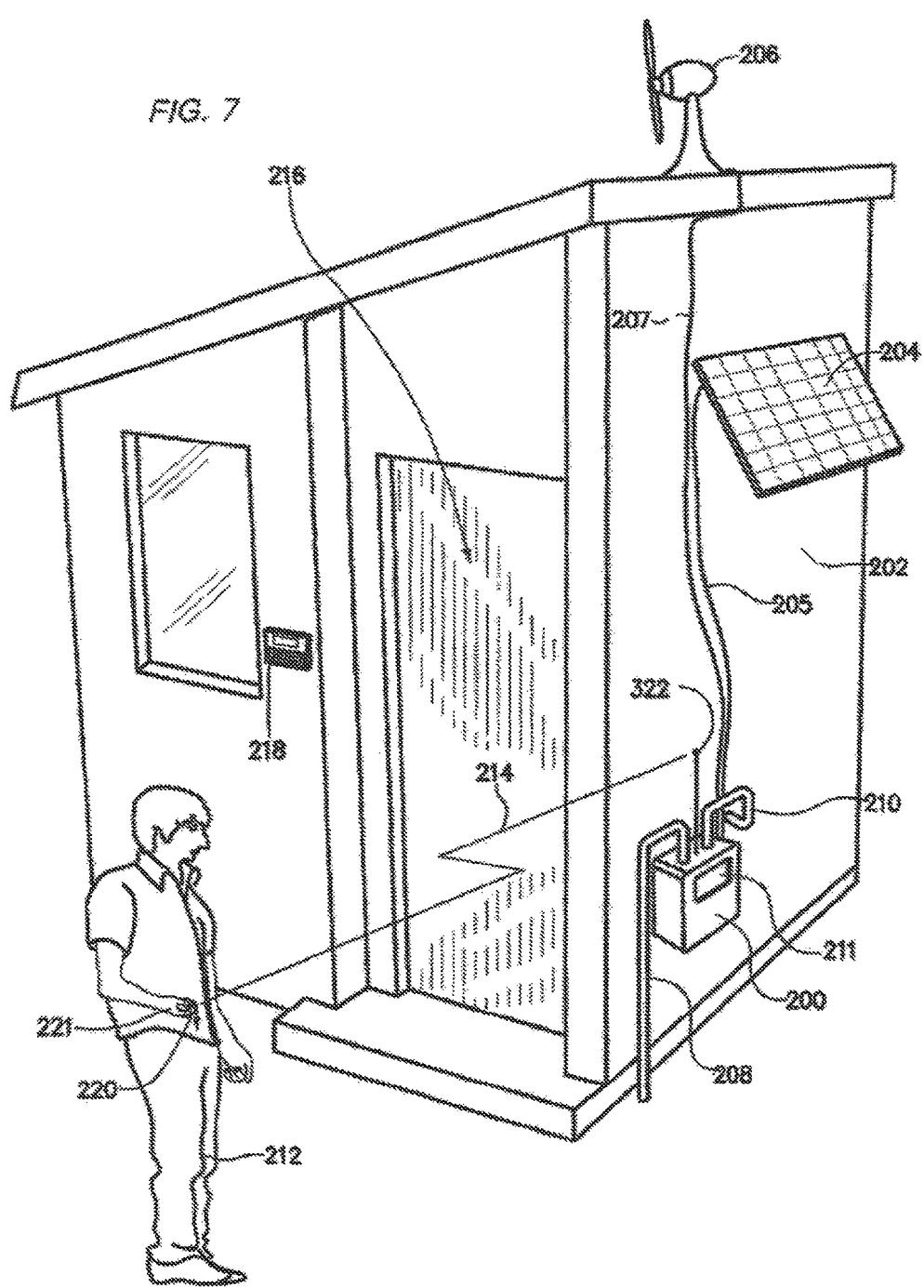
FIG. 7 as a perspective more detailed view of the base station having a water flow sensor, an optional water control mechanism, wireless communication means and water supply plumbing with optional water turbine generator and/or solar cell panel and is location within the water supply line.
Figure 15:
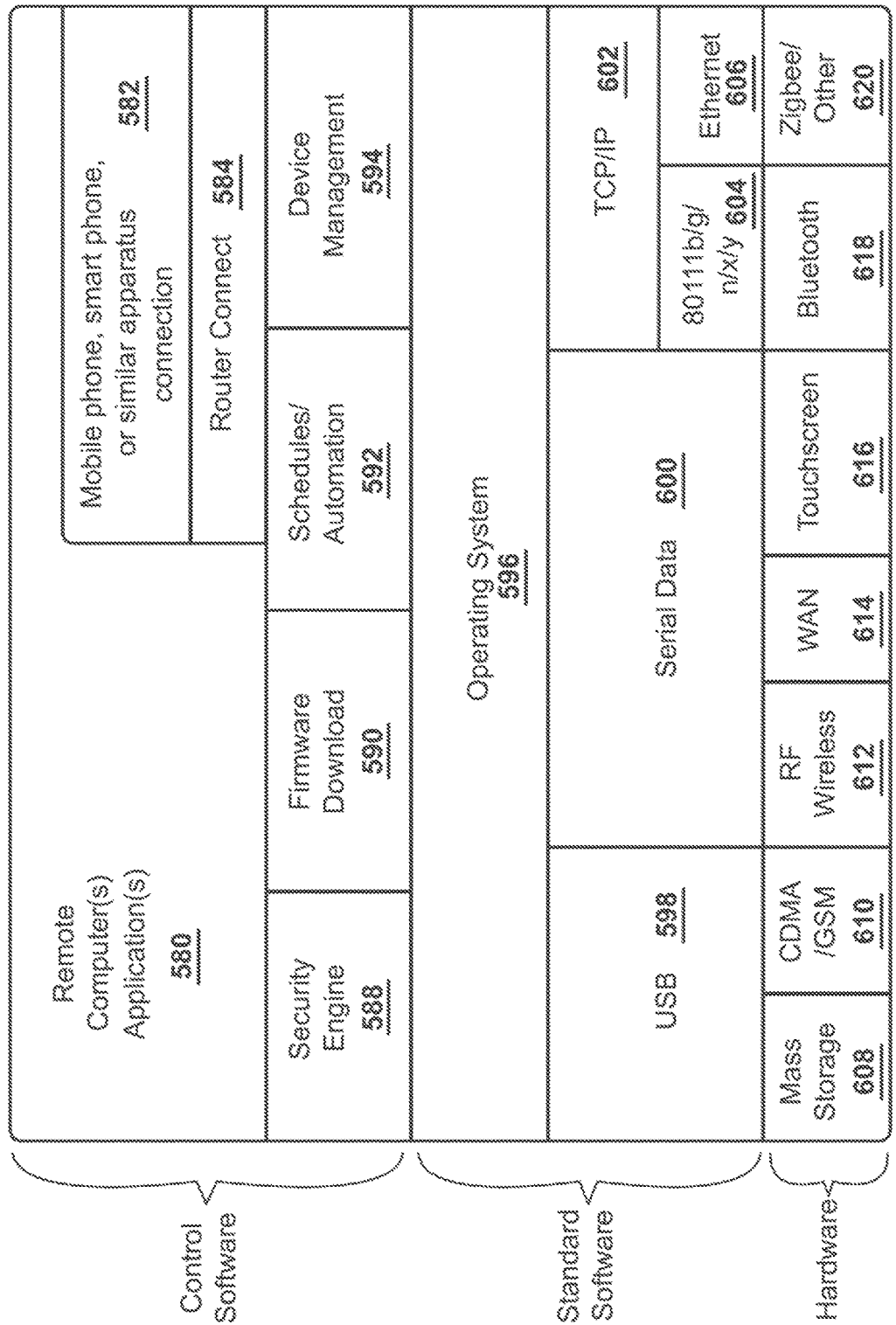
FIG. 15 is a block diagram of gateway components of the present invention.

There are many transfer protocols that may be used to communicate, and transfer water use and water quality data or information with the water meter and leak detection apparatus 10 (126 shown in FIGS. 6 and 200 shown in FIGS. 7 and 15). This list includes XML technology, Direct Internet Message Encapsulation ("DIME"), Simple Object Access Protocol (SOAP) a HTTP data message to an unsolicited HTTP request, a Rest-API protocol or other supervisory control and data acquisition protocol that provides a control system architecture and/or protocol where a response can be incorporated into another protocol or format.

The water meter and leak detection apparatus 10 (126 shown in FIGS. 6 and 200 shown in FIGS. 7 and 15) will require The transfer of water use and water quality data or leak detection information using security measures due to violation of municipal or governmental laws and ordinances, and for obstructing fraudulent activities.

There are several important security techniques that taken as a whole, or in part, function to met the objectives to, including authentication, integrity, encryption and non-repudiation that provide secure communications.

Two of the best-known uses of public key cryptography are the Public Key Encryption (PKE) and the Digital Signature protocols. PKE is a message or command signal that is encrypted with a recipient's public key. The message cannot be decrypted by any individual or machine that does not possess the matching private key. PKE is a security protocol that is used to maintain confidentiality. Similarly, Digital Signatures are messages or control signals that are signed with the sender's private key and that can be verified by any individual or machine that has access to the sender's public key. This verification proves that the sender had access to the private key, and therefore is likely to be the proper individual or machine to gain access to the message or command signal. Usually a one-way hash is utilized, which is defined as small portion or section of data that can identify and be associated a large volume of data or information that also provided authentication and integrity security measures. Hash functions are known to be resistant to reverse engineering (Secure Hash Algorithm). The Digital Signature protocol also ensures that the message or command signal has not been tampered with, as the original Digital Signature is mathematically bound to the message and verification will fail for practically any other message or command signal. Both PKE and Digital Signatures protocols can be used with the water meter and leak detection apparatus 10 (126 shown in FIGS. 6 and 200 shown in FIGS. 7 and 15). The strategy of PKE is that each user has a pair of keys; first, a public encryption key, and second, a private decryption key Various encryption algorithms include the original RSA algorithm, Advanced Encryption Standard (AES), Data Encryption Standard (DES) and Triple DES.

Secure technologies include the Secure Sockets Layer ("SSL") which creates a secure connection between two communicating programs or applications. SSL is a standard security technology for establishing an encrypted link between a server and a client-typically a web server and a mail server or a mail client (e.g. Gmail). SSL uses encryption algorithms to scramble data while in transit, preventing hackers from reading it as it is sent over the internet or other connection. The SSL protocol are commonly utilized by web browsers and web servers in conjunction with HTTP protocol to perform cryptographically secure web transactions. Transport Layer Security (TLS) is an example of an updated, and more secure, version of SSL. A web resource retrievable with HTTP over SSL is usually represented by the protocol identifier "https" in the URL. Secure HTTP (S-HTTP) provides independently applicable security services for transactions using confidentiality, authenticity and integrity technology.

Another security technology is the Internet Protocol Security ("IPSec") which protects internet protocol traffic across the Internet and is particularly useful for implementing VPNs that utilized tunnel and encryption techniques. IPSec originally utilized an IP authentication header. IP encapsulating security payload was an optional packed header that can provide superior confidentiality through encryption of the packet. Point-to-Point Tunneling Protocol ("PPTP") is another secure protocol that allows entities to extend their local network through private "tunnels" over the Internet. Layer Two Tunneling Protocol ("L2TP") is an extension of the PPTP protocol.

A Media Access Control Address ("MAC Address") is a unique number assigned to a network interface controller for communications with the data link layer of the Open Systems Interconnection Model (OSI Model) The MAC address is appended to a digital message and provides authentication and integrity for the message.

A further security protocol, the eXtensible Markup Language (XML) Signature associates a cryptographic signature value with Web resources using XML markup. XML signature also provides for the signing of XML data. Javascript object notation (JSON) has become more popular alternative to XML for various reasons, for example, JSON is less verbose than XML which uses more words than necessary and JSON is faster-parsing whereas XML software is generally slow and cumbersome.

The water meter and leak detection system 10 (126 shown in FIGS. 6 and 200 shown in FIGS. 7 and 15) should communicate securely with remote displays/recorders 52, 54 or cell phone, smart phone, or similar apparatus 400 and therefore they need to be provided with unique identities. The identity must not be easy to detect either intentionally or accidentally.

Residential and corporate location identity are particularly relevant in multi-site scenarios, where the water meter and leak detection apparatus 10 (126 shown in FIGS. 6 and 200 shown in FIGS. 7 and 15) are aggregated across a wide geographic area containing multiple sites, serviced by multiple utilities, each site operating on one or more municipal agencies. each water meter and leak detection apparatus 10 (126 shown in FIGS. 6 and 200 shown in FIGS. 7 and 15) will need to identify itself when transmitting water use or water quality data or information, or queried by a civil, commercial, municipal or governmental operator or agency.

Each the water meter and leak system apparatus 10 (126 shown in FIGS. 6 and 200 shown in FIGS. 7 and 15) will have its own identification means that will be recorded in a remote database. The identification can be the Media Access Control (MAC) address (OSI data layer), internet TCP/IP address (OSI transport and network layers), private or public property(ies) building address or users email address or incorporate a distinctive set of numbers or characters associated with a particular municipality or governmental agency.

It is essential that no two water meter and leak detection systems 10 (126 shown in FIGS. 6 and 200 shown in FIGS. 7 and 15) will have the same identity within a specific geographical area. It might be also be preferred that the entity municipality or authority name become a portion of the unique identification code. During the fabrication process, the unique identification code could include adding a unique municipality or authority name code in the water meter and leak system apparatus 10 (126 shown in FIGS. 6 and 200 shown in FIGS. 7 and 15) or software downloaded upon installation or inserted during a repair or maintenance periods.

Public Key Infrastructure (PKI) can also be used in sensor/device to remote receiver situations where encryption and authentication techniques are required. However, many companies and governmental agencies replacing PKI with a two-step authentication procedure using recorded personal information including alternate email addresses and telephone numbers.

A unique identification code registry is maintained within a remote database that is associated with the installation and operation of the water meter and leak detection system 10 (126 shown in FIGS. 6 and 200 shown in FIGS. 7 and 15). The unique identification code registry may be updated whenever a water meter and leak detection system 10 (126 shown in FIGS. 6 and 200 shown in FIGS. 7 and 15) is brought into or removed from service. The unique identification code registry may be incorporated into the relevant remote database with a unique host name (municipality or governmental agency) or installation region encoded within unique identification code. This would result in several databases that are unique to a given municipality, governmental agency or geographic region. Alternatively, the unique identification registry can be implemented as a single large database. The registry can be implemented as a relational database (e.g. MySQL, MariaSQL), non-relational database (e.g. Amazon DynamoDB), XML files, Comma Separated Value (CSV) Excel files, or Resource Description Files (RDF), or any mechanism that allows associated verification when combined with the appropriate software analysis. The unique identification registry enforces distinctiveness, thereby preventing two water meter and leak detection system 10 (126 shown in FIGS. 6 and 200 shown in FIGS. 7 and 15) from having the same unique identification code.

Encryption, authentication, integrity and non-repudiation may be important characteristics when the water meter and leak detection system 10 (126 shown in FIGS. 6 and 200 shown in FIGS. 7 and 15) is transferring water use or water quality data or information to a remote server/database via a public or private network that provide wireless subsequent access to registered computers and cell, smart and mobile phones 400. When water meter and leak detection system 10 (126 shown in FIGS. 6 and 200 shown in FIGS. 7 and 15) receives or uploads data and information such as a control command signal to send or transmit data and information it is critical that the device can authenticate the sender and be sure of the integrity of the data and information. Encryption provides privacy by converting the data or information into an "encrypted" code to prevent unauthorized access. Encryption can be provided point-to-point, or end-to-end, and transmit messages using encryption schemes such as Pretty Good Privacy (PGP), Secure/Multipurpose Internet Email (S/MIME), XML, or SSL encryption protocols. Non-repudiation prevents the sender from denying that they sent or received data/information or a message. Non-repudiation can be provided by signing, electronic witnessing and technologies that assert a document was read before it was signed. One of the main advantages of the Block Chain technology is that non-repudiation is nearly immutable. Here, the water meter and leak detection system 10 (126 shown in FIGS. 6 and 200 shown in FIGS. 7 and 15) can include digital signature technology, data packets or messages using PGP, S/MIME, XML Signature or TLS/SSL to provide for non-repudiation of those messages, information or data.

The water meter and leak detection system 10 (126 shown in FIGS. 6 and 200 shown in FIGS. 7 and 15) will transfer data to remote computers or servers whereby an user can obtain water use data or water quality information on a predetermined or programmed frequency. This update The frequency can be programmed for various time periods, e.g. once per minute, twice per hour, once per day, once per week, once per month or once per year or can be transfer to a remote computer/server and accessed by a cell phone, smart phones, mobile phone, computer or other mobile electronic communication device. Also, when the data or information can be processed by an automated system and reports are only created every day, or week, or month, there is some flexibility when the data must be sent. The water meter and leak detection system 10 (126 shown in FIGS. 6 and 200 shown in FIGS. 7 and 15) can be programmed to communicate at other time frequencies, such as every 5 seconds or every minute, for various purposes, for example, to identify leaking conditions. In this case, data transfer and signature calculations can be executed only when there is free processing time. This scheme performs well with the water meter and leak detection system 10 (126 shown in FIGS. 6 and 200 shown in FIG. 7) where important real-time calculations can take up significant available calculation time for small periods, but over time periods of a few hours there is processing time to spare.

In an alternate embodiment, the encrypted data is transmitted optionally to a local router/server and then across the Internet or cell tower technology, or via directly to a public or private network as it has been described herein.

The water meter and leak detection system 10 (126 shown in FIGS. 6 and 200 shown in FIGS. 7 and 15) can include a removable or a non-removable storage device that can contain water use or water quality data. This removable storage device may be removed when there is a disruption in wireless transmittal of data, to upgrade configuration programs, or to download stored data. The water meter and leak detection system 10, (126 shown in FIGS. 6 and 200 shown in FIG. 7 an 15) may be fitted with a physical lock that prevents unauthorized individuals from detaching the removable storage device.

Currently it is difficult for a resident or commercial water used consumer to confirm calculations, source water registers information to validate their water use. A resident or commercial water use consumer will have the capability to compare the data generated by the water meter and leak detection collection node and communication hub at their site with the billing statements from a civil, commercial or municipality.

Software may be designed to validate digital signatures before water use or water quality data or information can be downloaded or allow registered users to upload updated software and/or firmware. The water use data, updated software and/or firmware may incorporate its own code (e.g. RestAPI) to verify digital signatures to ensure that the original software and/or firmware has not been tampered with and is from an authorized source. The uploaded firmware or software can be written in various languages, to name a few, such as Java, JavaScript, NodeJS, Prolog, Haskell, binary executable code, C+ and C++, and ECNA Common Language Runtime ("ECMA CLR"). In additional, the water meter and leak detection system 10 (126 shown in FIGS. 6 and 200 shown in FIG. 7) or the remote display means 18, 50, 56, or computer, cell, smart or mobile phone 400 could include a microprocessor that has a data memory bank with data memory that stores the water use data that can be compared with the data that has been transferred and uploaded by the government or municipal second remote display/recorded means 56.

In operation, before water meter and leak detection system 10, 126, 200 can transmit data or information to the remote/display apparatus, it must verify that the display/remote is authorized to communicate with the present invention.

In addition, any stored data, including cached data and to stored in a database, is tagged with a digital signature. When the data is retrieved, the digital signature can be used to verify that the data has not been tampered with over time.

Figure 2:
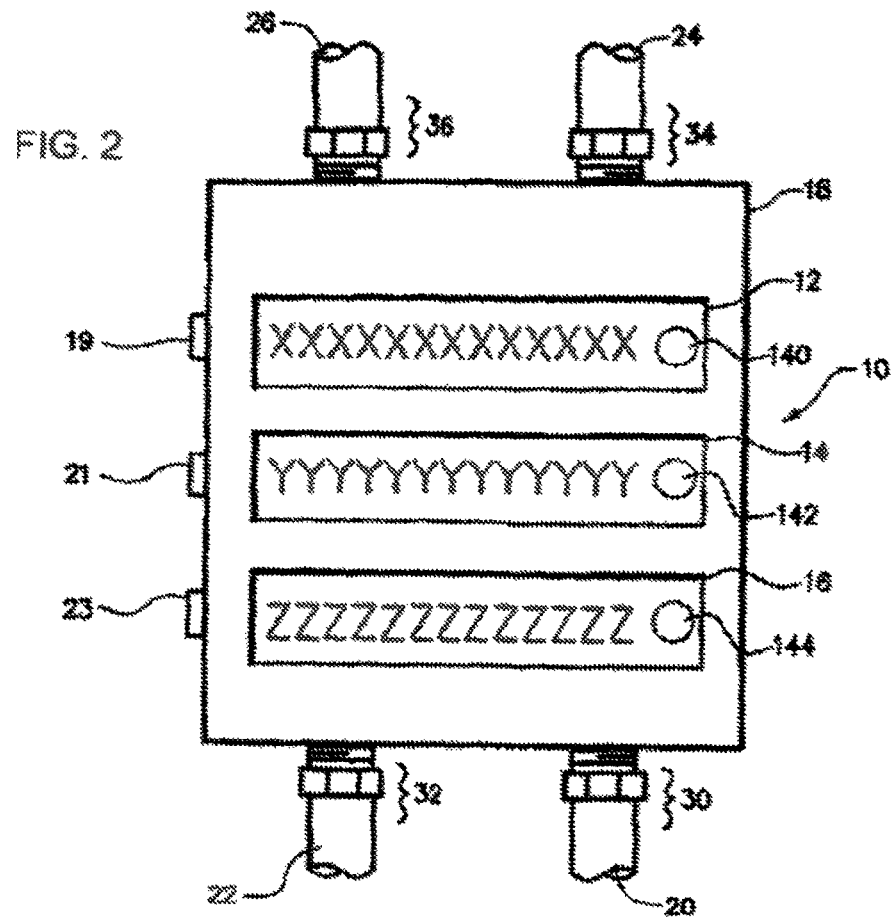
FIG. 2 is a front view of an optional display apparatus base showing input hot and cold water supplies lines and output hot and cold water supply lines with a display means having one or more display screens and a plurality of hardware and/or software buttons.

Referring now to the drawings and particularly to FIG. 2 is a perspective view of the first embodiment comprising an optional primary or secondary water meter and leak detection system 10, 126, 200 attached to the cold and hot input water supply piping 14 and the cold and hot output water supply piping. The first embodiment of the display apparatus 18 is designed to become attached to water supply piping in easily installation and aesthetically pleasing format. In the first embodiment, the water meter and leak detection system 10, 126, 200 should be installed near the hot and cold or ambient water sources before any distribution lines such that the total volume or quantity of hot and cold or ambient water can be monitored and recorded. In the second embodiment where only the ambient water use is monitored, the present invention water parameter use display and monitoring device can be installed near the cold or ambient water source or line before the hot water generation device and before any distribution lines such that the total volume or quantity of cold or ambient water can be monitored and recorded. It is anticipated by the Applicant that the second embodiment of the present invention water parameter use display and monitoring device can serve as the primary water meter at residential or commercial facilities. The components of the first embodiment of the present invention include a plurality of water pipe joint unions or sections 18 and a housing section 20 containing the power source with a water proof removable cover 24, a computer apparatus and first 32, second 34 and third 36 parameter display mechanisms.

The plurality of water pipe unions or joints 30, 32, 34 and 36 can be fabricated from typical metallic piping materials such as brass, brass alloys, steel, galvanized steel, copper, copper allows or any combination thereof. The water pipe joint, can be fabricated from a number of polymeric materials, such as polyvinyl chloride (PVC), polyethylene, polybutylene, acryaontirile-butadiene-styrene (ABS), rubber modified styrene, polyplopylene, polyacetal, polyethylene, or nylon. The base material can be painted white or colored finishes or coated with various brass, silver and gold type materials to accommodate the match with various presently marketed finishes. As shown in FIG. 2, the water union or joints 30, 32, 34, and 36 generally have a female thread (not shown) within the input end for engaging the male treads of a typical water supply lines 20 and 22 and water delivery lines 24 and 26. For certain applications, the male/female thread locations can be changed to accommodate certain attachment forms or specifications. In addition, other attachment means, such as adhesive, snap fit joint, compression fitting, flare fitting or other technologies can be employed.

The material for fabricating the water pipe union or joint 30, 32, 34 and 36 is not particularly important except that the union or joint has to engage the water supply and delivery lines with a relatively water tight seal, and that preferably there should be a sealing means that functions 1) to secure in place, any parameter sensors that are projecting into the water stream and 2) to provide a water-tight seal that can prevent any water from penetrating past the seal and 3) include structural integrity to withstand continuous water pressure and other forces. Various washer designs fabricated from compounds of rubber, urethane, elastomeric or thermosetting polymeric compounds have been disclosed and are in present in similar uses. Seal and sealing technology is well known in the art. The joint between the water pipe union and the water supply and delivery lines could be screw and thread technology snap fit, compression fitting, flare fitting, or use adhesive technology. For example, in the case of fabricating with a metallic component, a solder, brazed, or sweat joint could be used. For example, in the case of polymeric the extending or articulating could be an extension of the display apparatus manufactured by molding, heat bonding, or adhesive technology. The joint may be designed to be permanent or removable.

Further referring to FIG. 2, the water use/water energy monitor and/or leak detection base station or apparatus 10, 200 includes a housing 18, a computerized circuit board (depicted in FIG. 3), the display means housing having an optional water tight door for replacing or regenerating the power source or removable data chip and a plurality of buttons or activators 19, 21, 23 that allow for certain modification of the software instructions (change units, change language, change from metric to US standard, set alarms). The housing 18 can be fabricated from a metallic material such as brass, brass alloys, steel, galvanized steel, copper, copper allows or any combination thereof. The display means housing can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes. The material for fabricating the housing 18 is not particularly important except and the size of the display means will generally determine the size of the housing but it does not have to be substantially rectangular as shown, any number of geometric configurations could be used in the present invention.

The plurality of optional display means 12, 14, and 16 and as presented in FIG. 2 utilizes one or more illuminating technologies, such as LCD, LED, gas plasma, fluorescence, incandescent, halogen, halide, or other lighting technologies but should be able to provide sufficient lighting for observing the data and information in dark conditions. In addition, the display means and display means housing should be able to sustain capability in moist wet conditions. The present invention can include one or more than one display means to show various water use and water energy use parameters. For example, the second embodiment with only the flow and water use display can be manufactured to reduce overall costs. Furthermore, the orientation of the water use and water energy use parameters can be presented in various formats. For example, the flow parameter can be on top with the date parameter on the bottom and with the energy parameter sandwiched between. The displays 12, 14, and 16 can have a background light that is used for various purposes, for example, for providing better lighting conditions or changing color e.g. from green to red, to display an alarming condition (e.g. water use over time has exceed a certain level). Displaying of all water and water energy parameters can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters and water energy parameters one at a time with a specific delay and sequencing. An example of a LCD unit that can be used with the present invention is the color graphic 128>128 LCD-00569 marketed by Sparkfun Electronics in Boulder, Colo. Digitikey, Mouser and other electronic supply warehouses have many other variants and other LCD, LED, gas plasma, fluorescence, incandescent, halogen, halide, or other lighting technologies that can be utilized with the present invention.

The optional display means 12, 14, and 16 can be programmed to display one or more parameters in a visual means that can be either an analog, character or digital display, or combination of display means. Information obtained from the appropriate sensor monitoring or measuring the water parameters such as temperature, date/time, and flow rate can be displayed in an appropriate format on the display means. For example, when a sensor is monitoring or measuring the rate of water flowing from a water source or through the shower head, the display means could show any flow between zero gal/min (0 liters/min) to many thousands of gals/day. For example, when a sensor is monitoring the shower temperature of water flowing through the housing, the display means could show any energy ratio calculation that takes into effect the overall temperature and total volume of heated water vs. the total volume of cold or ambient water. It is anticipated by the Applicant that many different water energy calculations might be utilized by the present invention. Furthermore, display can be programmed to display calendar information, such as the date and current time (12 hr. or 24 hr. format). Water energy use was defined herein as to the ratio of cold or ambient water use to heated water use or to the ratio of hot water use to total water use. However, the Applicant contends that many other water energy calculations can be programmed for use with the present invention. For example, a commonly known energy calculation such as the "Energy Factory" which includes the ratio of useful energy output from the water heater to the total amount of energy delivered to the water heater might be used with the ratio of total volume of hot water (including the temperature of the hot water monitored over a time period) and total volume of cold or ambient are taken into consideration, resulting in another energy calculation. There are some websites (paystolivegreen.com) that provides a water and energy calculator which could be used with the present invention (see FIG. 16).

The Applicant contends that many different water energy calculations can be used with the present invention without deviated from its intended use.

It is anticipated by the Applicant the present invention can be fabricated and marketed with one, two or more display means. For example, a lower cost display assembly can be fabricated and sold that only has a temperature sensor and temperature display means. A more expensive display assembly can be fabricated and sold that has temperature, flow, timing and other sensors with various programmed methods and a shut off mechanism.

Also shown in FIG. 2, one or ore ergonomically 19, 21, and/or 23 placed buttons or activators can be incorporated into the display means housing to allow the modification of certain parameter units (e.g. metric to US), set alarm conditions (e.g. flow/volume rate-set points), or to program certain settings, e.g. over water use alarm, monitor continuous leakage (valve not complete shut off). The buttons will electrically communicate with the electronic circuit board contained with the housing 18 and respond to programmed instructions integrated within the CPU or microprocessor and associated circuitry of the electronic circuit board. The buttons or activators 19, 21 and/or 23 should be mounted with the display means housing 18 with the capability to protect the buttons and electronic circuitry with the housing for exposure to moist and wet conditions.

A visual alarm or signal can be incorporated into the present invention whereby a preset alarm or programmed alarm, changes the one or more of the screen displays, for example, blinking a parameter, or changing the color of a parameter (green to red). For example, one or more displays can exhibit a first background or text color (e.g. green) when a first volume range of water use has been monitored. After a second volume range of water use has been monitored, the one or more displays can exhibit a second background or text color (e.g. yellow). And when a third volume range of water use has been monitored, the one or more displays can exhibit a third background or text color (e.g. red) when a third volume range of water use has been monitored.

A preset alarm might include visual reference, for example, an in-operative condition, broken sensor, low power source and some default limits. Programmed visual alarms would allow for individual selection (e.g. volume over set point, flow rate set point, total volume exceeded set points) which might be restricted or not by the default settings.

In addition, an auditory alarm can be incorporated into the present invention whereby a preset alarm or programmed alarm, changes the screen display, for example, using sound or pulsing a specific noise, or changing the color of a parameter. For example, the temperature display can change from, green to red when a preset temperature is crossed. A preset alarm might include visual reference, for example, an in-operative condition, broken sensor, low power source and some default limits. Programmed auditory alarms would allow for individual selection (e.g. temperature over set point, time past set point flow rate set points) which might be restricted or not by the default settings.

In addition, the present invention can include water shut off means (not shown) to turn off the water supply if an alarm condition or setting point is exceeded and has been activated. The water shut off means is electrically connected to the CPU or microprocessor and the power means such the computer controls the application of electrical power to activate or de-activate the water shut off means. The water shut off means can comprise, for example, a typical ball valve or solenoid shut off valve incorporate into the connection union such that water from the source is closed. The water shut off means can be activated if an alarm state has been achieved, e.g. 200 gals/day of water is exceeded or a total of e.g. 100 gallons of water has flowed in an unusual duration since the water source was opened. The alarm or settings can be a default setting installed by the manufacturer or programmed by the user.

Figure 3:
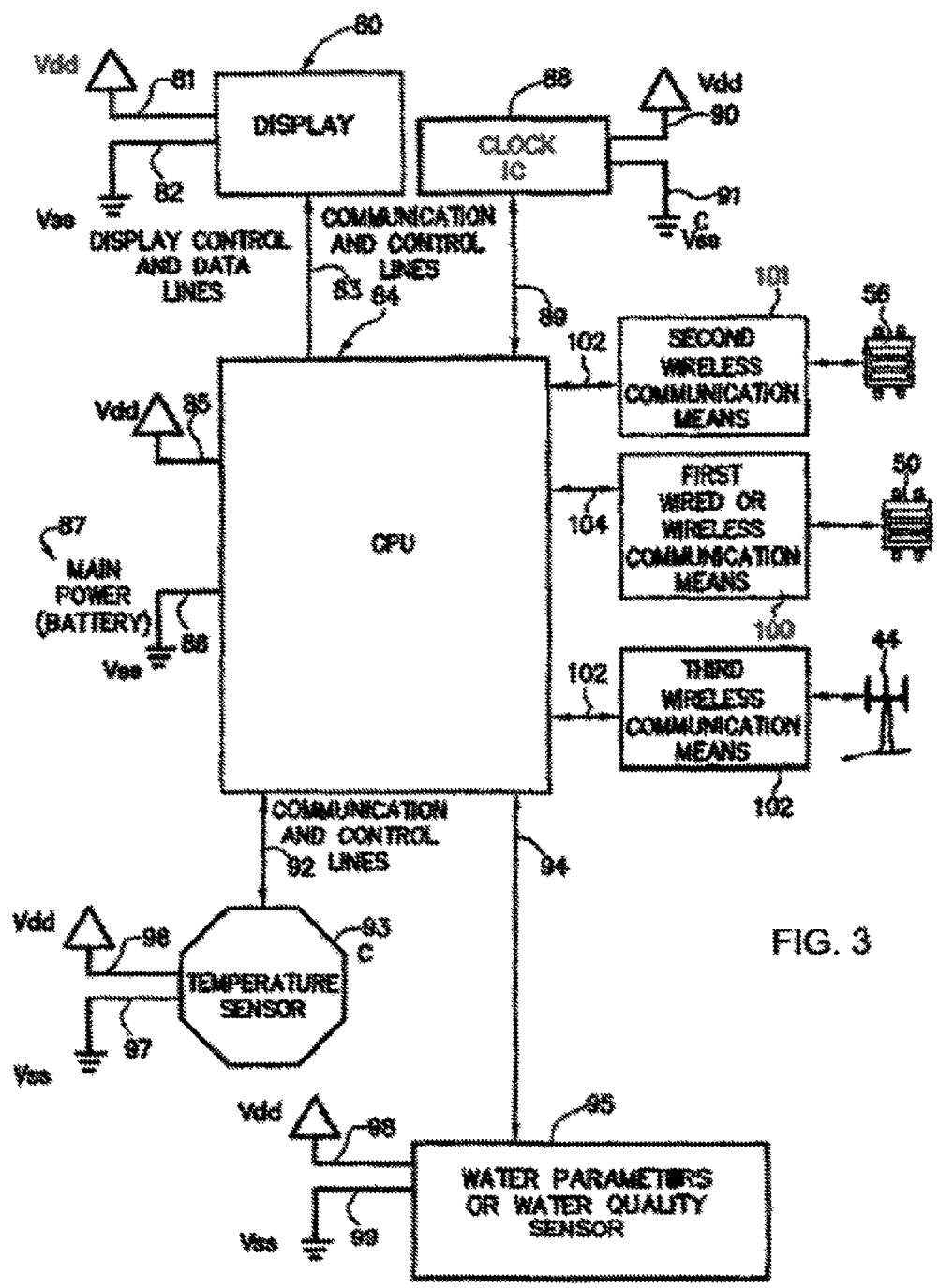
FIG. 3 is an electrical schematic showing the main power, CPU or microprocessor, the analog or digital optional display means, the clock circuit, the temperature sensor, a flow sensor and/or water quality sensor(s) and a first, second and third wireless communication means.

Now referring to FIG. 3, shown is a is a timing clock integrated circuit 88 with data transfer means 89 for communicating with the CPU or microprocessor 84 and having a power line 85 and ground line 86, a temperature sensor or temperature integrated circuit 93 with a data transfer means 92 for communicating with the CPU, microprocessor and/or microcontroller 84 and having a power line 96 and ground 97, and the flow sensor (e.g. pressure, ultrasonic turbine flow) or flow sensor integrated circuit 95 with a data transfer means 94 for communicating with the CPU, microprocessor and/or microcontroller 84 with a power line 98 and ground line 99. The integrated circuits for the timing clock 88, temperature sensor 93 and flow sensor 95 can include circuitry to convert analog data to a digital format. Also shown is a first wire or wireless electronic communication means 100 with a data transfer means 104, and a second wire or wireless electronic communication means 101 with a data transfer means 102, where both data transfer means 102 and 104 communicates with the CPU 84.

The microprocessor that processes the information supplied by the temperature 70, flow 74 and timing 72 sensors uses internal instructions to control the information projected on the display 80 and for processing alarm states. The microprocessor can include an EEPROM or any type of memory section that allows for specific programming to be incorporated as processing instructions. Furthermore, the microprocessor may have the capability to convert analog signals into digital information for decoding and processing. An example of a microprocessor that could be used for the CPU or microprocessor is the PIC16F876 28-pin 8-Bin CMOS FLASH micro-controllers manufactured by Microchip Technology, Inc. This particular microprocessor has a 128K EEPROM Data memory bank for flash memory of specific instructions and utilizes a 35-word struction set. It also has five 10-bit Analog-to-Digital Inputs that can provide the means for converting the information obtained from the temperature sensor 70, flow sensor 74, and/or timing sensor 72 from its analog format into a digitized form for processing by the instruction sets of the CPU or microprocessor 84. Another example of a microprocessor that could be used for the CPU or microprocessor is the MSP430 family of processors from Texas Instruments in Dallas, Tex. There are hundreds of variants but for an example, the MSP430F436IPN (80 pin package) or MSP430F436IPZ (100 pin package) could be utilized in the present invention. It is anticipated by the Applicant that more powerful microprocessors with more memory capacity may be utilized to accommodate the more complex audio or verbal communications means. There are many other variants or other microprocessors, whether commercially marketed or privately fabricated, that can be used with the present invention.

In addition, a means to record and digitally story the water parameters or data can be incorporated into the present invention. An integrated memory circuit can be incorporated into the CPU or microprocessor 84 or can be a separate memory circuit, and can include associated circuitry with a means to transfer the recorded data to a removable media, such as a flash mount on an electronic circuit board to control the display means and communicate with the sensors. Various data access ports, such as serial, parallel, or USP can be used to transfer the stored data to another device, such as a computer. The CPU or microprocessor 84 and associated circuitry mounted on the electronic circuit board can also have the capability to be programmed for controlling certain display means (e.g. U.S. or metric units), programming alarm or setting states (e.g. flash all display means red when the total volume has exceeded a certain volume, for example, 175 gallons/day).

Figure 4:
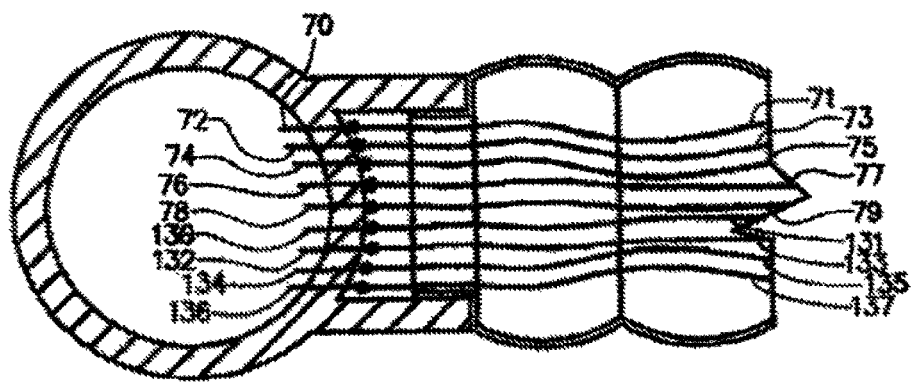
FIG. 4 is a cross-section perspective view showing a plurality of water flow and water quality parameter sensors located in relative positions within the supply line lumen and the connecting wires.

Also shown in FIG. 3, is a timing sensor 72. The timing sensor can communicate with the CPU or microprocessor to display such information such as the time of day and current date and/or a time stamp for the duration that the water supply has turned been on and off. For monitoring the time stamp parameters of the water flowing through the present invention, the use of various trip switches or water sensors 72 as depicted in FIG. 4 are positioned in close proximity to the flowing water to be monitored. Wires 77 are shown extending from the sensor 74 to electronically communicate with the CPU or microprocessor 84 and display unit. Various mechanical and magnetic switches can be utilized to communicate a signal to the CPU or microprocessor 84 that water supply has been initiated and then the software instructions and CPU or microprocessor can display the cumulative time that the water supply is flowing through the present invention. The mechanical or magnetic switch will have the capability to also communicate a signal to the CPU or microprocessor 84 that the water supply has been shut off such that the software instructions and CPU or microprocessor can calculate various parameters, such as, but not limited to, the duration of water supply, total number of gallons or liters of water used and flow rates.

Technologies that can be use as the timing sensor 72 include electrical resistance sensors, ohm meter, multi-meter electrical current sensors: galvanometer, ammeter, electrical voltage sensors: leaf electroscope, voltmeter electrical power sensors, watt-hour meter magnetism sensors, magnetic compass, fluxgate compass, magnetometer, Hall effect device. In addition, various chemical technologies, such as oxygen sensors, ion-selective electrodes, and redox electrodes might be used. Furthermore, optical radiation technology can be used as the timing sensor, such as light sensors, on photo-detectors including semi-conduction devices such as photocells, photodiodes, phototransistors, CCDs, and image sensors; vacuum tube devices like photoelectric tubes, photomultiplier tubes, and mechanical instruments such as the Nichols radiometer infra-red sensors, especially used as occupancy sensors for lighting and environmental controls, interferometry-interference fringes between transmitted and reflected light-waves produced by a coherent source such as a laser are counted and the distance is calculated. In addition, fiber optic sensors are capable of extremely high precision.

Because the present invention water use and water energy monitoring apparatus can be used in situations where the source, of water comes for a well or non-commercial operation, and furthermore, where the commercial operations water treatments plants are under pressure to provide more water supplies or where problems, breakdowns or accidental situations can cause contamination of the water source, the present invention can be fitted with, display parameters of, and provide warning f numerous mineral, elements and biological contaminates.

As illustrated in FIG. 4 is a cross-section showing the one or more sensors 70, 72, 74, 76, 78, 80, 140 and/or 142 located in close proximity to water supply line 20, 22 and/or a water delivery supply line 24, 26 and their relative position of the sensors in the supply line lumen 38 and the connecting wires 71, 73, 75, 77, 79, 81, 141 and 143 for the display means. For exemplary purposes, sensor 70 could be a timing sensor e.g. to monitor when water is flowing, sensor 72 can be a temperature sensor, sensor 74 can be a flow sensor 76 can be a halogen (e.g. chloride or fluoride) sensor, 78 can be a total dissolved solids sensor, 80 can be a biological or fecal sensor, and 140 can be a water hardness sensor and 142 can be a specific iron or other mineral sensor.

In general, a sensor is a type of transducer. A direct type indicating sensors, for example, a mercury thermometer, is human readable. However, other sensors must be paired with an indicator or display, for instance, thermocouple sensor. Most sensors are electrical or electronic, although other types exist.

Technological progress allows for more and more to be manufactured on the microscopic scale as micro-sensors using MEMS technology. In most cases a micro-sensor reaches a significantly higher speed and sensitivity compared with macroscopic approaches.

There are many types of sensors that can be used with the present invention. Since a significant all change involves an exchange of energy, sensors can be classified according to the type of energy transfer that they detect. For measuring or monitoring the temperature of the water flowing from the shower or bath head, the use of various thermocouples or thermistor sensors 70 as depicted in FIG. 3 is protruding within the water supply lumen 38 (or in close proximity to the water to be measured) and mounted within the articulating joint mechanism 22. Wires 71 are shown extending from the sensor 70 to electronically communicate with the CPU or microprocessor 84 and display unit.

In 1821, the German-Estonian physicist Thomas Johann Seebeck discovered that when any conductor such as a metal) is subjected to a thermal gradient, it will generate a voltage. This is now known as the thermoelectric effect or Seebeck effect. Any attempt to measure this voltage necessarily involves connecting another conductor to the "hot" end. This additional conductor will then also experience the temperature gradient, and develop a voltage of its own which will oppose the original. Fortunately, the magnitude of the effect depends on the metal in use. Using a dissimilar metal to complete the circuit will have a different voltage generated, leaving a small difference voltage available for measurement, which increases with temperature. This difference can typically be between 1 and 70 micro-volts per degree Celsius for the modern range of available in metal combinations. Certain combinations have become popular as industry standards, driven by cost, availability convenience, melting points, chemical properties, stability, and output.

It is important to note that thermocouples measure the temperature difference between two points, not absolute temperature. In traditional applications, one of the junctions, the cold junction, was maintained at a known (reference) temperature, while the other end was attached to a probe.

For example, the cold junction could be at copper tracers on the circuit board. Another temperature sensor will measure the temperature at this point, so that the temperature at the probe lip can be calculated. Having available a known temperature cold junction, while useful for laboratory calibrations, is simply not convenient for most directly connected indicating and control instruments. They incorporate into their circuits an artificial cold junction using some other thermally sensitive device (such as a thermistor or diode) to measure the temperature of the input connections at the instrument, with special care being taken to minimize any temperature gradient between terminals. Hence, the voltage from a known cold junction can be, simulated, and the appropriate connection applied. This is known as cold junction compensation.

Additionally, cold junction compensation can be performed by software. Device voltages can be translated into temperatures by two methods. Values cast either be found in look-up tables or approximated using polynomial coefficients.

Any extension cable or compensating cable must be selected to match die thermocouple. It generates a voltage proportional to the difference between the hot junction and cold junction, and is connected in the correct polarity so that the additional voltage is added to the thermocouple voltage, compensating for die temperature difference between the hot and cold end junctions.

The relationship between the temperature difference and the output voltage of a thermocouple is generally nonlinear and is approximated by a polynomial interpolation.

$$T = \sum_{n=0}^{N} a_n v^n$$

The coefficients $a_n$ are given for n from 0 to between 5 and 9. To achieve accurate measurements lie equation is usually implemented in a digital controller or stored in a lookup table. Some older devices use analog filters.

A variety of thermocouples are available, suitable for different measurements applications (industrial, scientific, food temperature, medical research, etc.). They are usually selected based on the temperature range and sensitivity needed. Thermocouples with low sensitivities (B, R, and S types) have correspondingly lower resolutions. Other selection criteria include the inertness of the thermocouple material, and whether or not it is magnetic. The thermocouple types are listed below with the positive electrode first, followed by the negative electrode. For example, listed below are a number of thermocouples types.

A thermistor is a type of resistor used to measure temperature changes, relying on the change in its resresistance with changing temperature. Thermistor is a combination of words thermal and resistor. The thermistor was invented by Samuel Ruben in 1930, and was disclosed in U.S. Pat. No. 2,021,491.

If we assume that the relationship between resistance amid temperature is linear (i.e. we make a first-order approximation), then we can say that:

$$\Delta R = K \Delta T$$

Where:
$\Delta R$ change in resistance
$\Delta T$=change in temperature
k=first-order temperature coefficient of resistance Thermistors can be classified into two types depending on the sign of k. If k is positive, the resistance increases with increasing temperature, and the device is called a positive temperature coefficient (PTC) thermistor (Posistor). If is negative, the resistance decreases with in decreasing temperature, and the device is call a negative temperature coefficient (NTC) thermistor.

Thermistors differ from resistance temperature detectors in at the materials used in a thermistor is generally a ceramic or polymer, while RTDs use pure metals. The temperature response is also different; RTDs are useful over larger temperature ranges.

Other thermal technologies that can be employed include temperature sensors thermometers, bi-metal thermometers and thermostats, heat sensors such as bolometers and calorimeter.

It is anticipated by the Applicant that various types of thermocouples or thermistors can be used for the present invention. It is not important what type of thermocouple or thermistor is utilized for monitoring or measuring the temperature of the water entering the shower head, bath head or water supply lines except that it is accurate for the appropriate temperature range monitored or measured.

In order to monitor or measure the flow rate of the water being delivered by the water supply line various flow measuring technologies are applicable to the present invention. For measuring or monitoring the rate of the water flowing through the shower or bath head, the use of various venturi type sensors or pressure sensors 74 as depicted in FIG. 3 are positioned in close proximity to the water to be measured and mounted within the articulating joint mechanism 22. Wires 75 are shown extending from the sensor 74 to electronically communicate with the CPU or microprocessor 84 and display unit.

One means to monitor flow parameter is to create a venturi effect, which constricts the flow in some fashion and measure, the differential pressure that results across the constriction. This method is widely used to measure flow rate in the transmission of gas or liquids trough pipelines, and has been used since Roman Empire times. The venturi effect is all example of Bernoulli's principle, in the case of incompressible fluid flow through a tube or pipe with a constriction in it. The fluid velocity must increase through the constriction to satisfy the equation of continuity, while its pressure must, decrease due to conservation of energy: the gain in kinetic energy is supplied by a drop in pressure or a pressure gradient force. The effect is named after Giovanni Battista Venturi, (1746-1822), an Italian Physicist.

Using Bernoulli's equation in the special case of incompressible fluids (such as the approximation of a water jet), the theoretical pressure drop at the constriction would be given by the formula:

$$(p2)(v_2^2 - v_1^2)$$

In addition, the flow sensor 74 can be fabricated from pressure sensor technology. Pressure sensors are used in numerous ways for control and monitoring in thousands of everyday applications. Pressure sensors can be used in systems to measure other variables such as fluid/gas flow, speed, water level, and altitude. Pressure sensors can alternatively be called pressure transducers, pressure transmitters, pressure senders, pressure indicators among other names. There are different type pressure sensors: absolute pressure sensor, gauge pressure sensors, and differential pressure sensor each which has particular advantages and disadvantages. Pressure sensors can be particularly useful in measuring small leaks by shutting of the water supply line and then monitoring the pressure loss over time.

Pressure sensors can vary considerably in technology, design, performance, application suitability and cost. A conservative estimate would be that there may be over 50 technologies and at least 300 companies making pressure sensors worldwide. Pressure sensors are designed by technology that is absolute pressure, gauge pressure vacuum pressure and differential pressure sensors. Pressure sensors are useful as in certain situations, such as when the water supply is sealed, can be used for small leak detection.

There is also a category of pressure sensors that are designed to measure in a dynamic mode for capturing very high speed changes in pressure. Example applications for this type of sensor would be in the measuring of combustion pressure in an engine cylinder or in a gas turbine. These sensors are commonly manufactured out of piezoelectric materials like quartz.

Some pressure sensors function in a binary manner, i.e., when pressure is applied to a pressure sensor, the sensor acts to complete or break an electrical circuit. Some speed cameras use them. These types of sensors are also known as a pressure switches.

In addition, various flow measuring technologies can be utilized as the flow sensor 74. In general, a flow sensor is a device for sensing the rate of fluid flow. Typically, a flow sensor is the sensing element used in a flow meter, or flow logger, to record the flow of fluids. There are various kinds of flow meters, including some that have a vane that is pushed by the fluid, and can drive a rotary potentiometer, or similar device. Other flow meters use a displacement piston pushing it against a spring. Flow meters are related to devices called velocimeters that measure velocity of fluids flowing through them. Laser-based interferometry is often used for air flow measurement, but for liquids, it is often easier to measure the flow. Another approach is Doppler-based methods for flow measurement. Hall effect sensors may also be used, on a flapper valve, or vane, to sense the position of the vane, as displaced by fluid flow. A fluid dynamics problem is easily solved (especially in non-compressible fluids) by knowing the flow at all nodes in a network. Alternatively, pressure sensors can be placed at each node, and the fluid network can be solved by knowing the pressure at every node. These two situations are analogous to knowing the currents or knowing the currents at every node (non-compressible fluid being conserved in the same manner as Kirchoff's current or voltage laws, in which conservation of fluid is analogous to conservation of electrons in a circuit). Flow meters generally cost more than pressure sensors, so it is often more economical to solve a fluid dynamics network monitoring problem by way of pressure sensors, than to use flow meters.

In addition, there are several types of mechanical flow meters that can be utilized with the present invention as the flow sensor 74 that are listed below.

Piston Meter—Due to the fact that they used for domestic water measurement Piston meters, (also known as Rotary Piston, or Semi-Positive displacement meters) are the most common in the UK and are used for almost all meter sizes up to and including 40 mm (1½"). The piston meter operates on the principle of a piston rotating within a chamber of known volume. For each rotation, an amount of water passes through the piston chamber. Through a gear mechanism and, sometimes, a magnetic drive, needle dial and odometer type display is advanced.

Woltmann Meter—Woltman meters, commonly referred to as Helix meters are popular at larger sizes. Jet meters (single or Multi-Jet) are increasing in popularity in the UK at larger sizes and are commonplace in the EU.

Dall Tube—A shortened form of the Venturi principal. Lower pressure drop across an orifice plate (useful in differential pressure sensors).

Orifice Plate—Another simple method of measurement uses an orifice plate, which is basically a plate with a hole through it. It is placed in the flow and constricts the flow. It uses the same principle as the venturi meter in that the differential pressure relates to the velocity of the fluid flow Bernoulli's principle).

Pitot tube—Measurement of the pressure within a pitot tube in the flowing fluid, or the cooling of a heated element by the passing fluid are two other methods that are used. The types of sensors are advantageous in that they are rugged, so not easily damaged in an extreme environment. A pitot tube is an L shaped tube which is also able to measure fluid flow.

Paddle wheel—The paddle wheel translates the mechanical action of paddles rotating in the liquid flow around an axis into a user-readable rate of flow (gpm, lpm etc.). The paddle tends to be inserted into the flow.

Pelton wheel—The Pelton wheel turbine (better described as a radial, turbine) translates the mechanical action of the Pelton wheel rotating in the liquid flow around an axis into a user-readable rate of flow (GMP, LPM, etc.). The Pelton wheel tends to have all the flow travelling around it.

Turbine flow meter—The turbine flowmeter (better described as an axial turbine) translates the mechanical action of the turbine rotating in the liquid flow around an axis into a user-readable rate of flow (GMP, LPM, etc.). The turbine tends to have all the flow travelling around it.

Thermal mass flow meters—Thermal mass flow meters generally use one or more heated elements to measure the mass flow of gas. The gas temperature is also measured and compensated for. They provide a direct mass flow readout, and do not need any additional pressure temperature compensation over their specified range. Thermal mass flow meters are used for compressed air, nitrogen, helium, argon, oxygen, natural gas. In fact, most gases can be measured as long as they are fairly clean and non-corrosive.

Vortex flowmeters—Another method of flow measurement involves placing an object (called a shedder bar) in the path of the fluid. As the fluid passes this bar, disturbances in the flow called vortices are created. The vortices trail behind the cylinder in two rolls, alternatively from the top or the bottom of the cylinder. This vortex trail is called the Von Kármán vortex street after von Karman's 1912 mathematical description of the phenomenon. The speed at which these vortices are created is proportional to the flow rate of the fluid. Inside the shedder bar is a piezoelectric crystal, which produces a small, but measurable, voltage pulse every time a vortex is created. The frequency of this voltage pulse is also proportional to the fluid flow rate, and is measured by the flowmeter electronics, With f=SV/L where, f=the frequency of the vortices L=the characteristic length of the bluff body V=the velocity of the flow over the bluff body S=Strouhal Number and is a constant for a given body shape.

In addition, various magnetic, ultrasound and coriolis flow meters can be utilized with the present invention to function as the flow sensor 74. Modern innovations in the measurement of flow rate incorporate electronic devices that can correct for varying pressure and temperature (i.e. density) conditions, non-linearities, and for the characteristics of the fluid. The most common flow meter apart from the mechanical flow meters, is the magnetic flow meter, commonly referred to as a "mag meter" or an "electromag". A magnetic field is applied to the metering tube, which results in a potential difference proportional to the flow velocity perpendicular to the flux lines. The physical principle at work is Faraday's law of electromagnetic induction. The magnetic flow meter requires a conducting fluid, e.g. water, and an electrical insulating pipe surface, e.g. a rubber lined non-magnetic steel tube.

Ultrasonic flow meters—Ultrasonic flow meters measure the difference of the transit time of ultrasonic pulses propagating in and against flow direction. This time difference is a measure for the average velocity of the fluid along the path of the ultrasonic beam. By using the absolute transit times both the averaged fluid velocity and the speed of sound can be calculated. Using the two transit times $t_{up}$ and $t_{down}$ and the distance between receiving and transmitting transducers L and the inclination angle $\alpha$ one, can write the equations:

$$v = \frac{L}{2\sin(\alpha)} \frac{t_{up} - t_{down}}{t_{up} t_{down}} \text{ and } c = \frac{L}{2} \frac{t_{up} + t_{down}}{t_{up} t_{down}}$$

Where v is the average velocity of the fluid along the sound path and c is the speed of sound.

Measurement of the doppler shift resulting in reflecting an ultrasonic beam off the flowing fluid is another recent innovation made possible by electronics. By passing an ultrasonic beam through the water pipe, bouncing it off of a reflective plate then reversing the direction of the beam and repeating the measurement the volume of water flow can be estimated. The speed of transmission is affected by the movement of water in the supply pipe and by comparing the time taken to complete the cycle upstream versus downstream the flow of water through the supply pipe can be measured. The difference between the two speeds is a measure of true volume flow. A wide-beam sensor can also be used to measure flow independent of the cross-sectional area of the water supply pipe.

Coriolis flow meters—Using the Coriolis effect causes a laterally vibrating tube to distort, a direct measurement of mass flow can be obtained in a coriolis flow meter. Furthermore, a direct measure of the density of the fluid is obtained. Coriolis measurement can be very accurate irrespective of the type of gas or liquid that is measured; the same measurement tube can be used for hydrogen gas and peanut butter without recalibration.

As described in more detail below, sensitive flow sensor (s) can be mounted at appropriate locations with monitoring software incorporated into either the flow sensors of the water meter and leak detection system 10, 126, 200 can be employed to monitor leaks that are ascertained, can communicate to the present invention water monitoring base station. A warning can be displayed on the first remote monitor or an immediate message can be sent to a programmed cell phone number by wireless communication means. In this optional operation, a plurality of wireless or wired water sensitive flow sensors can be installed in close proximity of the supply lines, for example washing machines, sprinkler systems, refrigerator water supply lines, and other potential leaking sites, The present invention base unit periodically reads and stores data point water flow information corresponding to either a flow condition, no flow condition, or a slow flow condition through the supply line of the particular water fixture. The present invention base station is configured to periodically receive a stream of stored data points from the at least one wireless flow sensor node by way of at least one coordinator node. The water meter and leak detection system 10, 126, 200 is configured to determine, based on an analysis of the stream of data points, whether a leak exists in at least one of the water fixtures. The water meter and leak detection system 10, 126, 200 is designed, the when a leak is detected, to provide a warning light, display, or alarm, or using the wired or wireless technology (e.g. cellular technology) to communicate the leak condition to a resident, commercial unit operator or manager, and/or municipal or governmental agency.

As shown in FIG. 4, is an optional halogen ion sensor (chloride, fluoride, bromide) 72. There are currently several types sensors and technology are available on the commercial market that can be used with the present invention as chlorine, fluoride and bromide are common compounds or elements that are added to the water supply to maintain clean water. The sensor 72 communicates with water meter and leak detection system 10 (126 shown in FIGS. 6 and 200 shown in FIGS. 7 and 15) by means of a wire or wireless communication 73 which includes specific software instructions to display the halogen parameter on one of the displays or provide an alarm that is programmed that is triggered when a certain level or percentage is exceeded.

In addition, as shown in FIG. 4, is an optional total dissolved solid (TDS) sensor 74 which measures the total amount of charged ions (minerals, salts or metals) dissolved in a specific volume of water. TDS is related to the purity of water and by measuring the dissolved solids and minerals, salts, metals (as cations or anions) dissolved in water. The total dissolved solids concentration is the sum of the cations (positively charged) and anions (negatively charged) ions in the water that is expressed in parts per million (ppm). A typical TDS sensor or meter is based on the electrical conductivity (EC) of water. Pure H2O has virtually zero conductivity. Conductivity. The higher the level of EC, the higher the TDS level. The sensor 74 communicates by wire or wireless communication means 75 with the water meter and leak detection system 10 (126 shown in FIG. 6 and 200 shown in FIGS. 7 and 15) which includes specific software instructions to display the TDS parameter on one of the displays or provide an alarm that is programmed that is triggered when a certain level or percentage is exceeded.

Furthermore, shown in FIG. 4, is an optional sensor 76 to measure or monitor the amount of iron or other metallic ions. Iron in water can cause corrosion of certain metals, discoloration of the water and other problems. It is anticipated by the Applicant that sensors for other metals, such as mercury, lead, or other metallic elements can be utilized with the water meter and leak detection system 10 (126 shown in FIGS. 6 and 200 shown in FIGS. 7 and 15). Mercury and lead consumption and exposure are known to be hazardous to humans. One method known to measure iron in a water sample is to use a Hall sensor biased with a magnet. As the sensor is positioned over the iron, then more flux will pass through the Hall sensor. There are other published methods for detection metallic ions in water that can be used with the present invention. The sensor 76 communicates by means of a wire or wireless communication 77 with the water meter and leak detection system 10 (126 shown in FIGS. 6 and 200 shown in FIG. 7) which includes specific software instructions to display the halogen parameter on one of the displays or provide an alarm that is programmed that is triggered when a certain level or percentage is exceeded.

In addition, as shown in FIG. 4, is a biological or fecal coliform sensor 130. In general, increased levels of fecal coliforms provide a warning of failure water treatment, a break in the integrity of the distribution system, or possible contamination with pathogens. When levels are high there may be an elevated risk of waterborne diseases or gastroenteritis. The presence of fecal coliform in water system may indicate that the water has been contaminated with the fecal material of humans or other animals. Fecal coliform bacteria can enter rivers or storm drains through direct discharge of waste from mammals and birds, from agricultural and storm runoff, and from human sewage. Sewage connections that are connected to storm drains pipes can also allow human sewage into surface waters. Runoff from roads, parking lots, and residential yards and natural area can carry animal wastes to streams through storm sewers. Birds are known to be a significant source of fecal coliform bacteria. Some waterborne pathogenic diseases that may coincide with fecal coliform contamination include ear infections, dysentery, typhoid fever, viral and bacterial gastroenteritis, and hepatitis A and C. Municipalities that maintain a public water supply will typically monitor and treat for fecal coliforms by using chlorine, fluoride, bromine or other disinfectant chemicals. The sensor 130 communicates by means of a wire or wireless communication 131 with the water meter and leak detection system 10 (126 shown in FIGS. 6 and 200 shown in FIG. 7) which includes specific site software instructions to display the fecal coliform parameter on one of the displays or provide an alarm that is programmed that is triggered when a certain level or percentage is exceeded.

In addition, as shown in FIG. 4, is an optional pH sensor 134. Various pH sensors available in the current market can be utilized with the present invention. The sensor 134 communicates with the water meter and leak detection system 10, 126, 200 through wired 135 (or wireless means) which includes specific software instructions to display the pH parameter on one of the displays or provide an alarm that is programmed that is triggered when a certain level or percentage is exceeded.

In additional, as shown in FIG. 4, is an optional water hardness sensor 134. Pure water is an excellent solvent because it easily dissolves solutes (chemically distinct elements and compounds) certain level or resulting in a solution. The prevalence of water being a solvent is due to polarity of each water molecule. When water is combined with carbon dioxide to form very weak acid, it becomes an ever better solvent. Calcium and magnesium dissolved in water are the two most common minerals that make water "hard." Hard water interferes with cleaning from laundering, dishwashing as the amount of hardness minerals in water affects the amount of soap and detergent necessary for cleaning. Calcium and magnesium hard water also can deposit in water pipe that reduces water flow. Hard water also contributes to inefficient and costly operation of water-using appliances. Heated hard water forms a scale of calcium and magnesium minerals that can contribute to the inefficient operation or failure of water-using appliances.

Water hardness is generally classified from soft to very hard the depends the level of calcium, magnesium and other chemical ions:

| Classification | mg/l or ppm |
| --- | --- |
| Soft | 0-17.1 |
| Slightly hard | 17.1-60 |
| Moderately hard | 60-120 |
| Hard | 120-180 |
| Very Hard | 180 & over |

The sensor 134 communicates by wire or wireless communication means 135 with the base station apparatus 10 which includes specific software instructions to display the water hardness parameter on one of the displays or provide an alarm that is programmed that is triggered when a certain level or percentage is exceeded.

Figure 5:
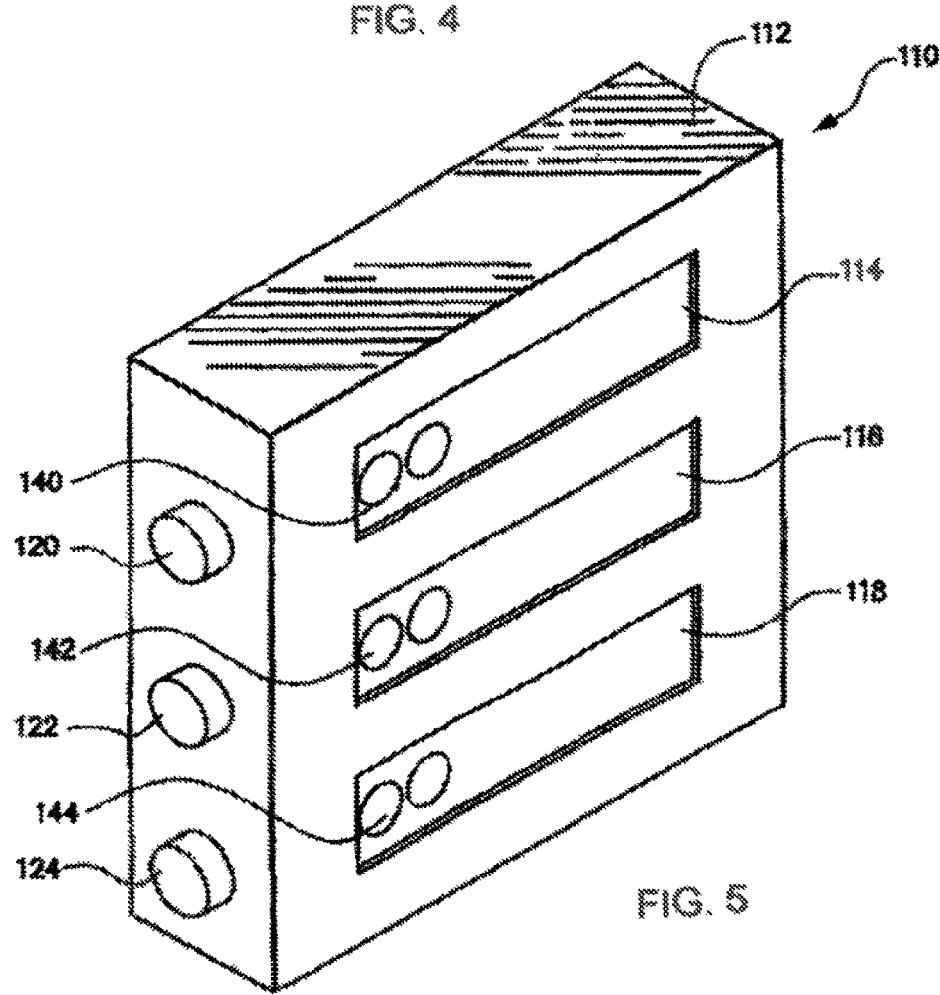
FIG. 5 is a perspective view of the first or second display/recording remote apparatus having a plurality of display means and a plurality of software controlling buttons.

Nor referring to FIG. 5, which presents an example 110 of either the first display/recorder 50 or the second optional (handheld) display/recorder 56. The first display/recorder 50 or optional second (handheld) display/recorder 56 includes a housing or container 112, display means 114, 116, and 118, software control buttons 120, 122, and 124, the electronic circuit board with wire or wireless capability, and power source are common, between the two apparatuses. It is also anticipated that an optional third display/recorder (not shown) could utilized with computer, television or cell phone, smart phone or similar apparatus that has an Internet, intranet, wire or wireless means. In this first display/recorder 50, the second display/recorder 56, or a third computer, television or cell phone, smart phone or similar apparatus can utilize custom software and/or market software that will be used to transfer the water parameter information from the water use/water energy use monitor and/or leak detection apparatus 10, 200 to the first display/recorder 50, the second display/recorder 56, or the third computer, television, or cell phone, smart phone or similar apparatus.

The example of the first display/recorder 50, or the second display/recorder 56 includes a housing or container 112, a computerized circuit board (depicted in FIG. 3), the one or more display means 114, 116, and 118, and a housing which can having an optional water tight door for replacing or regenerating the power source or removable data chip, and a plurality of buttons or activators 120, 122, 124 that allow for certain modification of the software instructions (change units, change language, change from metric to US standard, set alarms). The housing or container 112 can be fabricated from a metallic material such as brass, brass alloys, steel, galvanized steel, copper, copper allows or any combination thereof. The display means housing can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes. The material for fabricating the housing 112 is not particularly important except and the size of the display means will generally determine the size of the housing but it does not have to be substantially rectangular as shown, any number of geometric configurations could be used in the present invention.

The plurality of display means 114, 116, and 118 and as presented in FIG. 5 utilizes one or more illuminating technologies, such as LCD, LED, gas plasma, fluorescence, incandescent, halogen, halide, or other lighting technologies but should be able to provide sufficient lighting for observing the data and information in dark conditions. In addition, the display means and display means housing should be able to sustain capability in moist wet conditions. The present invention can include one or more than one display means to show various water use and water energy use parameters. For example, the second embodiment with only the flow and water use display can be manufactured to reduce overall costs. Furthermore, the orientation of the water use and water energy use parameters can be presented in various formats. For example, the flow parameter can be on top with the date parameter on the bottom and with the energy parameter sandwiched between. The displays 114, 116, and 118 can have a background light that is used for various purposes, for example, for providing better lighting conditions or changing color e.g. from green to red, to display an alarming condition (e.g. water use over time has exceed a certain level). Displaying of all water and water energy parameters can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters and water energy parameters one at a time with a specific delay and sequencing. An example of a LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other lighting technologies that can be utilized with the present invention.

The display means 114, 116, and 118 can be programmed to display one or more parameters in a visual means that can be either an analog, character or digital display, or combination of display means. Information obtained from the appropriate sensor monitoring or measuring the water parameters such as temperature, date/time, and flow rate can be displayed in an appropriate format on the display means. For example, when a sensor is monitoring or measuring the rate of water flowing from a water source or through the shower head, the display means could show any flow between zero gal/min (0 liters/min) to many thousands of gals/day. For example, when a sensor is monitoring the shower temperature of water flowing through the housing, the display means could show any energy ratio calculation that takes into effect the overall temperature and total volume of heated water vs. the total volume of cold or ambient water. It is anticipated by the Applicant that many different water energy calculations might be utilized by the present invention. Furthermore, the display can be programmed to display calendar information, such as the date and current time (12 hr. or 24 hr. format).

It is anticipated by the Applicant the present invention can be fabricated and marketed with one, two or more display means. For example, a lower cost display assembly can be fabricated and sold that only has a temperature sensor and temperature display means. A more expensive display assembly can be fabricated and sold that has temperature, flow, timing and other sensor s with various programmed methods and a shut of mechanism.

Also shown in FIG. 5, one or more ergonomically 120, 122, and/or 124 placed buttons or activators can be incorporated into the display means housing or container to allow the modification of certain parameter units (e.g. metric to US), set alarm conditions (e.g. flow/volume rate-set points), or to program certain settings, e.g. over water use alarm, monitor continuous leakage (valve not complete shut off). The buttons will electrically communicate with the electronic circuit board contained with the housing or container 112 and respond to programmed instructions integrated within the CPU or microprocessor and associated circuitry of the electronic circuit board. The buttons or activators 120, 122 and/or 124 should be mounted with the display means housing or container 124 with the capability to protect the buttons and electronic circuitry with the housing for exposure to moist and wet conditions.

As presented in FIG. 5, the displays 114, 116, and 118 utilizes one or more illuminating technologies, such as LCD, LED, gas plasma, fluorescence, incandescent, halogen, halide, or other lighting technologies but must able to provide sufficient lighting for observing the data in shower conditions. In addition, the display means must be able to sustain capability in moist wet conditions. The present invention can include one or more than one display parameter. For example, a unit with only the temperature display can be manufactured to reduce overall costs. Furthermore, the orientation of the parameters 64, 66, and 68 presented can be changed, for example, the flow parameter can be on top with the time parameter on the bottom and with the temperature parameter sandwiched between. The displays 114, 116, and 118 can have a background light that is used for various purposes, for example, for providing better lighting conditions or changing color e.g. from green to red, display an alarming condition. Displaying of all water parameters 114, 116 and 118 can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters one at a time with a specific delay and sequencing. An example of a LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other lighting technologies that can be utilized with the present invention.

Also particularly shown in FIG. 5 (but described in more detail in FIG. 3, is an CPU, microprocessor and/or microcontroller and associated circuitry mounted on an electronic circuit board and contained within the shower head to control the display means and communicate with the sensors. The CPU or microprocessor and associated circuitry mounted on the electronic circuit board can also have the capability to be programmed for controlling certain display means (e.g. U.S. or metric units), programming certain alarm or setting states (e.g. flash all display means red when the total volume has exceeded a certain volume, for example, 15 gallons). Included is an electrical schematic showing the main power 87, power supply lines 85 and 88 for CPU or microprocessor 84, the CPU or microprocessor 84, and the analog or digital display means 80 with a data transfer means 83 and with a power line 81 and a ground line 82. The circuitry similar to that shown in FIG. 3, includes a timing clock integrated circuit 88 with data transfer means 89 for communicating with the CPU or microprocessor 84 and having a power line 90 and ground line 91, a temperature integrated circuit 93 with a date transfer means 92 for communicating with the CPU or microprocessor 84 and having a power line 96 and ground 97, and the flow sensor (pressure) integrated circuit 95 with a data transfer means 94 for communicating with the CPU or microprocessor 84 with a power line 98 and ground line 99. The integrated circuits for the timing clock, temperature sensor and flow sensor can include circuitry to convert analog data to a digital format.

Now referring to FIG. 6 is a perspective view of a plurality of optional water parameter transceivers attached to various locations for monitoring water use and furthermore for monitoring for water leaks. In this example, the typical locations for the leak sensitive water flow sensors are at the water input supply lines for a typical washing machine, a sprinkler system, and the at the reduction valve. The leak sensitive sensors can also be located on water using appliances such as sinks, toilets, hot water heaters, clothes washers, bathtubs, and the like.

The present invention apparatus can include a series of water flow sensors that can be connected to certain locations, such as the irrigation system. In this way, the use of indoor water use (data acquired by the installed water meter and leak detection system 10, 126, 200) and outdoor water (data acquired by sensor at irrigation system) use can be monitored. This can be useful for an individual or commercial operator to employ water conservation methods (e.g., reduce the sprinkler frequency or duration). Alternately, the monitoring of indoor water use and outdoor water use could be utilized by the particular water supplying municipality or government agency to apply different rates for indoor water use and outdoor water use. In certain situations, a control valve can be located at a particular location, e.g. the irrigation valve whereby by utilizing the two-way wireless capability of the water meter and leak detection system 10, 126, 200 whereby the water supplying municipality or government agency can remotely control water use (e.g. send out a code that inhibits outdoor water use on certain days or at certain hours of the day).

The water meter and leak detection system 10, 126, 200 can also communicate with the invasive flow sensor, non-invasive flow sensors and/or sensitive flow sensors with transceivers to include software instructions for programming time intervals for water parameter data transmission.

Coordination of data packet transmissions from the invasive flow sensor, non-invasive flow sensor, and/or sensitive flow sensors with transceivers can be scheduled. The water/energy use monitor and/or leak detection apparatus 10, 126, 200 can run a master schedule for querying each invasive flow sensor, non-invasive flow sensor and/or sensitive flow sensors with transceivers. For example, water meter and leak detection system 10, 126, 200 can transmit a message to a specific coordinator node and that coordinator node can then sequentially request data from each of its invasive flow sensor, non-invasive flow sensor, and/or sensitive flow sensors with transceivers. This systematic process can reduce data packet collision on the network and can make the water meter and leak detection system 10, 126, 200 immediately aware of any invasive flow sensor, non-invasive flow sensor and/or sensitive flow sensors with transceivers that might be having trouble transmitting its data packet. The water meter and leak detection system 10, 126, 200 can transmit an acknowledgement to each invasive flow sensor, non-invasive flow sensor and/or sensitive flow sensors with transceivers after successfully processing a data packet.

The software in the water meter and leak detection system 10, 126, 200 is designed to perceive water flow characteristics in the facility for a given unit of time, such as, for example, a day, for every unit in the facility. The software should be designed to identify numerous conditions, such as, for example, faulty toilet valves, periodic and irregular water flow for example toilets, faucets, and a slow constant water flow, a characteristic of a leakage condition.

Referring to FIG. 7, the Water Monitoring and Leak Detection System generally comprises a water meter and leak detection system 10, 126, 200 with water shut-off/on mechanism or water control valve 310 strategically located between a main supply line 208 from a water main and a household water supply line 210 to a residential building 202. The water/energy use monitoring display apparatus 10, 126, 200 with water shut-off/on mechanism is activated and deactivated by a remote controller 220 to selectively turn on and off the water through the household water supply line 210. In the preferred embodiment of the present invention, the water meter and leak detection system 200 with water shut-off/on mechanism 310 is located with respect to the household water supply line 208 such that water flow through the household water supply line 210 to the living quarters of the residential building 202 may be prevented while still allowing water flow to non-residential areas, such as to sprinkler lines. It is also anticipated by the Applicants that the water meter and leak detection system 200 with water shut-off/on mechanism 310 can take the place of, and function as, the pressure reduction valve. FIG. 1 also shows the water/energy use monitor and/or leak detection apparatus 10, 126, 200 with water shut-off/on mechanism 310 connected with a wired means 205 from a solar electrical generation 204 and/or connected with a wired means 207 from a wind electrical generation 206. In this regard, the water meter and leak detection system 10, 126, 200 with shut-off/on mechanism 210 can be battery operated and utilize re-chargeable batteries, that can be charged with a water turbine electric generator or have typical batteries that are replaceable. The water meter and leak detection system 10, 126, 200 with shut-off/on mechanism 310 can also be AC or DC powered. An antenna 322 is shown extending from the remotely controllable base station with water shut-off/on mechanism.

The housing for the water meter and leak detection system 10, 126, 200 (with water shut-off/on mechanism 310) can be fabricated from a metallic material such as metallic alloys, steel, galvanized steel, aluminum or any combination thereof. The housing for the water meter and leak detection system 10, 126, 200 (with water shut-off/on mechanism 310) can be fabricated can be also fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes.

The joint between the water supply lines 208 and 210 and the water meter and leak detection system 10, 126, 200 with water shut-off/on mechanism 310 could be screw and thread fitting, compression fitting, flare fitting, solder, brazed, or sweat joint, adhesive technology and/or use typical plumbing techniques. The joint may be designed to be permanent or removable. The water meter and leak detection system 10, 126, 200 can incorporate a freeze design feature (not shown) which, before a freezing condition is encountered, activates a freezing mechanism. This technology is commonly called "frost plugs" or "freeze plugs". This protects the more expensive water meter and leak detection system 10, 126, 200 by sacrificing the less expensive and easy to install frost/freeze plug. The optional frost/freeze plug technology is typically used in outside underground pits or poorly heated garages or utility rooms. In some extraordinary freezing situations, the optional frost/freeze plug can be incorporated with a draining mechanism or system (not shown) that allows the water to passively drain from the home or business water pipes or forcefully removes the water from the water pipes with a power system. And it is anticipated that in these extraordinary freezing situations, the draining mechanism or system can also replace the water in the water pipes with air, nitrogen or other gas/liquid that have low freezing points and non-toxic conditions, are can withstand the freezing conditions to minimize damage to the water pipes.

The water meter and leak detection system 10, 126, 200 with water shut-off/on mechanism 310 can include an optional display means 211 for displaying various information, such as if the water is interrupted or allowed to flow into the residence or industrial/commercial facility or building, or to help program the software for scheduled water interruption times (off from 8:30 a.m. until 4:30 p.m. then on, off again at 11:00 p.m. until 5:00 a.m. and then on again). The display means 211 can help program the software to display calendar information, such as the date and current time (12 hr. or 24 hr. format). In this regard, the remotely controllable base station 200 can be programmed using a wire or wireless remote keyboard, alarm system, or use touch screen button technology on the display. The display utilizes one or more illuminating technologies, such as LCD, LED, gas plasma, fluorescence, incandescent, halogen, halide, or other lighting technologies but must able to provide sufficient lighting for observing the data in low light conditions. In addition, the display means and display means housing must be able to sustain capability in outdoor wet and/or hot conditions. The display 211 can have a background light that is used for various purposes, for example, for providing better lighting conditions or changing color e.g. from green to red, to display an alarming condition. An example of a LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other lighting technologies that can be utilized with the present invention. The display can utilize touch screen technology.

One of the key features of the present invention water damage prevention system is that it has a convenient and easy means which facilitates activation and/or deactivation of the water flow from the main water supply with a high percentage of use when a residential home or industrial/commercial facility or building becomes vacated or unsupervised. If a non-convenient means is utilized, the ratio of use will decrease which compromises the design goal of the present invention. In this regard, shown in FIG. 7 is an individual 212 holding a remote wireless key chain or key fob apparatus 220 in his hand 221. Generally, one carries one or more key chains or key fobs for holding keys for entry of one's residence or office, car operation etc. The remote wireless key chain or key fob apparatus 220 communicates wirelessly with the water meter and leak detection system 10, 126, 200 with water shut-off/on mechanism 310 with a wireless means 214. Another embodiment of the present invention shows a programmable alarm keyboard 218 as part of an overall residential or commercial alarm system for communicating with the water meter and leak detection system 10, 126, 200. Another embodiment of the present invention, shown later, includes a specific garage door opener for communicating with the water meter and leak detection system 10, 126, 200. Another embodiment of the present invention, also shown later, includes a cell phone, smart phones, or similar apparatus 400 for communicating with the water meter and leak detection system 10, 126, 200.

The wireless means 214 can use radio-frequency, Bluetooth, Wi-Fi, Zigbee, optical or other wireless technology for communicating with the water meter and leak detection system 10, 126, 200. Examples of Bluetooth modules (using the 2.4 GHz band as Wi-Fi) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Furthermore, wireless technology in the 908-928 MHz frequency range can be used with the present invention. Applicants recognize that there are numerous wireless protocols that have been developed that, although not specifically listed, could be utilized with the present invention for data transfer purposes.

ISM bands defined by the ITU-R are:

| Frequency range [Hz] | Center frequency [Hz] |
|---|---|
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

While currently the 430 MHz, 900 MHz and 2.4 GHz and 5 GHz frequencies are commonly used in the US, it is anticipated by the Applicants that the other frequencies could be used for signal and data transfers.

Another protocol known as CAN or CAN-bus ISO 11898-1) was originally designed for automotive applications, but is now used in industrial applications. CAN is another type of network that can be used to transfer water parameter data. Devices that are connected by a CAN network are typically sensors, actuators and control devices. A CAN message never reaches these devices directly, but instead a host-processor and a CAN Controller is used between these devices and the bus.

An option to be utilized with the present invention is that the water use/water energy use monitor and/or leak detection apparatus 10, 200 with water shut-off/on mechanism 310 can include programming instructions with a timing circuit to a user defined time schedule. In this manner, the residential occupant or industrial/commercial owner may simply establish that the water supply will be blocked during working hours and/or during sleeping hours. The scheduling could be a daily, weekly, monthly or annual. The programming of the timing schedule could be input into the CPU of the base station electrical circuitry via various methods, e.g. wireless or wired communication with a computer with appropriate software, using the remote controllers, or using tech screen technology on the display means, etc.

Figure 8:
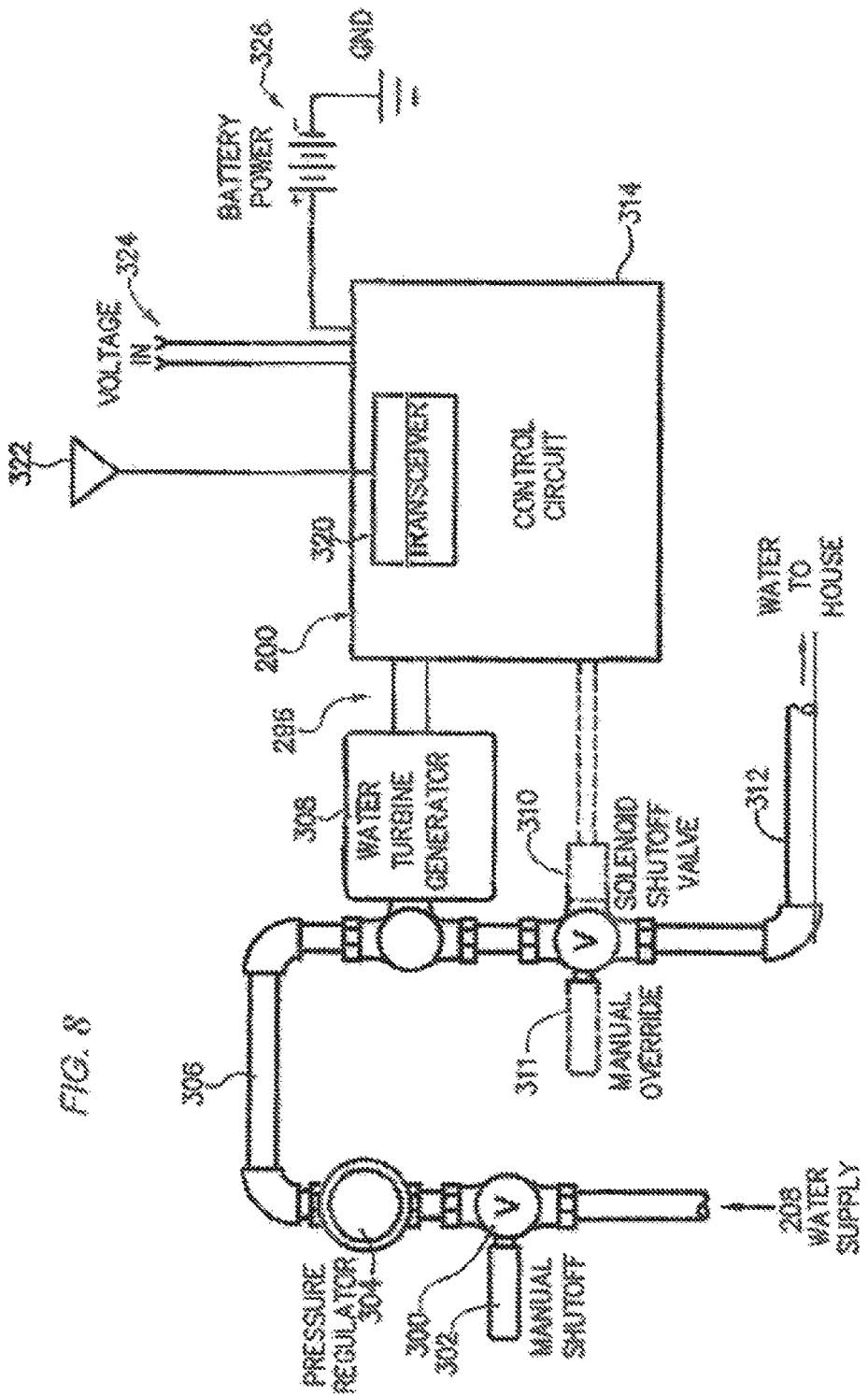
FIG. 8 is a perspective more detailed view of the base station with the control circuit, a wireless transceiver, and a water shut-off/on mechanism and water supply plumbing with optional water turbine generator and is location within the water supply line.

Now referring to FIG. 8, shown is a perspective more detailed view of the water meter and leak detection system 10, 126, 200 with water shut-off/on mechanism 310 and water supply plumbing, and with optional water turbine generator 308 that is located within the water supply line. The water supply line from the water main 208 first engages a manual shut off valve 302. The manual shut off valve can be a ball valve, gate value type, piston valve, or other known technology. Further along the water supply line is a pressure regulator 304 with a connecting pipe 306 to the water meter with leak detection system 10, 126, 200 with water shut-off/on mechanism 310. Also shown is an optional water turbine generator 308 that could be utilized to produce electrical energy for recharging the battery source 326. The water shut-off/on mechanism 310 (shown as solenoid shutoff valve) can be a ball valve, gate value type, piston valve, or other known technology with electronic activation. A mechanical lever 311 can be incorporated on the water shut-off/on mechanism (ball or solenoid shutoff valve) to allow the modification of the mechanism to open the water flow in emergency and necessary situations. The water meter with leak detection system 10, 126, 200 has a transceiver 320 that includes an antenna 322 which can be external or internal. The control circuit for the water/energy use monitor and/or leak detection apparatus 10, 126, 200, shown in more detail in FIG. 3, includes programmable CPU, a power source using either a battery (rechargeable) 326 or typical AC or DC supply 324, and electrical circuitry, wireless or hard-wired components, and optional sensors and associated circuitry. Also shown is a battery voltage 326 which would electronically engage the optional solar cell 302 or wind generator 206 to provide additional electrical energy. It is anticipated by the Applicant's that the water shut-off/on mechanism 311 (ball valve or solenoid shutoff valve), and if used, the optional water turbine generator 308, could be incorporated within the water meter with leak detection system 10, 126, 200 as a single unit. It is also anticipated that the water meter with leak detection system 10, 126, 200 with water shut-off/on valve 310 could replace, and function as, the pressure regulator, eliminating one of the components shown in this drawing. Exiting from water meter with leak detection system 10, 126, 200 with water shut-off/on mechanism 310 is the main water supply 312 to the home (or commercial facility or building). It is also anticipated that water meter with leak detection system 10, 126, 200 with water shut-off/on valve 310 could replace, and function as, the main water mater.

Multi-jet meters measure water velocity converting the velocity into volume of use. They use an impeller which rotates on a horizontal plane that is driven by several "jets" of water flowing through holes evenly spaced around the entire circumference of the impeller. Strong points of multi-jet meters are that they can be smaller than PD meters of the same flow rate, and therefore sometimes less expensive and lighter weight reducing manufacturing and shipping costs. Multi-jets are very accurate at low flow rates, and have low head loss (pressure loss) at high rate compared to PD meters. Since the impeller moves freely in the chamber on a spindle with a bearing, it can also pass sand, rust particles, minerals, or small particulate matter without damage or clogging. In this embodiment, a Multi-jet meter can incorporate a stop mechanism such as a solenoid activated mechanism (not shown) that impedes the impeller from rotating and restricts the flow of water. Such activated mechanism can be wirelessly (or wired) controlled remotely as described herein Positive Displacement Meter or "PD" meters measure water volume with an oscillating piston or a nutating disc. PD meter sizes are typically ⅝" to 2". The disc or piston has very high tolerances between it and the chamber. Water'must push or "displace" the measuring element to go through the meter. Because of high tolerances, new and well maintained. PD meters can be very accurate. PD meters can have more pressure loss through the meter and be somewhat noisier in indoor settings at high flow rates than multi-jet meters. PD meters cannot be recalibrated, but must be rebuilt with new measuring chambers when they wear out. Because water cannot pass through the meter without moving the measuring element, they are good candidate for incorporating a stop mechanism such as a solenoid activated mechanism or pin (not shown) that impedes the oscillating piston or nutating disc from operating and restricts the flow of water. Such activated mechanism can be wirelessly (or wired) controlled remotely as described herein.

Single jet meters are another standard meter specification less common in the U S. Single Jets are sometimes called "paddle wheel" meters. Single jets have an off center inlet and outlet and a jet of water flows on only one side of an impeller, working similar to the water wheel at an old, mill or the paddle wheel on a riverboat. Because water cannot pass through the meter without moving the measuring element, they may be a good candidate for incorporating a stop mechanism such as a solenoid activated mechanism or pin (not shown) that impedes the "paddle wheel" from rotating and restricting the flow of water. Such activated mechanism can be wirelessly (or wired) controlled remotely as described herein.

Pressure sensors can be used in systems to measure other variables such as fluid/gas flow, speed, water level, and altitude. Pressure sensors can alternatively be called pressure transducers, pressure transmitters, pressure senders, pressure indicators among other names. There are different type pressure sensors: absolute pressure sensor, gauge pressure sensors, and differential pressure sensor each which has particular advantages and disadvantages. Pressure sensors can be particularly useful in measuring small leaks by shutting of the water supply line and then monitoring the pressure over time. Pressure sensors can vary considerably in technology, design, performance, application suitability and cost. A conservative estimate would be that there may be over 50 technologies and at least 300 companies making pressure sensors worldwide.

The water use/water energy use monitor and/or leak detection apparatus can include one or more invasive or non-invasive flow sensors (e.g. water turbine or hall sensor, ultrasonic sensor) for monitoring for a first leak condition and then the water use/water energy use monitor and/or leak detection apparatus can employ a second one or more invasive or non-invasive sensor (e.g. pressure sensor) for monitoring a second leak condition, wherein said first leak sensor monitors for a larger leak volume and the second leak sensor monitors for a small volume condition. To monitor for relatively small volume leaks, the second leak sensor can obtain leak information after the water system is turn off and monitoring occurs for a specified period of time. In this situation where the water is turn off and monitor for a specified period of time, the water use/water energy use monitor and/or leak detection apparatus will have software instructions or algorithm the "learns" the daily or weekly water use pattern of a home or business and selects the proper non-operational time to conduct water shut off and monitoring for a specified period of time. It is anticipated by the Applicant that single sensor applications can be developed for comprehensive leak detection utilizing a dynamic orifice mechanism or dual channel (large and small lumen channel) mechanism for leak detection.

In addition, various magnetic, ultrasound and coriolis flow meters can be utilized with the present invention to function as the flow sensor 74. Modern innovations in the measurement of flow rate incorporate electronic devices that can correct for varying pressure and temperature (i.e. density) conditions, non-linearities and for the characteristics of the fluid. The most common flow meter apart from the mechanical flow meters, is the magnetic flow meter, commonly referred to as a "mag meter" or an "electromag". A magnetic field is applied to the metering tube, which results in a potential difference proportional to the flow velocity perpendicular to the flux lines. The physical principle at work is Faraday's law of electromagnetic induction. The magnetic flow meter requires a conducting fluid, e.g. water, and an electrical insulating pipe surface, e.g. a rubber lined non-magnetic steel tube.

Ultrasonic flow meters—Ultrasonic flow meters measure the difference of the transit time of ultrasonic pulses propagating in and against flow direction. This time difference is a measure for the average velocity of the fluid along the path of the ultrasonic beam. By using the absolute transit times both the averaged fluid velocity and the speed of sound can be calculated. Using the two transit times $t_{up}$ and $t_{down}$ and the distance between receiving and transmitting transducers L and the inclination angle α one can write the equations:

$$v = \frac{L}{2\sin(\alpha)} \frac{t_{up} - t_{down}}{t_{up} t_{down}} \text{ and } c = \frac{L}{2} \frac{t_{up} + t_{down}}{t_{up} t_{down}}$$

Where v is the average velocity of the fluid along the sound path and c is the speed of sound.

Measurement of the Doppler shift resulting in reflecting an ultrasonic beam off the flowing fluid is another recent innovation made possible by electronics. By passing an ultrasonic beam through the tissues, bouncing it off of a reflective plate then reversing the direction of the beam and repeating the measurement water flow within a supply pipe can be estimated. The speed of transmission is affected by the movement of water with a supply pipe and by comparing the time taken to complete the cycle upstream versus downstream the flow of water through the supply pipe can be measured. The difference between the two speeds is a measure of true volume flow.

Figure 9:
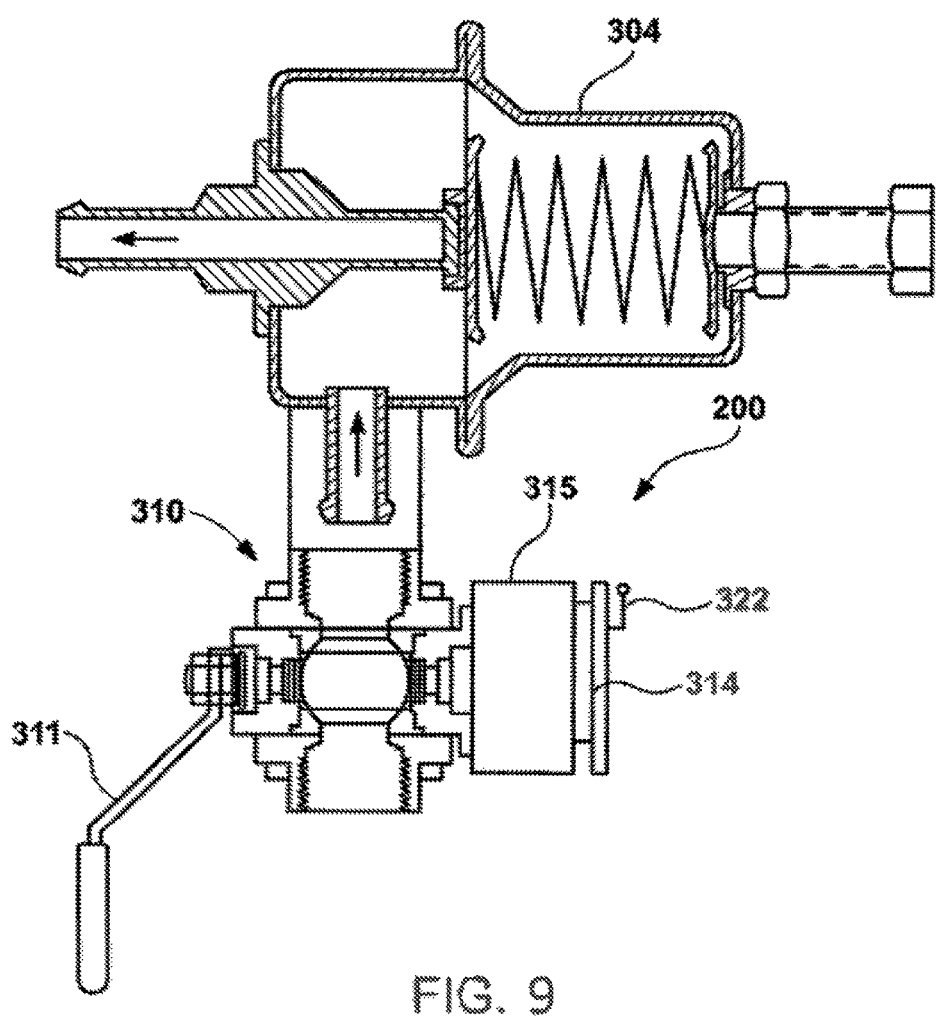
FIG. 9 is another embodiment of the present invention with a perspective detailed view of the water shut-off/on mechanism combined with an independent pressure reduction valve and functioning as a combined system consisting of a base station with one or more water flow sensors having a water shut-off/on mechanism and pressure reduction valve.

FIG. 9 is another embodiment of the present invention with a perspective detailed view of the water shut-off/on mechanism combined with an independent pressure regulator or reduction valve and functioning as a combined system consisting of a base station with one or more water flow sensors having a water shut-off/on mechanism and pressure reduction valve. Shown is a typical water pressure reduction valve 304 connected directly with the water meter and leak detection system 10, 126, 200 with water shut-off/on mechanism 200 having a ball valve 310, a manual on-off handle 311, an electric motor 315, electrical circuitry 314 with a wireless antenna 322.

Figure 11:
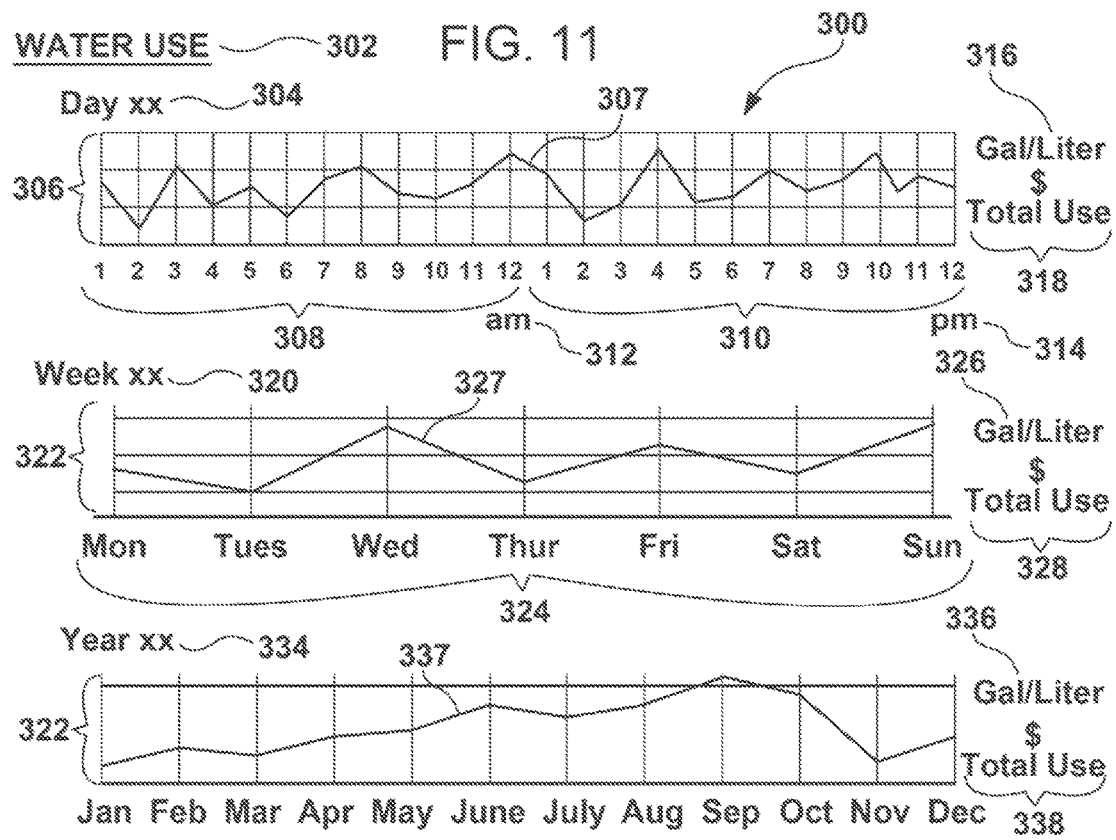
FIG. 11 is a perspective view of another "APP" or programmed application, or another page of an "APP" or programmed application the displays water use data in another format that is transferred from the base station to a remote display apparatus, remote computer or a cell phone, smart phone, or similar apparatus
Figure 11:
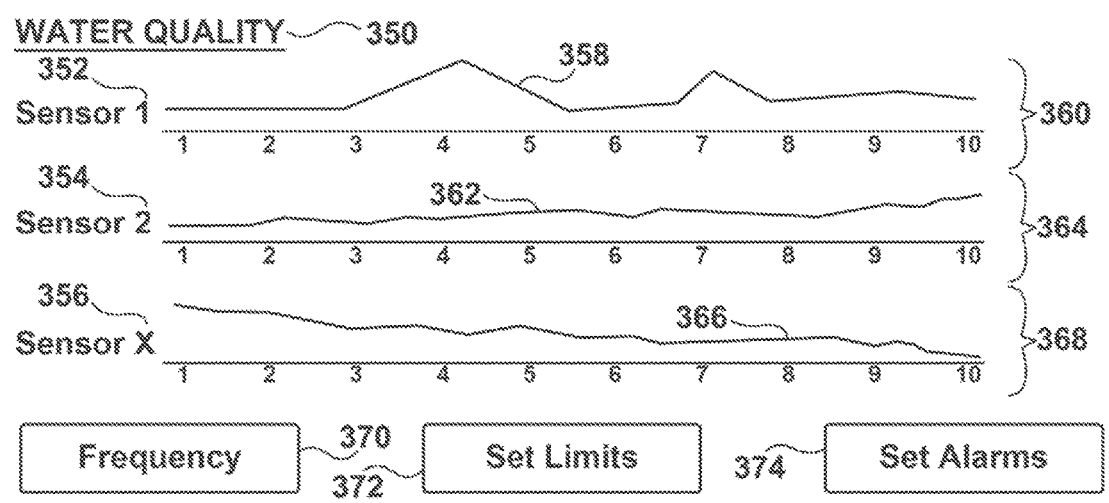
Figure 12A:
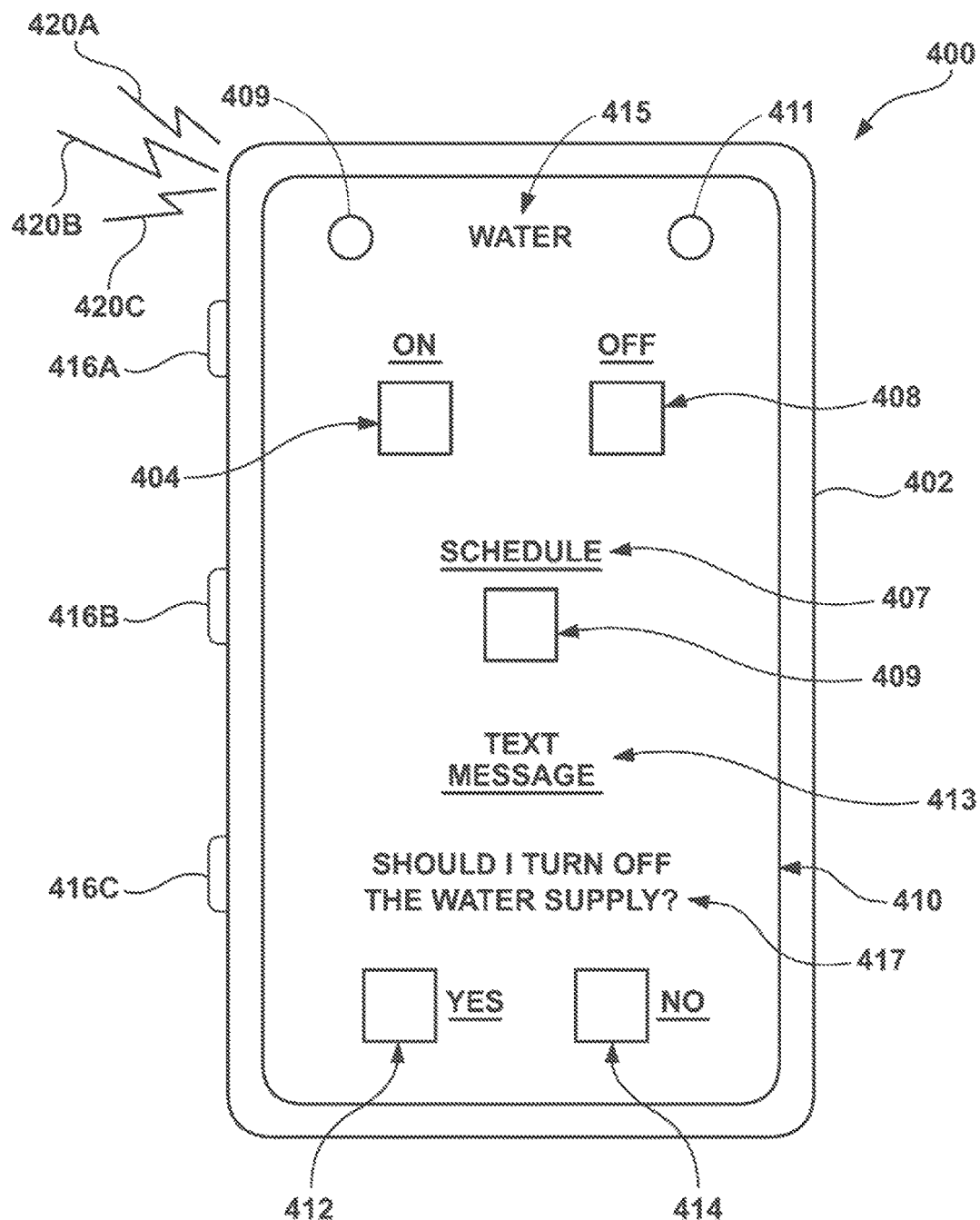
FIG. 12A is a perspective view of a typical cell phone, smart phone or similar apparatus having another "APP" or programmed application, or another page of an "APP" or programmed application to display the soft buttons to determine the period for displaying, graphical of water use devices, leak detection graphical item, and programming and settings features.
Figure 12B:
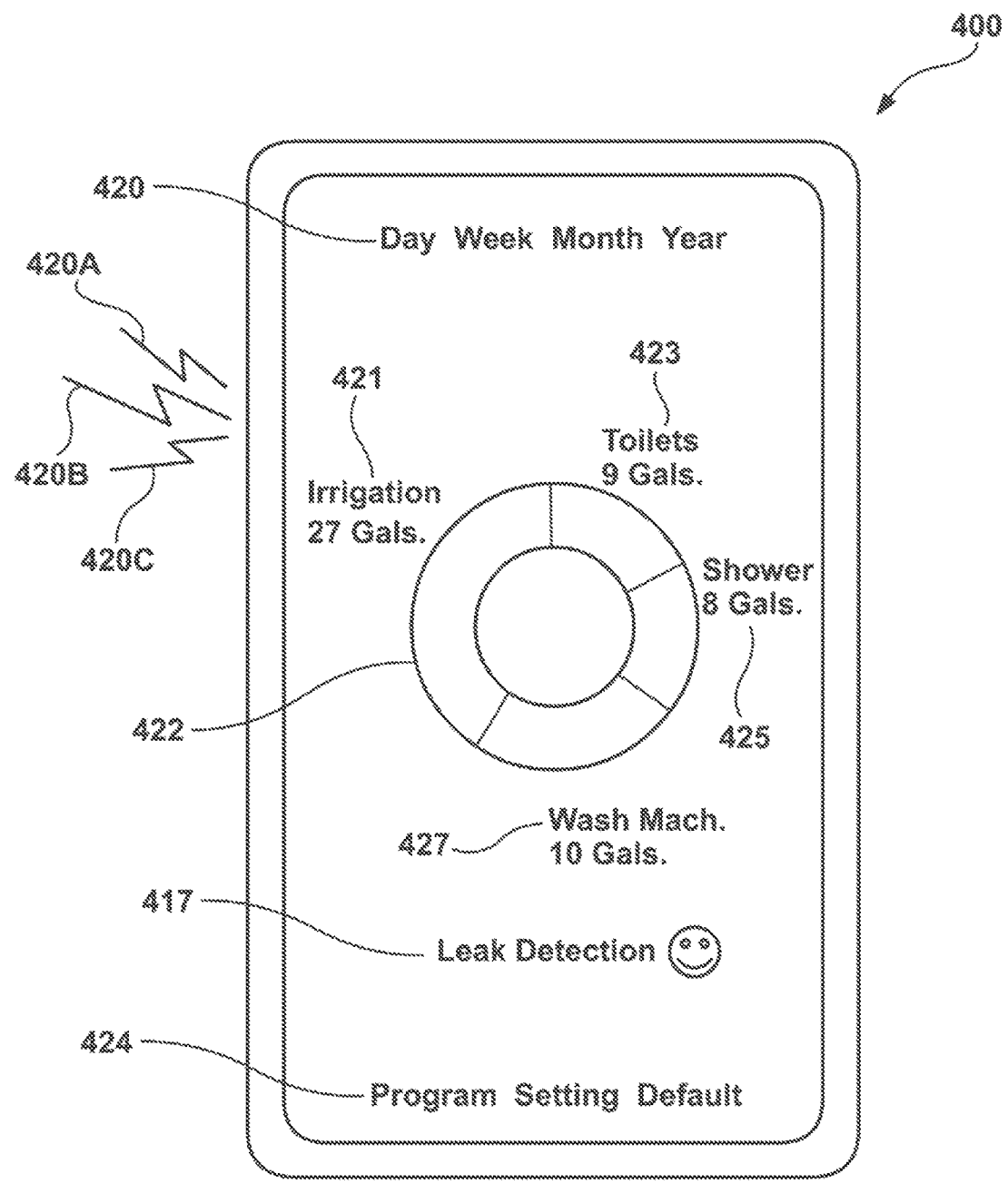
FIG. 12 is an enlarged perspective view of another typical cell phone, smart phone or similar apparatus having an "APP" or programmed application, or another page of an "APP" or programmed application to display the soft buttons or control activator to turn on/or the water system, schedule the water control mechanism, or receive a test message.

Now referring in more detail in FIG. 10, (with different programs applications or APPs as shown in FIGS. 11, 12A, and 12B) where water parameter data the can be displayed on a cell phone, smart phone and similar apparatus 400 as defined herein.

The cell phone, smart phone or similar apparatus 400 or custom display and/or a recording apparatus 50, 56 and 110 has the relatively important function of providing an individual or entity to review water use and water parameter data for auditing or monitoring purposes. It is also anticipated by the Applicants that the optional display means 12, 14, and 16 (shown in FIG. 2) can be located remotely from the water meter and leak detection system 10, 126, 200 containing the CPU or microprocessor 84 with communication and control lines 83 (shown in FIG. 3) that communicate either wired or wirelessly. Hence, the communication and control lines 83 can be used to transfer water use parameters and leak detection alerts to a remotely positioned display receiver apparatus (not shown) or the display means 12, 14, and 16 can be eliminated to be replaced by the first display and/or recording apparatus 50, 56, 110 or on a cell phone, smart phone or similar apparatus 400. The wireless communication means 46, 52 and 56, can use radio-frequency, Bluetooth, ZigBee Wi-Fi, optical or other wireless technology for transferring the water parameter data generated by the sensors and collected by the microprocessor and sent to a wireless to a display means and/or a remotely positioned receiver apparatus or send control signals back to the water/energy use monitor and/or leak detection apparatus 10, 126, 200 with water shut-off/on mechanism 310. Examples of Bluetooth modules (using the 2.4 GHz band as Wi-Fi) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., the Proton or Electron from Particle (formally Spark) in San Francisco, and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Another example of the wireless protocols that can be utilized with the present invention is the ZigBee, Z-wave and IEE 802.15.4 modulation technology. Applicants recognize that there are numerous wireless protocols, such as that associated with the 908-928 MHz frequency range, that have been developed that, although not specifically listed, could be utilized with the present invention for data transfer purposes.

The water meter and leak detection system 10, 126, 200 with water shut-off/on mechanism 310 that transits water parameter data to the internet and to remote computers/servers can also communicate the water leak condition with a user or owner of a home, condo, apartment or other residence, rental/leased house, condo or apartment or other resident, owner or representative of a company or corporate entity, owner or staff of a hotel/motel, institution facility, and/or a governmental agency, housing or facility using a cellular format technology that refers to all current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, W-CDMA, HSPDA+HSUPA, UMTS-TDD and other formats for utilizing cell phone technology, telephony antenna distributions and/or any combinations thereof, and including the use of satellite, microwave technology, the internet, cell tower, telephony and/or public switched telephone network lines. The wireless communication of water leaking conditions can be between the water/energy use monitor and/or leak detection apparatus 10, 126, 200 with water shut-off/on mechanism 310 and a typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufactures), Apple IPOD Touch, or a television, watch, timepiece or fob watch and other similar apparatus with WIFI and wireless capability, and remote computers and controllers having internet or wireless connectivity. The display of the water leaking condition data can be in various pleasing format using digits, analog display, graphics, pictures, charts and/or other characters to exhibit the leaking condition to a user. Also, the transfer of data can use authentication, encryptions, integrity and non-repudiation technology to ensure that data or information is communicated securely.

The water meter and leak detection system 10, 126, 200 with water shut-off/on mechanism 310 can also function to monitor the water use in homes, companies, buildings or other structures by including either highly sensitive flow sensors, standard invasive flow sensors, (e.g. turbine, Pelton, paddle wheel flow, piston, and pressure sensors and other invasive sensors), non-invasive flow use sensors (e.g. Doppler or time-transit ultrasonic, laser or magnetic flow sensors and other non-invasive flow use sensors) to communicate either or both the inside and/or irrigation water flow use on a real time, daily, weekly, monthly, and/or yearly basis. Such water flow use data can be transferred to a remote central monitoring computer service, municipality or government agency, via cell towers, satellite, microwave technology, the internet, telephone lines, and the like. The water meter and leak detection system 10, 126, 200 that transfer water parameters and data to the internet and to remote computer/servers can also communicate with a user or owner of a home, condo, apartment or other residence, rental/leased house, condo or apartment or other resident, owner or representative of a company or corporate entity, owner or staff of a hotel/motel, institution facility, and/or a governmental agency, housing or facility using a cellular format technology that refers to all current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, W-CDMA, HSPDA+HSUPA, UMTS-TDD and other formats for utilizing cell phone technology, telephony antenna distributions and/or any combinations thereof, and including the use of satellite, microwave technology, the internet, cell tower, telephony and/or public switched telephone network lines. The wireless communication of real time, daily, monthly, weekly, monthly, and/or yearly water indoor and irrigation water use can be between the water meter and leak detection system 10, 126, 200 that transfer water parameters to the internet and remote computer/servers and a typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufactures), Apple IPOD Touch, or a television, watch, timepiece or fob watch and other similar apparatus with WIFI and wireless capability, and remote computers and controllers having internet or wireless connectivity. The display of the indoor and irrigation water use data can be in various pleasing format using digits, analog displays, graphics, pictures, charts and/or other characters to exhibit the water use to a user. Also, the transfer of data can use authentication, encryptions, integrity and non-repudiation technology to ensure that data or information is communicated securely. The sensitive water flow sensors, standard invasive flow sensors, (e.g. turbine, Pelton, paddle wheel flow, piston, and pressure sensors and other invasive sensors), non-invasive flow use sensors (e.g. Doppler or time-transit ultrasonic, laser or magnetic flow sensors and other non-invasive flow use sensors) with transceivers can have an extended battery life by utilizing the interval wireless communications or transmissions and with a long lasting battery pack, such as, for example, the Tadiran series of batteries manufactured by Tadiran U.S. Battery in Lake Success, N.Y. A sealed door means is utilized to allow battery replacement. In addition, the batteries can be recharging type and accessed with an electrical coupler accessed from the outside of the highly sensitive flow sensors with transceivers. Or the flow sensors can be powered by low voltage AC e.g. 24 volts AC, or DC current. High voltage current e.g. 240 or 120 volts can also be used and if necessary, the voltage can be reduced with transformers and the like.

Standard invasive flow sensor (e.g. turbine, Pelton, paddle wheel flow, piston, and pressure sensors and other invasive sensors), a non-invasive flow sensor (e.g. Doppler or time-transit ultrasonic, laser or magnetic flow sensors, and other non-invasive flow use sensors) or a sensitive flow sensors (pressure sensor), each with wireless transceivers (and/or standard wired) are designed to have coordination between the remotely controllable base station 200 by using software instructions for timing, network position, and polling operations. For example, the water meter and leak detection system 10, 126, 200 can first send a broadcast message to, for example, one or more invasive flow sensor, non-invasive flow sensors, and/or sensitive flow sensors with transceivers. The broadcast message can instruct the invasive flow sensor, non-invasive flow sensor and/or sensitive flow sensors with transceivers to, for example, synchronize themselves in the system, set their clocks, and identify their wireless path to the water meter and leak detection system 10, 126, 200. After receiving the broadcast message, the invasive flow sensor(s) or non-invasive flow sensor(s), with transceivers can send an acknowledgement back to the water meter and leak detection system 10, 126, 200 revealing their location in the system.

Referring to FIG. 12A, which shows a perspective view of a typical cell phone, smart phones, or similar apparatus 400 having an application 410, commonly known as an "APP", programmed to display soft buttons or use control activators on a cell phone, smart phone, or similar apparatus 400, designed to wirelessly communicate or send signals to and from the water meter and leak detection system 10, 126, 200 with water shut-off/on mechanism 310. It is also anticipated that the apparatus 400 could be an Apple IPAD, HP, Samsung, LG, or other manufacture's tablet and that the application 402 that would function as described below. Furthermore, apparatus 400 could be a remote computer or television that is connected to the internet or has wireless capability. Shown in FIG. 12A is an example of an application 410 which will typically display soft buttons for controlling water on 404 and water off 406 by sending wireless instructions to the remotely controllable base station 200. It is anticipated by the Applicant that other configuration of application displays for remotely communicating with the water meter and leak detection system 10, 126, 200. The application 410 can also have a soft schedule button 408 which sequentially adds displays for entering a predetermined schedule for turning on and off the water at the collection node of the water meter and leak detection system 10, 126, 200. The predetermined schedule can be sent to the water meter and leak detection system 10, 126, 200 for continuous sequencing operations on a, hourly daily, weekly, monthly or yearly basis. The predetermined schedule can be stored in a memory module at the water system and leak detection system 10, 126, 200.

An option of the application 410 is shown as a decisional text message 413 inquiring if the individual would like the water turned off 417 sent to display 402 of the cell phone, smart phone or similar apparatus 400. The cell hone, smart phone or similar apparatus 400 would preferably have incorporated GPS technology that can determine the location of the cell phone, smart phone or similar apparatus, and know or saved the home or remotely controllable base station 10, 126, 200 locations. Triangulation techniques between cell towers can also be used if the cell phone, smart phone or similar apparatus 400 does not have GPS capability. The application 402 could or will have a routine that can program the distance from the remotely controllable base station 200 that an individual desire to be provided a notice of the decisional text message. If the water is not turned off when the individual leaves the residence or business, and the cell phone, smart phone or similar apparatus 400 has been programmed for a set distance from the base station e.g. ¾ mile, then the decisional text message 417, for example, "Should I turn off the water supply", will be sent to the cell phone, smart phone or similar apparatus 400. The rational for the decisional text message is that, for the present invention to function as a water damage prevention system, substantial compliance with routine turning off the water when a home or business in unoccupied is necessary. The decisional text message 417 provides the individual a soft button "yes" 412 to turn off the water at the collection node of the water meter and detection system 10, 126, 200 or "no" 414 and leave the collection node of the water meter and detection system 10, 126, 200 with the water control valve on. Hard button activators 416a, 416b and 416c can also be used to communicate with the water meter and leak detection system 10, 126, 200 that transfer water use data to the internet and then to remote computers/servers for cell phones, smart phones or a similar apparatus that a limited display screens or no touch screen capability. For example, hard button 416a can communication with the water meter and leak detection system 10, 126, to turn the water system on, hard button 416b can communication with the water meter and leak detection system 10, 200 to turn the water system off, and hard button 416c can communication with the base station to open a schedule page.

Another optional decisional text message 417 can sent to the cell phone, smart phone or similar apparatus 400 if one of the optional sensitive flow or pressure sensors detects a leaking condition. The text message could specify "Leak found in kitchen area, should I turn of the water supply". The decisional text message 417 provides the individual a soft button "yes" 412 to turn off the water at the base station or collection node of the water meter and detection system 10, 126, 200 or "no" 414 and leave the base station or collection node of the water meter and detection system 10, 126, 200 with the water control valve on. Hard button activators 416a, 416b and 416c can also be used to communicate with the base station for cell phones, smart phones or a similar apparatus that a limited display screens or no touch screen capability. This optional leak detection message could also be sent the insurance or municipality agency monitoring station by PSTN or wireless means to notify of the leakage condition. It is also anticipated by the Applicant that the leak detection message could also be transferred to the supplying municipality to inform them of the leak such that the municipality can take action to repair the leak condition.

Also shown on FIG. 12A are one or more visual signals 409, 411 (e.g. LED or LCD) lights that are turned on (and off after a period of time) to communicate to an individual that the water/energy use monitor and/or leak detection apparatus 10, 126, 200 with water shut-off/on mechanism 310 has completed the programmed activity. For example, only, 409 could be a red LED light that illuminates when the water system is turned off and 411 could be a green LED light that illuminates when the water system is turned on. It is anticipated by the Applicant that verbal signal (verbal "water off" or verbal "water on" or simply a playing certain ringtones) can also be used to communicate that the programmed activity has been completed. Also shown near the middle of the "APP" (program) page is a soft button 404 for turning on the water system and anther soft button 408 for turning off the water system. A labelled 407 soft button 408 is used to bring up another page(s) that allows an individual to input a water on and off schedule. Various hard buttons 416A, 416B, and 416C can be used to supplement the soft buttons and/or menu pages for movement within the page or inputting data. On the bottom of the "APP" (program) is a text message sent to the home owner or resident or business or company employee the option to turn on or off the water system or supply. On the bottom of the "APP" (program) is a text message send to the home owner or resident or business or company employee the option to turn on or off the water system or supply" deletes. Shown on the side are the Bluetooth 420A, Wi-Fi 420B and cellular communication 420C means that wirelessly connects the cell phone, smart phone or similar apparatus 400 to the base station 10, 126, 200.

Typical cell phones, smart phones, and similar apparatuses 400 may have one or more means of communication that can be established with a particular remotely controllable base station 200 for wireless communication. The use of Bluetooth wireless technology 420a is commonly a feature found on many cells phones, smart phones and similar apparatus. Such Bluetooth wireless communication 420a can be a means to communicate with the water meter and leak detection system 10, 126, 200 with water shut-off/on mechanism 310 to turn the water on or off or receive decisional text messages 410. Zigbee is another wireless technology that can be used. However, most current cell phones, smart phones or similar apparatus 400 do not possess Zigbee wireless capability.

The use of Wi-Fi (IEEE 802.11 family of wireless local area network) wireless technology 420b is commonly a feature found on many cells phones, smart phones and similar apparatus 400. Such WIFI wireless communication 420b can be a means to communicate remotely with the water meter and leak detection system 10, 126, 200 with water shut-off/on mechanism 310 to turn the water on or off or receive text messages. The water meter and leak detection system 10, 126, 200 can have the capability to receive and transfer wireless signals and decisional text messages 410 using Wi-Fi technology directly to the water meter and leak detection system 10, 126, 200 with water shut-off/on mechanism 310. Alternately, the Wi-Fi communication 420b will communicate with a wireless router/server that has a HTML or other communication-based interface and configuration page graphic user interfaces. Remote access from the cell phone, smart phone or similar apparatus 400 could use a short message service (SMS) interface and/or voice of Internet Protocol (VOIP) which communicates with the wireless router. This Wi-Fi technology will access the internet and have the ability to recognize the cell phone, smart phone or similar apparatus 400 phone number for remote capability using SMS interface. A digit numbers security can be used to maintain restricted integrity. Wireless Transmitters and Receivers can be used for Wi-Fi communication 420b to the water meter and leak detection system 10, 126, 200 for individuals lacking internet capability at their residence.

The use of cellular wireless technology 420c is a primary feature of cells phones, smart phones and similar apparatus. Such cellular wireless communication 420c can be a means to communicate with the water meter and leak detection system 10, 126, 200 with water shut-off/on mechanism 310 to turn the water on or off or to receive text messages.

The application 410 will have to interface with the Bluetooth 420a, WIFI 420b, or cellular 420c wireless communication means, and send instructions to a specific "paired" water meter and leak detection system 10, 126, 200 with water shut-off/on mechanism. Various pairing methods between the water meter and leak detection system 10, 126, 200 with water shut-off/on mechanism 310 and the cell phone, smart phone or similar apparatus 400 are contemplated to be necessary to ensure that proper communication is established between a single and unique remotely controllable base station 200 in addition to one or more unique cell phone, smart phone or similar apparatus 400. A Quick Response Code (QR code) unit address located on water meter and leak detection system 10, 126, 200 can communicate with a cell phone, smart phone or similar apparatus 400 having a camera to read QR and establish link to the remotely controllable base station 200. Standard barcodes could would to pair and establish a link between the water meter and leak detection system 10, 126, 200 with water shut-off/on mechanism 310 and the cell phone, smart phone or similar apparatus 400. Near field link and RFID chip technology can also be used to facilitate pairing and establish a link between the water meter and leak detection system 10, 126, 200 and the cell phone, smart phone or similar apparatus 400. Currently bar code readers are applications that can be downloaded for a particular cell phone, smart phone or similar apparatus operation system. Near field links are only recently becoming available on Samsung smart phones, but this technology may be expanded to many, if not all, cell phones, smart phones or similar apparatus.

In operation, an individual who wants to turn off the water system would touch the off the soft button 408 or reply to the text message to turn off the water system "yes" soft button 412, or push the hard button 416b on the a cell phone, smart phone or similar apparatus 400 which will communication with the water/energy use monitoring display apparatus 10, 200 via the internet, wireless technology (e.g. Bluetooth, ZigBee), and/or cellular format technology and then the paired water meter and leak detection system 10, 126, 200 with water shut-off/on mechanism 310 would turn off the water system off and then when completed (specified by switches and/or a flow sensor) will send a returned communication signal to the a cell phone, smart phone or similar apparatus 400 and turn on signal (audio or visual) message 409 that the water system is off. Comparable, an individual who wants to turn on the water system would touch the "on" the soft button 404 or reply to the text message to turn off the water system 410 "no" soft button 412, or push the hard button 416a on the a cell phone, smart phone or similar apparatus 400 which will communication with water meter and leak detection system 10, 126, 200 with water shut-off/on mechanism 310 via the internet, wireless technology (e.g. Bluetooth, ZigBee), and/or cellular format technology and then the paired remotely controllable base station 200 would turn off the water system off and then when completed (specified by switches and/or a flow sensor) will send a returned communication signal to the a cell phone, smart phone or similar apparatus 400 and turn on signal (audio or visual) message 409 that the water system is off.

FIG. 12B is a perspective view of the embodiment comprising a home with the water meter and leak detection system 10, 126, 200 (with or without the water shut-off/on mechanism 310) interposed within the main water supply system 208 and the first distribution line for the home or company 310 and communicating wirelessly with a cell phone, smart phone or similar apparatus 400 held in the hand 221 of an individual 212. The cell phone, smart phone, or similar apparatus 400 communicates with the water meter and leak detection system 10, 126, 200 using Bluetooth or ZigBee wireless technology 420*a*, Wi-Fi wireless communication 420*b* and/or cellular wireless technology 420*c*.

A flow sensor 280 can be incorporated into water use/water energy use monitor and/or leak detection apparatus 10, 200 with water shut-off/on mechanism 310 to monitor water flow. The flow sensor 280 can be used to send a signal utilizing the CPU, microprocessor and/or microcontroller to the remote controllers 218, 220, 244, 400 for confirmation that the water flow has been interrupted. The flow sensor 280 receives electrical energy from power line 282 and ground to line 284.

FIG. 10 is a perspective view of an "APP" or programmed application that provides water use data in various example formats that is transferred from the base station to a remote display/recording apparatus 18, 50, 56, or a remote computer or a cell phone, smart phone, or similar apparatus 400. The programmed application or APP shows an average time of water use data, average water use data, water cost data, energy calculations using the water heater type, the state located, cost of natural gas or oil per Therm, efficiency information, and the average ambient water temperature and the desired water temperature use for hot water devices (e.g. shower, faucets). On the bottom of FIG. 16 is the water energy calculation and water costs for the day, week, month, year, and 2 year dates. The Applicant contends that many different water energy calculations can be used with the present invention without deviated from its intended use. The water parameter use and monitoring apparatus can communicate with a said typical cell phone, smart phones, or similar apparatus includes an application for a consumer/resident, corporate entity, or municipality that show the daily, weekly and/or monthly water use and/or daily, weekly or monthly water costs.

Shown in FIG. 11 is a perspective view of a first example application (APP), or a first page of an application (APP) 300, displayed on a typical cell phone, smart phone or similar apparatus 400 (see FIGS. 12A and 12B). This example application (APP) or page 300 is designed as a line graph format to be used by the resident of a home or a representative of a company or a corporation to monitor water conservation, but is it anticipated by the Applicant that the application (APP) 300 could be used by municipal or government representatives.

FIG. 11 shows and example of an application or page (APP) 300 for Water Use 302 having a daily 304 graph 306 with day hours 308, designated by the symbol AM 312 and the night hours 310 designated by the symbol PM 314. At the right side of the example application or page (APP) 300 is the daily total use of water 316 and the daily total cost in dollars (or other currency) 318 that has been downloaded the data 340 from the registered or serving water municipality. Within the daily graph 306 is a plotted line 307 that shows the hourly water use. The plotted line 307 can have a rolling feature whereby new data replaces the oldest data in the graph. A gallon or liter scale can be included on the left side of the daily graph 305 (not shown).

The example of an application or page (APP) 300 for Water Use 302 can also have a weekly 320 graph 322 with days 324. At the right side of the example first application or page (APP) 300 is the weekly total use of water 326 and the weekly total cost in dollars (or other currency) 328 that has been downloaded the data 340 from the registered or serving water municipality. Within the weekly graph 322 is a plotted line 327 that shows the daily water use. The plotted line 327 can have a rolling feature whereby new data replaces the oldest data in the graph. A gallon or liter scale can be included on the left side of the weekly graph 322 (not shown).

The example of an application or page 300 for Water Use 302 can also have a monthly 334 graph 330 with months 332. At the right side of the example first application or page (APP) 300 is the monthly total use of water 336 and the monthly total cost in dollars (or other currency) 338 that has been downloaded the data 340 from the registered or serving water municipality. Within the monthly graph 330 is a plotted line 337 that shows the daily water use. The plotted line 337 can have a rolling feature whereby new data replaces the oldest data in the graph. A gallon or liter scale can be included on the left side of the monthly graph 330 (not shown).

The water meter and leak detection system 10, 126, 200 is designed to transfer data and information by utilizing the wireless communication with the one or more remote display and/or recorder apparatus, or cell phone, smart phone or similar apparatus whereby the remote display and/or recorder apparatus or cell phone, smart phone or similar apparatus can automatically convert back and forth from radio frequency format, ZigBee or Bluetooth format to a cellular format technology to accommodate different range requirements.

Also shown in FIG. 11 is a Download Button 340 which is designed to manually or automatically download water rate and expense data from the servicing and registered water municipality or other source. The cost per gallon, hundred cubic feet (HCF) or other measurement is usually dependent on volume used over a given period. For example, from 0-8 HCF could be billed at $3.64 per HCF, 9-24 HCF could be billed at $4.08 per HCF, and 25-36 HCF could be billed at $5.82 per HCF. This is only an example data that can be downloaded and utilized to determine the daily cost 318, weekly cost 328, or monthly cost 338. Other data can be downloaded from the water municipality or other source such as warnings for drought conditions, metering policies, quality messages, limits, alarms, etc.

Also shown in FIG. 11 is a user, whether it is a home owner or company representative, who can Set Limits 342 for water use to command the water meter and leak detection system 10, 126, 200 to turn the water completely off for example, if a limit of water flow exceeds a limit, or sound a verbal or audio alarm. It is anticipated that the servicing and registered water municipality or other source can upload Set Limits 342 to the individual water meter and leak detection system 10, 126, 200. It addition, the Set Alarms 344 for water use can be used to display visually or provide audio signals of alarming conditions associated with the daily, weekly or monthly water use. The application (APP) 300 is designed to promote water conservation and monitor for leaking conditions.

Also shown on the FIG. 11 is an optional Water Quality section 350 of the application (APP) 300. As shown, optional water quality Sensor 1 352 can monitor one or more halogen elements or compounds, monitoring total dissolve solids, monitoring a metallic or iron element or compound, monitoring water hardness, monitoring biological or coliform contaminates, monitoring pH, or any combinations thereof. The plotted line 358 for Sensor 1 shows peaks and valley over the time period 360. The time period can be selected for daily, weekly or monthly. Sensor 2 354, can be another water quality sensor and Sensor X 356 can be one or more water quality sensor taken from the group define above.

Shown below in this optional Water Quality section 350, is a Frequency Soft Button which allows the user to define the time period, daily, weekly or monthly. A user, whether it is a home owner or company representative, who can Set Limits 372 for water quality to command the water meter and leak detection system 10, 126, 200 to turn the water completely off, limit the flow, or sound a verbal or audio alarm. It is anticipated that the servicing and registered water municipality or other source can upload Set Limits 372 to the individual water meter and leak detection system 10, 126, 200 (with water shut-off/on mechanism 310). It addition, the Set Alarms 374 for water use can be used to display visually or provide audio signals of alarming conditions associated with the daily, weekly or monthly water use.

As FIG. 11 is only an example of presentation of the water use and water quality data, it is anticipated that other formats for displaying the daily, weekly, monthly, or annual water use and water quality use. Such formats can be in bar graph format, pie graph format, cosmography formats, tabular formats, time series graph formats, histogram formats, data plot format, scatter plot format, other graph formats, or a combination of these graph formats. In addition, it is anticipated that the water flow data presented in line graphs, tabular formats or graphic formats or any combination of the formats listed herein can be presented on one or more pages or screens of the typical cell phone, smart phone or similar apparatus.

FIG. 12B shows a typical cell phone, smart phone or similar apparatus having an "APP" or programmed application, or another page of an "APP" or programmed application to display the soft buttons or control activators to turn on/off the water system, schedule the water control mechanism, or receive a text message that utilizes the technology and functionality as previously described. On the top are soft buttons to select data for a day, week, month or year for the exemplary pie chart format 422 showing the total volume distribution of water use devices, irrigation 421 at 27 gals., toilet 424 at 9 gals., shower 425 at 8 gals., and washing machine 427 at 10 gals. This display of water used by the water use devices utilizes water flow rate, water use duration and total water volume data in software calculations that generates water use patterns or water signatures for leak detection and/or displaying water use and/or water quality information or data on a cell phone, smart phone, mobile phone, computer or similar electronic apparatus. Below is a Leak Detection icon showing an example "happy face" indication that no leaks have been detected. Obviously, it is anticipated that may other icons or data may be used instead of the "happy face" icon. On the bottom of the APP page are soft buttons for program, setting and default selections 424 which would bring up sub-menus with various programming features and settings.

FIG. 12B shows a typical cell phone, smart phone or similar apparatus having an "APP" or programmed application, or another page of an "APP" or programmed application to display the soft buttons or control activator to turn on/or the water system, schedule the water control mechanism, or receive a test message and utilizes the same technology and functionality as previously described. On the top are soft buttons to select data for a day, week, month or year for the pie chart format 422 showing the total volume distribution of water use devices; irrigation 421 at 27 gal., toiled 423 at 9 gal., shower 425 at 8 gals. and washing machine 427 10 gals. Below is a Leak Detection icon showing an example happy face indication that no leaks have been detected. Obviously, it is anticipated that many other icons or data may be used instead of the happy face icon. On the bottom of the APP page are soft buttons program, setting and default 424 which would be up sub-menus with various programming features and settings.

Figure 13:
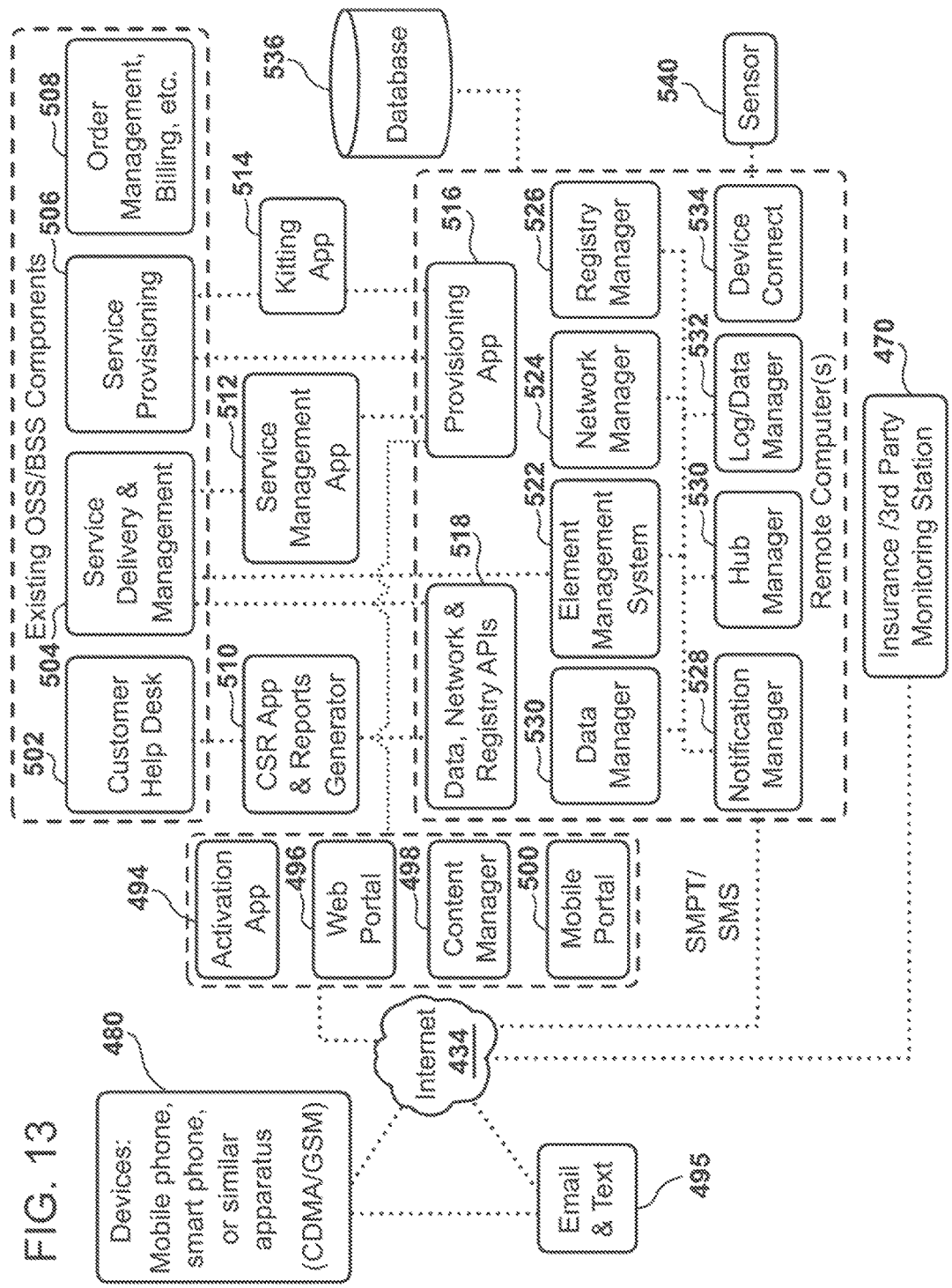
FIG. 13 is a block diagram of components of the more integrated system showing the software and hardware components of the local router/server and remote computers ("the Cloud")

FIG. 13 is a block diagram of components of the more integrated system showing the software and hardware components of the local router/server and remote computers ("the Cloud")

There are numerous types of components of the remote computer and servers including, but not limited to, remote computer components which manage information about the home monitoring and leak detection using the water meter and leak detection system 10, 126, 200 (with water shut-off/on mechanism 310) and end-user applications and components which display the monitoring and signal information for users via XML APIs on cell phones, smart phones, and similar apparatus 400, 480. In addition, service management application components which enable operators to administer the service are included.

The server components provide access to, and management of, the objects associated with the water meter and leak detection system 10, 126, 200 (with water shut-off/on mechanism 310) functionality. The top-level object is the local network. It is a location where a local router/server 438 is located, and is also commonly referred to as a site or premises. The site or premises can include any type of structure (e.g., home, rental office, warehouse, hospitals, and institutions) at which a local router/server 438 is located. Users can only access the networks to which they have been granted permission.

The business Components are responsible for orchestrating the low-level service management activities which define all of the users and devices associated with a network (site), analyze how the devices interact, and trigger associated actions (such as sending notifications to users).

At a home or business customer premises, an internet connection (e.g. cable, DSL, satellite or other service) and router/server 438 connects and manages water meter and leak detection system 10, 126 200. The internet connection and router/server 438 communicate with water meter and leak detection system 10, 126 200 to remote computers (cloud) via the internet 434. Home owners, corporate representative, insurance company, municipality agencies and/ or third party can have monitoring station 470 located in the service provider's data center (or hosted by an insurance, municipality agencies and/or third-party monitoring, and data center) that has controlled access to the water flow or leak detecting data or process control signals through the remote computers. These remote computers can have complex operations and are comprised of many components that are commonly termed the Operational Support Systems and the Business Support Systems ("OSS or BSS). In a basic relationship the OSS will serve the inventory, service assurance, design and activation activities and the BSS will serve order management, billing, and product catalog The OSS/ BSS manages the system operations necessary to deliver the integrity of the system service described herein. The combination of the broadband router/server 438 and the OSS/ BSS enables a wide variety of support type devices 430 (e.g., PCs, mobile phones and PDAs, computers, televisions) to communicate with the water use/water energy use monitor and/or leak detection apparatus 10, 200, allowing home owner, business representative, or users to remotely control or monitor the residential or commercial water supply.

The cell phone, smart phone or similar apparatus, computers and televisions 400, 480 are shown electrically communicating (using cellular protocols (CDMA and/or GSM or other cellular protocols) with the internet 434 and email and text providers 495. The cell phone, smart phone or similar apparatus 400, 480 can use Wi-Fi or radio frequency to electrically communicate with a local router/server 438 and then to the internet. A web browser accessing a Web Portal application 272, performing configuration and customization of the monitoring of the water meter and leak detection system 10, 126, 200 (with water shut-off/on mechanism 310). The activation APP 494 will commonly reside on the cell phone, smart phone or similar apparatus 480, and the web portal 496, content manager 498 and mobile portal 500 components will typically be associated with the water meter and leak detection system 10, 126 200 (with water shut-off/on mechanism 310) but some of these communication components can reside on the cell phone, smart phone or similar apparatus 400, 480 and/or the locale router/server 438. In addition to HTTP or HTTPS communications 422, the router/server 438 and remote operation service center 452 can support the use of a cellular network 436 (GPRS, GSM and CDMA options are available) as another means to provide the primary broadband connection 438 to the internet 434. Local routers/servers 438 such as those currently seen in homes or companies are enabled to communicate with the internet via a DSL line (over the switch telephone network (PTSN), cable modem, or satellite). One viable option is to build a cellular network circuitry into the router/server 438 or water meter and leak detection system 10, 126, 200 (with water shut-off/on mechanism 310). Alternately, a cell phone, smart phone or similar apparatus 400, 480 can be used as a "hotspot". When configured as such, the cell phone, smart phone or similar apparatus 400, 480 "hotspot" turns instantly into a local router/server 438 to which the water meter and leak detection system 10, 126, 200 (with water shut-off/on mechanism 310), PC, or internet television can communicate with the internet 434.

The OSS/BSS is managed by a remote computer service provider (cloud) via the browser-based service, delivery and maintenance applications that are provided within the remote computer operational service center. Or, if preferred, the service can be more tightly integrated securely with the existing OSS/BSS and service delivery systems via the web based XL data, network and registry APIs 518 to association computers and servers.

The integrated insurance, municipality agency or other third-party service 470 can also coordinate the monitoring of compliance data use and/or perform the services of the remote operational service center 452 and the communication with the internet 434 optionally store data on remote computers (cloud).

The remote servers can support custom-built integrations with a service provider's existing OSS/BSS, CSR reports generator 510 and service management APPs 512. OSS and BSS are important components of a company providing remote computer services. Both systems are interdependent and proper integration between OSS and BSS should be achieved to align the business and operations into a common goal. Proper integration between OSS and BSS systems are significant in telecom operations, where business is totally dependent on the operation of the network. The OSS primarily focuses on the status of the operation while, the BSS primarily handles the business interfacing with the customer or end user.

The OSS generates important data about the status of a network and facilitates maintenance for efficient operations. In case of an operational issue, OSS is used to perform diagnostics and gather useful information, which includes identification of the location and data transfer. OSS is used to monitor the status of critical areas and their interoperability to maintain the uninterrupted service to the customers and users. Network software upgrades and maintenance are also handled by OSS.

The BSS includes the applications that support user interfacing, and water parameter data download and upload activities. BSS support key processes such as data billing management, user management, product management and order management. Data billing management includes major processes such as billing and charging, for water services. User management basically comprises customer issue tracking systems. Product management and order management systems compose of water service creation and order handling systems.

The following remoter computer components manage the main elements of the remote computer service, but this only exemplary and is not so limited. Several of the component defined and described can be replaces by a newly design operation(s), combine operations, or eliminate some component(s) as technology advances The primary components include, but are not limited to, a registry manager 526 which provides access to the registry manager component's functionality, allowing management of networks and users. A network manager 524 provides access to the network manager component's functionality, allowing management of devices on a network, and a data manager 530 provides access to the data manager component's functionality, such as setting and retrieving (current and historical) water use data and leak detection data.

Also shown in FIG. 13, is a computer systems report application and report generator 510 is used by customer help desk personnel 502 which supporting the remote computer service. The service delivery and management components include, but are not limited to, a service management application 512 which allows service administrators to perform activities associated with water service installation, and monitoring/alerting activities. A kitting application 514 is used by employees performing service provisioning tasks. Order management and billing 508 is used to compile costs associated with service activities and generate billing reports to users or municipalities. A provisioning component 516 provides a simple way to create new networks and configure initial default properties. Each API of an embodiment includes several modes of access: Java API or XML API. The XML APIs are published as web services so that they can be easily accessed by applications or servers over a network. The Java APIs are a programmer-friendly package for the XML APIs. APP components and integrations written in Java should generally use the Java APIs rather than the XML APIs directly.

The data manager 530 manages access to current and logged state data for an existing network and its permitted reviewers. This component specifically does not provide any access to network management capabilities, such as adding new devices to a network, which are generally handled by the Network Manager 524. To achieve optimal performance for all types of queries, data for current device states is stored separately from historical state data in the database 536.

The element management system 522 can be used to manage activities associated with service installation, monitoring and filtering activities and packages service. The element management system 522 can also be incorporated into any third party monitoring system if desired.

A registry manager 526 defines and administers users and networks. The registry manager 526 is responsible for the creation, modification and termination of users and networks.

A network manager 222 defines and manages the creation of automations, schedules and notification rules associated with water meter and leak detection system 10, 126, 200 (with water shut-off/on mechanism 310). A log data manager 532 performs ongoing transfers of current device state data to the historical data log tables.

Additional, but not essential business components can be used to manage and direct communications with certain users, municipalities and other entities, for example, the hub manager 530 can be used to directly manages all communications with gateway clients, including receiving information about device state changes, changing the configuration of devices, and pushing new versions of the software to the water meter and leak detection system 10, 126, 200 (with water shut-off/on mechanism 310) hardware. A Notification Manager 528 is responsible for sending all notifications to client's cell phone, smart phone or similar apparatus 400, 480 via SMS mobile phone messages and/or email. Alarms can be generated for critical events to the home or business that a leak has been detected.

FIG. 14 is another block diagram of the more integrated system showing the software, hardware and applications of the home or corporate premises communicating with the present invention base station and communicating with the internet and remote computer service station ("the Cloud"). The water meter and leak detection system 10, 126, 200 (with water shut-off/on mechanism 310) includes, a preferred, but optional receiving station or communication hub (not shown) that connects either hard wired or wireless to a router/server 438 and the remote computers/servers 452 communicating with a cell or mobile phone, smart phone, or similar apparatus 400 (408). At a user's home or business, the water meter and leak detection system 10, 126, 200 (with water shut-off/on mechanism 310) connects to the router/server 438 with authentication, and preferable encrypted data. The water meter and leak detection system 10, 126, 200 (with water shut-off/on mechanism 310) system communicates with the remote computers 452 located in the service provider's data center or hosted in integrated security system data center), with the communication taking place via a communication network (e.g., cellular network, internet, etc.).

The cell or mobile phone, smart phone, or similar apparatus 400 is used to wirelessly communicate with the water meter with leak detection system 10, 126, 200 (with water shut-off/on mechanism 310). The cell or mobile phone, smart phone, or similar apparatus 400 preferably has downloaded programs or applications ("APPs") that communicated with the water meter and leak detection system 10, 126, 200 (with water shut-off/on mechanism 310) for displaying water use, energy use and water quality as described herein. The cell or mobile phone, smart phone, or similar apparatus 400 downloaded program or applications ("APPs") can specifically turning on and off the water supply to a home or business when it is not occupied. The water meter and leak detection system 10, 126, 200 (with water shut-off/on mechanism 310) is not only designed to monitor for water use, energy use, and water quality, but to monitor of leak detection conditions and provide text messages, alerts signals, or emails regarding water leak conditions. The water meter and leak detection system 10, 126, 200 (with water shut-off/on mechanism 310) can be programmed by the user to automatically shut off the water supply when a leak condition is observed. For purposes of brevity, water use data, water energy data, water quality data and leak detection signals and alerts utilizing the communication means described below.

As shown in FIG. 20, a the residential or corporate premise 442 will have the water meter and leak detection system 10, 126, 200 (with water shut-off/on mechanism 310) electronically connected to a local router or server 438, via a receiving station, by wire means 446 or wireless means 445. The cell or mobile phone, smart phone, or similar apparatus 400 (480) can electronically connect to the router/server 438 by wireless communication signal 437 which using radio frequency protocol 801.2b/g/n/x, Wi-Fi, Bluetooth, ZigBee or other wireless technology. As shown, the cell or mobile phone, smart phone, or similar apparatus 400 (480) can communicate with the internet 434 not using the local router/server 438 but another public or private router/server by wireless communication signal 423 which using radio frequency protocol 801.2 b/g/n/x, Wi-Fi, Bluetooth, ZigBee or other wireless technology. The cell or mobile phone, smart phone, or similar apparatus 400 (480) can utilized it primary cellular communication means 425 using the cellular network (cell towers, relay stations, etc.) 436 which has established connection 439 with the internet 434.

Shown in FIG. 20, is the insurance company, water municipality or $3^{rd}$ party monitoring station 470 that communicates directly 450 with the specific water meter and leak detection system 10, 126, 200 (with water shut-off/on mechanism 310) located at a specific home or corporate premises using a land phone line (public switched telephone network or PSTN) 450. The insurance company, water municipality or $3^{rd}$ party monitoring station 470 can obtain water use and leak detection data and information from the specific water meter and leak detection system 10, 126, 200 (with water shut-off/on mechanism 310) by optional hard wire means 466 or wireless 467 means to the internet 434.

FIG. 15 is a block diagram including water meter and leak detection system 10, 126, 200 (with water shut-off/on mechanism 310) software or applications. The water meter and leak detection system 10, 126, 200 (with water shut-off/on mechanism 310) software architecture has relatively small programmed instructions that are efficient, thereby simplifying its integration into other consumer electronic devices such as service routers. The software architecture also provides a high degree of security against unauthorized access by using authentication, encryption and/or nonrepudiation technology. The following paragraph(s) describe the various key components of the water meter and leak detection system 10, 126, 200 (with water shut-off/on mechanism 310) software architecture.

The control software can include a hub application layer 580 which is the main program that orchestrates the operations of, and location of the cell or mobile phone, smart phone, or similar apparatus software 582, and orchestrate the operations of, and location of the router/server connection software 584. The Security Engine 588 provides robust protection against intentional and unintentional intrusion into the integrated water meter and leak detection system 10, 126, 200 (with water shut-off/on mechanism 310) (both from inside the premises as well as from the WAN, LAN or Internet, cellular network or outside premises). The Security Engine 588 comprises one or more sub-modules or components that perform functions including, but not limited to, the following, Encryption can include, for example, 128-bit SSL encryption to provide secure communication. Bi-directional authentication between the water meter and leak detection system 10, 126, 200 (with water shut-off/on mechanism 310) and the cell or mobile phone, smart phone, or similar apparatus 400 (480) is used to confirm that the water use data and information have been transferred to, and received software instructions from, one or more cell or mobile phone, smart phone, or similar apparatus 400 (480) that have specific rights to communicate with the water meter and leak detection system 10, 126, 200 (with water shut-off/on mechanism 310) through the router/server 438. Data sent from the router/server 438 to the cell or mobile phone, smart phone, or similar apparatus 400 (480), or vice versa, and is digitally signed as an additional layer of security. Non-repudiation technology that prevents a sender from denying that a message, data or information was sent can be incorporated. Digital signing provides both authentication and validation that the data has not been altered in transit. The router/server 438 provides for 128-bit SSL encapsulation of signal data sent over the internet 434 for complete integrity. Wireless IEEE 802.11b/g/n/x with WEP, WPA-PSK [TKIP], WPA2-PSK [AES], WPA-PSK ([TKIP]+WPA2-PSK [AES] or other security protocol variant to ensure that signals and communications always takes place using the strongest available protection. Attempts to activate gateway-enabled devices by intentional and unintentional intrusion are detected by the Security Engine. Pairing remote devices 480 have the information with the correct serial number or activation key (pairing) can be activated for use with water meter and leak detection system 10, 126, 200.

As standards evolve, and new encryption and authentication methods are proven to be useful, and older mechanisms proven to be breakable, the remote devices 480 and the water meter and leak detection system 10, 126, 200 with water shut-off/on mechanism 310 or components of the OSS/BSS can be upgraded by downloading updated software wirelessly or by a physically means of swapping out electrical components to provide new and better security for communications between the remote devices 480 and the water meter and leak detection system 10, 126, 200 with water shut-off/on mechanism 310.

A firmware download module 590 allows for secure updates to the modem/router 444 or remote device firmware through the Maintenance Application 594 providing a transparent, hassle-free mechanism for the service provider to deploy new features and bug fixes to the installed user base. The firmware download mechanism 590 is tolerant of connection loss, power interruption and user interventions (both intentional and unintentional). Such robustness reduces down time and customer support issues.

The schedules/automation engine 592 manages the user-defined rules of interaction between the different devices and for executing the user defined schedules of the off/on water system daily, weekly or monthly water system schedules.

Device management software 594 includes definitions of all supported devices (e.g., cell phone, mobile phones, or similar apparatus, specifically located at a home or corporation, the water meter and leak detection system 10, 126, 200 (with water shut-off/on mechanism 310) etc.) using a standardized plug-in architecture. The device connection module 594 offers an interface that can be used to quickly add support for any new device as well as enabling interoperability between devices that use different technologies or communication protocols. For common device types, predefined sub-modules have been defined, making supporting new devices of these types even easier.

The device management module 594 is in charge all discovery, installation and configuration of both wired (X10, Zwave, UPB) and wireless IP devices coupled or connected to the system. Networked IP devices require user configuration of many IP and security parameters to management module of an embodiment handles the details of this configuration.

The standard software includes the operating system 596 and port for transferring data and information USB 598, serial data. Port 600, TCP/IP 602, wireless standard 801.2 b/g/n/x 604 and Ethernet port 606. Water use data, energy use data water shut off/on compliance and monitoring data, and leak detection signals can utilize one or more of these ports to transfer information to a remote location.

The hardware, in this case, the Key Fob, Garage Door Opener, the Alarm System/Computer and the cell or mobile phone, smart phone, or similar apparatus 400 (480) can include mass storage 608, CDMA/GSM (phone) 610, RF wireless 612, WAN 614, touchscreen capability 616, and Bluetooth, ZigBee and other wireless protocols.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure that arise from known or customary practice and the art to which this invention pertains and which fall within the limits of the appended claims.

The invention claimed is:

1. A water meter and leak detection system comprising:
    said water meter and leak detection system interposed between a commercial or municipality water supply and a water supply for a building or structure;
    electrical circuitry including one or more CPU's, microprocessors or microcontrollers with a power source;
    said power source being AC powered, DC powered, powered with one or more standard or rechargeable batteries, said power source being electrically connected to said electrical circuitry;
    one or more flow rate sensors designed to monitor water use in a building or structure, said one or more flow rate sensors in electrical communication with said electrical circuitry;
    one or more wireless communication technologies monitoring water use data and detecting leak conditions on a water flow event and transferring said water use data and leak conditions over an internet connection to a computer system providing cloud services or to a private or corporate-owned network system;
    said water flow event utilizes software and algorithms for generating water use patterns or signatures for monitoring and analyzing water use data and water leak conditions; and,
    said water use data and leak conditions transferred to said computer system providing cloud services or, to said private or corporate-owned network system and allowing registered owners to access said water use data and water leak conditions utilizing the water flow event characterized by monitoring water flow rate, water use duration and total water use volume that is displayed on a cell phone, smart phone, mobile phone, remote computer or other electronic apparatus.

2. A water meter and leak detection system as recited in claim 1, wherein said water mater and leak detection system transmits said water use data upon receipt of a command signal from said cell phone, smart phone, mobile phone computer, or similar electronic apparatus.

3. A water mater and leak detection system as recited in claim 1, wherein said water meter and leak detection system can locally store water use data or transfer the water use data to said computer system providing cloud services, or to said private or corporate-owned network system that records the water use data in a database such that the water use data can be retrieved on a daily, weekly, monthly, or yearly basis and can be reviewed by specified private or public individuals or governmental/municipal agencies.

4. A water meter and leak detection system as recited in claim 1, further comprising a water shut-off/on control valve mechanism or a variable water flow valve mechanism that is in electrical communication with said water meter and leak detection system and coupled to said water supply.

5. A water meter and leak detection system as recited in claim 1, further comprising a temperature sensor in close proximity to said water supply.

6. A water meter and leak detection system as recited in claim 5, wherein said water meter and leak detection system can initiate water freezing protection procedure when the water supply approaches freezing conditions or send a freezing warning message to said cell phone, smart phone, mobile phone, remote computer, or other electronic apparatus when said freezing conditions exist.

7. A water meter and leak detection system as recited in claim 4, wherein said water meter and leak detection system can be programmed to turn off the control valve mechanism and water supply during a vacation schedule or work schedule using an application associated with said cell phone, smart phone mobile phone, remote computer, or similar electronic apparatus.

8. A water meter and leak detection system as recited in claim 1, wherein said water meter and leak detection system utilizes remote servers and software networks to increase the range, integrity, and reliability of cell tower, radio frequency or Wi-Fi technology for transferring water use data and leak condition information, or downloading software updates to said computer system providing cloud services, or to said private or corporate-owned network system.

9. A water meter and leak detection system as recited in claim 1, wherein said water meter and leak detection system utilizes remote servers and software networks to increase at least one of a range, integrity and reliability of wireless communication technology in the 908-928 MHz RF frequency and range for transferring water use data and leak condition information, or downloading software updates to said computer system providing cloud services, or private or corporate-owned network system.

10. A water meter and leak detection system as recited in claim 1, wherein said wireless communication technologies comprises at least one of a Wi-Fi, Zigbee, Bluetooth, radio frequency in the 908-928 MHz range, and cellular technology.

11. A water meter and leak detection system as recited in claim 4, wherein said water shut-off/on control valve mechanism or said or a variable water flow valve mechanism could replace, or function as, a main water meter.

12. A water meter and leak detection system as recited in claim 1, compromising one or more invasive or non-invasive flow sensors for monitoring a leak condition.

13. A water meter and leak detection system as recited in claim 1, further comprising a water use calibration mode for learning water use patterns and signatures of water use devices within a home, corporation, building, structure, irrigation system or outdoor water supply.

14. A water meter and leak detection system as recited in claim 1, wherein said water meter and leak detection system further compromising an automatic learning mode whereby software and algorithms and monitor water rate flow, total volume, and water use durations to define a water pattern and signature for each water use device within a home, corporation, building, structure, irrigation system or outdoor water supply.

15. A water meter and leak detection system as recited in claim 1, wherein when said water meter and leak detection system detects unusual water usage or observes a leak condition, at least one of a message or signal is sent to one or more cell phones, smart phones, mobile phones, remote computers, or similar electronic apparatuses allowing the user to turn off the water shut-off/on valve mechanism, or said one or more cell phones, smart phones, mobile phones, remote computers or similar electronic apparatuses can program the water meter and leak detection system to automatically turn off the water shut-off/on valve mechanism.

16. A water meter and leak detection system as recited in claim 4, whereby said water shut-off/on valve mechanism or said variable water flow valve mechanism is controlled by programmed instructions for turning on and off said water meter and leak detection system or setting a variable water flow, said said water shut-off/on valve mechanism or said variable water flow valve mechanism can be activated by an owner's or user's cell phone, smart phone, mobile phone, remote computer, or other electronic device.

17. A water meter and leak detection system as recited in claim 1 wherein said water meter and leak detection system utilizes wireless technology in the 908-928 MHz frequency range for wireless communication technology.

18. A water meter and leak detection system as recited in claim 1, wherein said cell phone, smart phone, mobile phone, or other electronic apparatus includes mobile devices such as a PDA (personal digital assistant), a tablet which could be any of the current, variants, revisions, and/or generations of the Apple IPAD®, Samsung®, H®, Surface®, Nook®, Acer®, Microsoft®, Nook®, Sony®, Kindle®, Google®, Sony®, Kindle® or a future table manufactured by these and other manufacturers, a related handheld device including the Apple IPOD Touch®, a smart or internet capable television, a wearable timepiece such as a fob watch and other apparatus with Wi-Fi, Zigbee, Z-wave, Bluetooth and cellular wireless capability.

19. A water meter and leak detection system as recited in claim 1, wherein said collection node, said receiving station, or said communication hub includes mesh technology circuitry that can communicate with other collection nodes, receiving stations, or communication hubs.

20. A water meter and leak detection system as recited in claim 1, further comprising one or more pressure sensors.

21. A water meter and leak detection system as recited in claim 20, wherein said one or more pressure sensors can detect leak conditions upon the closing of said water shut-off/on control valve mechanism.

22. A water meter and leak detection system as recited in claim 1, further comprising one or more water quality sensors.

23. A water meter and leak detection system as recited in claim 1, further comprising electrical energy generated by a turbine, paddle wheel, Pelton wheel, radial turbine or other water flow type electrical generator to supplement said rechargeable batteries.

24. A water meter and leak detection system comprising:
- a water mater collection node interposed between a commercial or municipality water supply and a water supply for a building or structure;
- said water meter collection node having a first electrical circuitry including one or more CPUs, microprocessors, or microcontrollers with a first power source;
- said first power source being AC powered, DC powered, or powered with one or more standard or rechargeable batteries, said power source being electrically connected to said first electrical circuitry;
- said water meter collection node having one or more flow rate sensors designed to monitor water use in a building or structure, said one or more flow rate sensors in electrical communication with said first electrical circuitry;
- said water meter collection node having a first wireless communication technology with a capability to transfer water use data and leak detection information on a water flow event to a remotely located receiving station or communication hub having said first wireless communication technology;
- said receiving station or communication hub having a second electrical circuitry including one or more CPU's, microprocessors, or microcontrollers with a second power source;
- said receiving station or communication hub powered by said second power source that is AC powered, DC powered, or powered with one or more batteries, said second power source being electrically connected to said second electrical circuitry;
- said receiving station or communication hub having a second wireless communication technology or a direct wired connection for transferring water use data and leak detection information using at least one of encryption and authentication technology over an internet connection to a computer system providing cloud service or to a private or corporate-owned network system;
- said water flow event utilizing software and algorithms for generating water use patterns or signatures for monitoring and analyzing water use data and water leak information; and,
- said water use data and water leak information being transferred to said computer system providing cloud services or, to said private or corporate-owned network system and allowing registered owners to access said water use data and water leak information utilizing the water flow event characterized by monitoring water flow rate, water use duration and total water use volume that is displayed on a cell phone, smart phone, mobile phone, remote computer or other electronic apparatus.

25. A water meter and leak detection system as recited in claim 24, wherein said water meter and leak detection system transmits said water use data upon receipt of a command signal from said cell phone, smart phone, mobile phone, remote computer, or other electronic apparatus.

26. A water meter and leak detection system as recited in claim 24, wherein said water meter and leak detection system can locally store water use data or transferred to said computers systems providing cloud services or, to said private or corporate-owned network systems that records the water use data in a database such that the water use data can be retrieved on a daily, weekly, monthly, or yearly basis and can be reviewed by specified private or public individuals or governmental/municipal agencies.

27. A water meter and leak detection system as recited in claim 24, further comprising a water shut-off/on control valve mechanism or a variable water flow valve mechanism that is in electrical communication with said water meter and leak detection system and coupled to said water supply.

28. A water meter and leak detection system as recited in claim 24, further comprising a temperature sensor in close proximity to said water supply.

29. A water meter and leak detection system as recited in claim 28, wherein said water meter and leak detection system can initiate water freezing protection procedure when the water supply approaches freezing conditions or send a freezing warning message to said cell phone, smart phone, mobile phone, remote computer or other electronic apparatus when said freezing conditions exist.

30. A water meter and leak detection system as recited in claim 27, wherein said water meter and leak detection system can be programmed to turn off the control valve mechanism and water supply during a vacation schedule or work schedule using an application associated with said cell phone, smart phone, mobile phone, remote computer, or other electronic apparatus.

31. A water meter and leak detection system as recited in claim 24, wherein said water meter and leak detection system utilizes remote servers and software networks to increase the range, integrity and reliability of cell tower, radio frequency, or Wi-Fi technology for transferring water use data and leak detection information or downloading software updates to said computers systems providing cloud services or, to said private or corporate-owned network.

32. A water meter and leak detection system as recited in claim 24, wherein said water meter and leak detection system utilizes remote servers and software networks to increase the range, integrity and reliability of cell tower, RF or Wi-Fi technology for transferring water use data and leak detection information or downloading software updates to said computer system providing cloud services or, to said private or corporate-owned network.

33. A water meter and leak detection system as recited in claim 24, wherein said wireless communication technology comprises at least one of a Wi-Fi, Zigbee, Bluetooth, radio frequency in the 908-928 MHz range and cellular technology.

34. A water meter and leak detection system as recited in claim 27, wherein said water shut-off/on control valve mechanism, or said or a variable water flow valve mechanism, could replace, or function as, a main water meter.

35. A water meter and leak detection system as recited in claim 24, compromising one or more invasive or non-invasive flow sensors for monitoring a leak condition.

36. A water meter and leak detection system as recited in claim 24, further comprising a water use calibration mode for learning water use patterns and signature of water use devices within a home, corporation, building, structure, irrigation system or outdoor water supply.

37. A water meter and leak detection system as recited in claim 24, further compromising an automatic learning mode by whereby software and algorithms and monitor water rate flow, total volume, and water use durations to define a water pattern and signature for each water use device within a home, corporation, building, structure, irritation system or outdoor water supply.

38. A water meter and leak detection system as recited in claim 24, wherein when said water meter and leak detection system detects unusual water usage or observes a leak condition, a message or signal is sent to one or more cell phones, smart phones, mobile phones, remote computers, or other electronic apparatuses allowing the user to turn off the water shut-off/on valve mechanism, or said one or more cell phones, smart phones, mobile phones, remote computers or similar electronic apparatuses enable programming of the water meter and leak detection system to automatically turn off the water shut-off/on control valve mechanism.

39. A water meter and leak detection system as recited in claim 27, wherein said water shut-off/on control valve mechanism or said variable water flow valve mechanism is controlled said CPU, microprocessor or microcontroller for turning on and off said water shut-off/on control valve mechanism or setting a variable water flow in said variable water flow valve mechanism, said water shut-off/on control valve mechanism or said variable water flow valve mechanism can alternately be activated by a user's cell phone, smart phone, mobile phone, remote computer or other mobile electronic communication device.

40. A water meter and leak detection system as recited in claim 24 wherein said water meter and leak detection system can be programmed to automatically turn off the main water system for a vacation mode or a vacation/irrigation mode.

41. A water meter and leak detection system as recited in claim 24, wherein said cell phone, smart phone, mobile phone, or other electronic apparatus includes a mobile devices such as a PDA (personal digital assistant), a tablet which could be any of the current, variants, revisions, and/or generations of the Apple IPAD® Samsung®, HP®, Surface®, Nook®, Acer®, Microsoft®, Nook®, Sony®, Kindle®, Google®, Sony®, Kindle® or a future tablet manufactured by these and other manufacturers, a related handheld device including the Apple IPOD Touch®, a smart or internet capable television, a wearable timepiece such as a FOB watch and other apparatus with Wi-Fi, Zigbee, Z-wave, Bluetooth, and cellular wireless capability.

42. A water meter and leak detection system as recited in claim 24, wherein said collection node, said receiving station, or said communication hub includes mesh technology circuitry that can communicate with other collection nodes, receiving stations, or communication hubs.

43. A water meter and leak detection system as recited in claim 24, further comprising the said collection node includes one or more pressure sensors.

44. A water meter and leak detection system as recited in claim 43, wherein said one or more pressure sensors can detect leak conditions upon the closing of said water shut-off/on control valve mechanism.

45. A water meter and leak detection system as recited in claim 24, further comprising that said collection node includes one or more water quality sensors.

46. A water meter and leak detection system as recited in claim 24, further comprising electrical energy generated by a turbine, paddle wheel, Pelton wheel, radial turbine or other water flow type electrical generator to supplement said rechargeable batteries.

* * * * *

UNITED STATES PATENT AND TRADEMARK OFFICE
CERTIFICATE OF CORRECTION

| | | |
|---|---|---|
| PATENT NO. | : 10,410,501 B2 | Page 1 of 4 |
| APPLICATION NO. | : 15/016178 | |
| DATED | : September 10, 2019 | |
| INVENTOR(S) | : Michael Klicpera | |

It is certified that error appears in the above-identified patent and that said Letters Patent is hereby corrected as shown below:

In the Specification

Column 6, Lines 38-55 reads "A typical cell phone, smart phones, or similar apparatus includes all remote cellular phones and mobile electronic communication devices using access and format methods (with cellular equipment, public switched telephone network lines, satellite, tower and mesh technology), PDAs, tablets refers to all current and variants, revisions and generations of the APPLE®, SAMSUNG®, HP®, ACER®, MICROSOFT®, NOOK®, GOOGLE®, SONY®, KINDLE® and other tablets manufactured by these and other manufactures), APPLE TOUCH®, a smart or internet capable television, wireless time piece or wireless watch and and other electronic apparatus with Wi-Fi and wireless capability, and remote computers and controllers having internet or wireless cell format technology connectivity utilizing cellular, Wi-Fi, Zigbee and/or Bluetooth, and any combinations thereof, to communication with the remote cellular phones (with cellular equipment, plublic switched telephone network lines, satellite, microwave, tower and mesh technology."

Should read "A typical cell phone, smart phone, mobile phone or other electronic apparatus (or other electronic device) includes PDAs (personal digital assistant), a tablet which could be any of the current, variants, revisions or generations of the APPLE IPAD®, Samsung®, HP®, Microsoft Surface®, Nook®, Acer®, Sony®, Kindle®, Google® and a future tablet manufactured by these and other manufactures, a related handheld device including the APPLE IPOD TOUCH®, a smart or internet capable television, a wearable timepiece such as a fob watch and other apparatuses with at least one of Wi-Fi, ZigBee, Z-wave, Bluetooth and cellular wireless capability."

In the Claims

Claim 2 reads "A water meter and leak detection system as recited in Claim 1, wherein said water mater and leak detection system transmits said water use data upon receipt of a command signal from said cell phone, smart phone, mobile phone computer, or similar electronic apparatus."

Signed and Sealed this
Third Day of December, 2019

Andrei Iancu
*Director of the United States Patent and Trademark Office*

CERTIFICATE OF CORRECTION (continued)
U.S. Pat. No. 10,410,501 B2

Should read "A water meter and leak detection system as recited in Claim 1, wherein said water meter and leak detection system transmits said water use data upon receipt of a command signal from said cell phone, smart phone, mobile phone, remote computer, or other electronic apparatus."

Claim 7 reads "A water meter and leak detection system as recited in Claim 4, wherein said water meter and leak detection system can be programmed to turn off the control valve mechanism and water supply during a vacation schedule or work schedule using an application associated with said cell phone, smart phone mobile phone, remote computer, or similar electronic apparatus."

Should read "A water meter and leak detection system as recited in Claim 4, wherein said water meter and leak detection system can be programmed to turn off the water shut-off/on control valve mechanism and water supply during a vacation schedule or work schedule using an application associated with said cell phone, smart phone, mobile phone, remote computer, or other electronic apparatus."

Claim 11 reads "A water meter and leak detection system as recited in Claim 4, wherein said water shut-off/on control valve mechanism or said or a variable water flow valve mechanism could replace, or function as, a main water meter."

Should read "A water meter and leak detection system as recited in Claim 4, wherein said water shut-off/on control valve mechanism or said variable water flow valve mechanism could replace, or function as, a main water meter."

Claim 15 reads "A water meter and leak detection system as recited in claim 1, wherein said water meter and leak detection system detects unusual water usage or observes a leak condition, at least one of a message or signal is sent to one or more cell phones, smart phones, mobile phones, remote computers, or similar electronic apparatuses allowing the user to turn off the water shut-off/on mechanism, or said one or more cell phones, smart phones, mobile phones, remote computers or similar electronic apparatuses can program the water meter and leak detection system to automatically turn off the water shut-off/on mechanism."

Should read "A water meter and leak detection system as recited in claim 1, wherein said water meter and leak detection system detects unusual water usage or observes a leak condition, at least one of a message or signal is sent to one or more cell phones, smart phones, mobile phones, remote computers, or other electronic apparatuses allowing the user to turn off the water shut-off on mechanism, or said one or more cell phones, smart phones, mobile phones, remote computers or other electronic apparatuses can program the water meter and leak detection system to automatically turn off the water shut-off/on mechanism."

Claim 16 reads "A water meter and leak detection system as recited in Claim 4, whereby said water shut-off/on valve mechanism or said variable water flow valve mechanism is controlled by programmed instructions for turning on and off said water meter and leak detection system or setting a variable water flow, said water shut-off/on valve mechanism or said variable water flow valve mechanism can be activated by a owner's or user's cell phone, smart phone, mobile phone, remote computer, or other electronic device."

CERTIFICATE OF CORRECTION (continued)
U.S. Pat. No. 10,410,501 B2

Should read "A water meter and leak detection system as recited in Claim 4, wherein said water shut-off/on control valve mechanism or said variable water flow valve mechanism is controlled by programmed instructions for turning on and off said water meter and leak detection system or setting a variable water flow, said water shut-off/on control valve mechanism or said variable water flow valve mechanism can be activated by an owner's or user's cell phone, smart phone, mobile phone, remote computer, or other electronic device."

Claim 18 reads "A water meter and leak detection system as recited in Claim 1, wherein said cell phone, smart phone, mobile phone or other electronic apparatus includes mobile devices such as PDAs (personal digital assistant), a tablet which could be any of the current, variants, revisions and/or generations of the APPLE IPAD®, Samsung®, HP®, Surface®, Nook®, Acer®, Microsoft®, Nook®, Sony®, Kindle®, Google®, Sony®, Kindle® and a future tablet manufactured by these and other manufactures, a related handheld device including the APPLE IPOD TOUCH®, a smart or internet capable television, a wearable timepiece such as a fob watch and other apparatuses with Wi-Fi, ZigBee, Z-wave, Bluetooth and cellular wireless capability."

Should read "A water meter and leak detection system as recited in Claim 1, wherein said cell phone, smart phone, mobile phone or other electronic apparatus includes mobile devices such as PDAs (personal digital assistant), a tablet which could be any of the current, variants, revisions or generations of the APPLE IPAD®, Samsung®, HP®, Microsoft Surface®, Nook®, Acer®, Sony®, Kindle®, Google® and a future tablet manufactured by these and other manufactures, a related handheld device including the APPLE IPOD TOUCH®, a smart or internet capable television, a wearable timepiece such as a fob watch and other apparatuses with Wi-Fi, ZigBee, Z-wave, Bluetooth and cellular wireless capability."

Claim 39 reads "A water meter and leak detection system as recited in Claim 27, wherein said water shut-off/on control valve mechanism or said variable water flow valve mechanism is controlled said CPU, microprocessor or microcontroller for turning on and off said water shut-off/on control valve mechanism or setting a variable water flow in said variable water flow valve mechanism, said water shut-off/on control valve mechanism or said variable water flow valve mechanism can alternately be activated by a user's cell phone, smart phone, mobile phone, or other electronic communication device."

Should read "A water meter and leak detection system as recited in Claim 27, wherein said water shut-off/on control valve mechanism or said variable wafer flow valve mechanism is controlled by said CPU, microprocessor or microcontroller for turning on and off said water shut-off/on control valve mechanism or setting a variable water flow in said variable water flow valve mechanism, said water shut-off/on control valve mechanism or said variable water flow valve mechanism can alternately be activated by a user's cell phone, smart phone, mobile phone, or other electronic communication device."

Claim 41 reads "A water meter and leak detection system as recited in Claim 1, wherein said cell phone, smart phone, mobile phone or other electronic apparatus includes mobile devices such as PDAs (personal digital assistant), a tablet which could be any of the current, variants, revisions and/or generations of the APPLE IPAD®, Samsung®, HP®, Surface®, Nook®, Acer®, Microsoft®, Nook®, Sony®, Kindle®, Google®, Sony®, Kindle® and a future tablet manufactured by these and other manufactures, a related handheld device including the APPLE IPOD TOUCH®, a smart or internet capable television, a wearable timepiece such as a fob watch and other apparatuses with Wi-Fi, ZigBee, Z-wave, Bluetooth and cellular wireless capability."

Should read "A water meter and leak detection system as recited in Claim 24, wherein said cell phone, smart phone, mobile phone or other electronic apparatus includes mobile devices such as PDAs (personal digit assistant), a tablet which could be any of the current, variants, revisions or generations of the APPLE IPAD®, Samsung®, HP®, Microsoft Surface®, Nook®, Acer®, Sony®, Kindle®, Google® and a future tablet manufactured by these and other manufactures, a related handheld device including the APPLE IPOD TOUCH®, a smart or internet capable television, a wearable timepiece such as a fob watch and other apparatuses with Wi-Fi, ZigBee, Z-wave, Bluetooth and cellular wireless capability."

Claim 43 reads "A water meter and leak detection system as recited in Claim 24, further comprising the said collection node includes one or more pressure sensors."

Should read "A water meter and leak detection system as recited in Claim 24, further comprising said collection node includes one or more pressure sensors."